(12) United States Patent
Sega

(10) Patent No.: US 11,309,819 B2
(45) Date of Patent: Apr. 19, 2022

(54) INITIAL ROTOR POSITION DETECTION IN A BRUSHLESS DC MOTOR

(71) Applicant: Janislav Sega, Kambah (AU)

(72) Inventor: Janislav Sega, Kambah (AU)

( * ) Notice: Subject to any disclaimer, the term of this patent is extended or adjusted under 35 U.S.C. 154(b) by 0 days.

(21) Appl. No.: 17/361,636

(22) Filed: Jun. 29, 2021

(65) Prior Publication Data

US 2021/0391815 A1 Dec. 16, 2021

Related U.S. Application Data

(63) Continuation of application No. 16/648,888, filed as application No. PCT/AU2018/051042 on Sep. 21, 2018.

(30) Foreign Application Priority Data

Sep. 22, 2017 (AU) .................. 2017903859

(51) Int. Cl.
  *H02P 25/03* (2016.01)
  *H02P 23/14* (2006.01)
  *H02P 27/04* (2016.01)

(52) U.S. Cl.
  CPC .............. *H02P 25/03* (2016.02); *H02P 23/14* (2013.01); *H02P 27/04* (2013.01)

(58) Field of Classification Search
  CPC .......... H02P 25/03; H02P 23/14; H02P 27/04; H02P 6/185; H02P 6/182
  USPC ............................................ 318/400.01, 700
  See application file for complete search history.

(56) References Cited

U.S. PATENT DOCUMENTS

| | | | |
|---|---|---|---|
| 3,784,888 | A | 1/1974 | Geiersbach et al. |
| 4,083,001 | A | 4/1978 | Paice |
| 5,028,852 | A | 7/1991 | Dunfield |
| 5,191,270 | A | 3/1993 | McCormack |
| 5,841,252 | A | 11/1998 | Dunfield |
| 6,172,498 | B1 | 1/2001 | Schmidt et al. |
| 6,229,274 | B1 | 5/2001 | Vertemara et al. |
| 6,344,721 | B2 | 2/2002 | Seki et al. |
| 6,384,555 | B1 | 5/2002 | Tanaka |
| 6,396,250 | B1 | 5/2002 | Bridge |

(Continued)

FOREIGN PATENT DOCUMENTS

| | | |
|---|---|---|
| CH | 698071 B1 | 5/2009 |
| EP | 0848489 A2 | 6/1998 |
| WO | WO2012/010065 A1 | 1/2012 |

OTHER PUBLICATIONS

English abstract of CN698071B1.
(Continued)

*Primary Examiner* — David Luo
(74) *Attorney, Agent, or Firm* — Caesar Rivise, PC

(57) ABSTRACT

A method of operating a Brushless Direct Current Motor (BLDCM), the BLDCM of the type including: a series of concentric independently activated electromagnetic phase coils interacting with a series of permanent magnets to provide relative movement therebetween, the phase coils having temporal periods of activation time and deactivation time, the method including the steps of: (a) activating at least one of the phase coils for a short period of activation; and (b) measuring the voltage response across the phase coil of the deactivated phase coil during the short period of activation to determine the rotor position.

14 Claims, 50 Drawing Sheets

(56) References Cited

U.S. PATENT DOCUMENTS

| | | | |
|---|---|---|---|
| 6,633,145 B2 | 10/2003 | Shao et al. | |
| 6,650,082 B1 | 11/2003 | Du | |
| 6,850,863 B2 | 2/2005 | Benchaib et al. | |
| 6,861,826 B2 | 3/2005 | Lynch | |
| 6,885,163 B2 | 4/2005 | Heidrich | |
| 6,956,359 B2 | 10/2005 | Dubhashi | |
| 7,023,155 B2 | 4/2006 | Tieu | |
| 7,072,778 B2 | 7/2006 | Swanson | |
| 7,154,196 B2 | 12/2006 | Sparling et al. | |
| 7,202,623 B2 | 4/2007 | Zhou et al. | |
| 7,334,854 B1 | 2/2008 | Chang et al. | |
| 7,489,096 B2 | 2/2009 | Gianone | |
| 7,592,761 B2 | 9/2009 | MacKay | |
| 7,619,325 B1 | 11/2009 | Hennessy et al. | |
| 7,768,226 B2 | 8/2010 | Fukamizu et al. | |
| 7,944,159 B2 | 5/2011 | Paintz et al. | |
| 7,969,108 B2 | 6/2011 | Vermeir | |
| 7,977,821 B2 | 7/2011 | Kojori et al. | |
| 8,054,024 B2 * | 11/2011 | Hayashi | H02P 6/18 318/400.34 |
| 8,072,165 B2 * | 12/2011 | Baba | H02P 6/18 318/400.13 |
| 8,400,086 B2 | 3/2013 | Cheng | |
| 8,552,671 B2 | 10/2013 | Tieu | |
| 8,593,098 B2 | 11/2013 | Paintz et al. | |
| 8,710,788 B2 | 4/2014 | Hano et al. | |
| 8,773,060 B2 | 7/2014 | Hano | |
| 8,796,974 B2 | 8/2014 | Wang et al. | |
| 8,884,577 B2 | 11/2014 | Tsuji | |
| 9,024,561 B2 * | 5/2015 | Lawrence | H02P 6/183 318/400.33 |
| 9,246,416 B2 | 1/2016 | Ichikawa | |
| 9,391,553 B2 | 7/2016 | Lu et al. | |
| 9,531,316 B1 | 12/2016 | Masuda et al. | |
| 2010/0181952 A1 | 7/2010 | Cheng | |
| 2014/0015458 A1 | 1/2014 | Lin et al. | |
| 2014/0062364 A1 | 3/2014 | Petri et al. | |

OTHER PUBLICATIONS

English abstract of WO2012/010065A1.
Midwest Research Institute, "Brushless DC Motors", National Aeronautics and Space Administration, Washington, D.C., 1975.
Wikipedia, "Brushless DC Electric Motor", retried from http://en.wikipedia.org/wiki/Brushless_DC_electric_motor.
Mubeen, M., "Brushless DC Motors Primer", Radford, VA, 2008.
Hendershot, et al., "Design of Brushless Permanent-Magnet Motors", Magna Physics Publishing and Clarendon Press, Oxford, New York, 1994.
Gamazo-Real et al., "Position and Speed Control of Brushless DC Motors Using Sensorless Techniques and Application Trends", Open Access, Sensors, 2010, pp. 6901-6947.
Singh et al., "State of the Art on Permanent Magnet Brushless DC Motor Drives", Journal of Power Electronics, vol. 9, No. 1, Jan. 2009.
Atmel Corporation, "Atmel AVR928: Scalar Sensorless Methods to Drive BLDC Motors", Application Note 8305A-AVR-05/10. 2010.
Yan et al., "A Survey of Sensorless Initial Rotor Position Estimation Schemes for Permanent Magnet Synchronous Motors", Australasian Universities Power Engineering Conference (AUPEC 2004), Brisbane, Australia, Sep. 2004.
Schmidt et al., "Initial Rotor Angle Detection of an Non-Salient Pole Permanent Magnet Synchronous Machine", IEEE Industry Applications Society Annual Meeting, New Orleans, 1997.
Lee et al., "A New Starting Method of BLDC Motors Without Position Sensor", IEEE, 2004.
Shao, J., "Direct Back EMF Detection Method for Sensorless Brushless DC (BLDC) Motor Drives", Master of Science Thesis, Faculty of the Virginia Polytechnic Institute and the State University, Blacksburg, VA, Sep. 2003.
Lai, et al., "Novel Back-EMF Detection Technique of Brushless DC Motor Drives for Wide Range Control Without Using Current and Position Sensors", IEEE Transactions on Power Electronics, vol. 23, No. 2, Mar. 2008.
Chen et al., "A New Cost Effective Sensorless Commutation Method for Brushless DC Motors Without Phase Shift Circuit and Neutral Voltage", IEEE Transactions on Power Electronics, vol. 22, No. 2, Mar. 2007.
Microchip Technology Inc., "Sensorless Field Oriented Control of PMSM Motors", Application Note AN1078, 2007.
NXP Semiconductors, Sensorless SingleShunt FOC on LPC2900, Application Note, Dec. 2009.
Texas Instruments, TMS320F28069F, TMS320F28068F, TMS320F28062F, InstaSPIN-FOC Software, Technical Reference Manual, Literature No. SPRUHI9A, Jan. 2014.
Gambetta D., "Sensorless Technique for BLDC Motors", Dissertation, University of Southern Queensland, Australia, 2006.
ELMOS Semiconductor AG, "VirtuHall@, Sensorless PMSM/BLDC Motor Control, Competence in Automotive Electronics", 2007.
Mappus, S., Synchronous Rectification for Forward Converters, Fairchild Semiconductor Power Seminars, 2010-2011.
Texas Instruments, "LM2747, LM3100, LM5035, Synchronous Rectification in High-Performance Power Converter Design", Literature No. SNVA595, 2011.
Infineon Technologies AG, XC866, Using CCU6E for BLDC Control With Synchronous Rectification (Active Freewheeling), Application Note AP08078, V1.0, Aug. 2008.
STMicroelectronics, PWM Management for 3-Phase Motor Drives Using the ST7MC, Application Note AN2009, 2007.
Cody et al., Regenerative Braking in an Electric Vehicle, Zeszyty Problemowe—Maszyny Elektryczne Nr 81/2009.
Rathod et al., "Compact Regenerative Braking Scheme for a PM BLDC Motor Driven Electric Two-Wheeler", International Journal of Scientific Engineering and Applied Science (IJEAS), vol. 2, Issue 4, pp. 146-150, Apr. 2006.
Long et al., "Energy-Regenerative Braking Control of Electric VehiclesUsing Three-Phase Brushless Direct-Current Motors", Energies 2014, 7, pp. 99-144.
Jabbals, Automatic Motor Tester, Model 4008RJ, www.jabbals.com.
Brockhaus Measurements, "Case History—Rotor Tester", www.brockhaus.com.
Jebaseeli et al., "Real Time Temperature Measurement for the Thermal Protection of Switched Reluctance Machine", International Journal of Engineering and Technology, vol. 5, No. pp 2983-2987, Jun.-Jul. 2013.
International Rectifier, "IRFH5300PbF Product Datasheet", PD-97410A.
LRP Electronic GmbH, User Manual, 80960 Flow Competition, 80970 Flow WorksTeam, 2012.
Hobbywing, "Xerun XR10 Pro User Manual".
Team Orion, "Instruction Manual, dDrive", 2015.
Jung, J., Project #2 Space Vector PWM Inverter, Mechatronic Systems Laboratory, Department of Electrical and Computer Engineering, The Ohio State University, Feb. 2005.
Kim et al., "A Novel Method for Initial Rotor Position Estimation for IPM Synchronous Machine Drives", IEEE Transactions on Industry Applications, vol. 40, No. 5, pp. 1369-1378, Sep./Oct. 2004.
Haque et al., "Initial Rotor Position Estimation of Interior Permanent Magnet Synchronous Motor Without a Mechanical Sensor", Journal of Electrical and Electronics Engineering, AustraliaSchool of Electiical Engineering and Telecommunications, Jan. 2001.
Boussak, M., "Implementation and Experimental Investigation of Sensorless Speed Control With Initial Rotor Position Estimation for Interior Permanent Magnet Synchronous Motor Drive", IEEE Transactions on Power Electronics, vol. 20, No. 6, pp. 1413-1422, Nov. 2005.
Jeong et al., "Initial Rotor Position Estimation of an Interior Permanent-Magnet Synchronous Machine Using Carrier-Frequency Injection Methods", IEEE Transactions on Industry Applications, vol. 41, No. 1, pp. 38-45, Jan./Feb. 2005.
Ram et al., "A SIMULINK Model of PMSM to Include High Frequency Magnetic Saliency Effect for a Mew Sensorless Rotor

(56) References Cited

OTHER PUBLICATIONS

Detection Technique", Australian Journal of Electrical and Electronics Engineering, 3:2, pp. 77-82, 2007.

Kiel et al., "Sensorless Speed Control of Permanent Magnet Synchronous Machines for Low Speed and Standstill", 2002.

Linke et al., "Sensorless Position Control of Permanent Magnet Synchronous Machines Without Limitations at Zero Speed", IEEE 2002 28th Annual Conference of the Industrial Electronics Society, pp. 674-679.

Yongdong et al., "Sensorless Control of Permanent Magnet Synchronous Motor—A Survey", IEEE Vehicle Power and Propulsion Conference (VPPC), Sep. 3-5, 2008.

International Search Report for corresponding PCT Application No. PCT/AU2018/051042 dated Dec. 10, 2018.

* cited by examiner

INITIAL ROTOR POSITION DETECTION IN A BRUSHLESS DC MOTOR

CROSS-REFERENCE TO RELATED APPLICATIONS

This Continuation Application claims the benefit under 35 U.S.C. § 120 of application Ser. No. 16/648,888 filed on Mar. 19, 2020, which in turn claims the benefit under 35 U.S.C. § 371 of international patent application PCT/AU2018/051042 filed on Sep. 21, 2018, which in turn claims priority to Australian Patent Application No. AU2017903859 filed on Sep. 22, 2017, all of which are entitled SYSTEM AND METHOD FOR CONTROLLING A MOTOR and all of whose entire disclosures are incorporated by reference herein.

FIELD OF INVENTION

The present invention is directed to the area of control of electric brushless DC motors (BLDCMs), and, in particular, discloses a sensorless BLDCM control application, constraint and optimization for compact and efficient dynamically controlled motor systems.

REFERENCES

The following prior art references provide general background information in the field.

[1] Midwest Research Institute, BRUSHLESS DC MOTORS, National Aeronautics and Space Administration, Washington, D.C., 1975

[2] Wikipedia, Brushless DC electric motor, http://en.wikipedia.org/wiki/Brushless_DC_electric_motor

[3] Muhammad Mubeen, Brushless DC Motors Primer, Radford, Va., 2008

[4] Hendershot J. R. Jr and Miller Tje, Design of Brushless Permanent-Magnet Motors, Magna Physics Publishing, New York, 1994

[5] Gamazo-Real J., Vazquez-Sanchez E., Gomez-Gil J., Position and Speed Control of Brushless DC Motors Using Sensorless Techniques and Application Trends, Open Access, Sensors, 2010

[6] Bhim Singh and Sanjeev Singh, State of the Art on Permanent Magnet Brushless DC Motor Drives, Journal of Power Electronics, Vol. 9, No. 1, January 2009

[7] Atmel Corporation, Atmel AVR928: Scalar Sensorless Methods to Drive BLDC Motors, Application Note 8305B-AVR-07/2013, 2013

[8] Ying Yan and Jian Guo Zhu, A Survey of Sensorless Initial Rotor Position Estimation Schemes for Permanent Magnet Synchronous Motors, Australasian Universities Power Engineering Conference (AUPEC 2004), Brisbane, Australia, September 2004

[9] Schmidt P., Gasperi, M., Ray, G. and Wijenayake A., Initial rotor angle detection of a non-salient pole permanent magnet synchronous machine, IEEE Industry Applications Society Annual Meeting, New Orleans, 1997

[10] Wook-Jin Lee, Seung-Ki Sul, A New Starting Method of BLDC Motors without Position Sensor, IEEE, 2004

[11] Shao J., Direct Back EMF Detection Method for Sensorless Brushless DC (BLDC) Motor Drives, Master of Science Thesis, Faculty of the Virginia Polytechnic Institute and the State University: Blacksburg, Va., USA, September 2003

[12] Yen-Shin Lai and Yong-Kai Lin, Novel Back-EMF Detection Technique of Brushless DC Motor Drives for Wide Range Control Without Using Current and Position Sensors, IEEE Transactions on Power Electronics, Vol. 23, No. 2, March 2008

[13] Cheng-Hu Chen and Ming-Yang Cheng, A New Cost Effective Sensorless Commutation Method for Brushless DC Motors Without Phase Shift Circuit and Neutral Voltage, IEEE Transactions on Power Electronics, Vol. 22, No. 2, March 2007

[14] Microchip Technology Inc., Sensorless Field Oriented Control of PMSM Motors, Application note AN1078, 2007

[15] NXP Semiconductors, Sensorless single-shunt FOC on LPC2900, Application note, December 2009

[16] Texas Instruments, TMS320F28069F, TMS320F28068F, TMS320F28062F, InstaSPIN-FOC Software Technical Reference Manual, Literature Number: SPRUHI9A, January 2014

[17] Gambetta D., Sensorless Technique for BLDC Motors, MPhil Dissertation, University of Southern Queensland, Australia, 2006

[18] ELMOS Semiconductor AG, VirtuHall® SENSORLESS PMSM/BLDC MOTOR CONTROL COMPETENCE IN AUTOMOTIVE ELECTRONICS, 2007

[19] Steve Mappus, Synchronous Rectification for Forward Converters, Fairchild Semiconductor Power Seminars, 2010-2011

[20] Texas Instruments, LM2747, LM3100, LM5035 Synchronous Rectification in High-Performance Power Converter Design, Literature Number: SNVA595, 2011

[21] Infineon, CX866 Using CCU6E for BLDC control with synchronous rectification (active freewheeling), Application Note AP08078, V1.0, August 2008

[22] STMicroelectronics, PWM MANAGEMENT FOR 3-PHASE BLDC MOTOR DRIVES USING THE ST7MC, Application Note AN2009, 2007

[23] Jarrad Cody et al., REGENERATIVE BRAKING IN ELECTRIC VEHICLE, Zeszyty Problemowe—Maszyny Elektryczne Nr 81/2009

[24] G. J. Rathod, Prof R. K. JHA, Compact Regenerative Braking Scheme for a PM BLDC Motor Driven Electric Two-Wheeler, International Journal of Scientific Engineering and Applied Science (IJEAS), Volume-2, Issue-4, April 2006

[25] Bo Long et al., Energy-Regenerative Braking Control of Electric Vehicles Using Three-Phase Brushless Direct-Current Motors, Energies 2014, 7, 99-144

[26] Jabbals, Automatic Motor Tester Model 4008RJ, www.jabbals.com

[27] Brockhaus Measurements, Rotor Tester, www.brockhaus.com

[28] E. Annie Elisabeth Jebaseeli et al., Real Time Temperature Measurement for the Thermal Protection of Switched Reluctance Machine, International Journal of Engineering and Technology, Vol 5 No 3 June-July 2013

[29] International Rectifiers, IRFH5300PbF Product Datasheet, PD-97410A

[30] User Manual Flow Competition/Flow WorksTeam

[31] Xerun XR10 Pro User Manual

[32] dDrive Instruction Manual

[33] Jin-Woo Jung, Project #2 Space Vector PWM Inverter, Mechatronic Systems Laboratory, Department of Electrical and Computer Engineering, The Ohio State University, February 2005.

BACKGROUND OF THE INVENTION

Any discussion of the background art throughout the specification should in no way be considered as an admission that such art is widely known or forms part of common general knowledge in the field.

BLDC Motors: The sensorless control and operation of BLDC motors is used in a wide range of global market applications owing to their increased energy efficiency and density, compactness, operational reliability and life expectancy. BLDCMs, also known as permanent magnet synchronous motors (PMSM), are generally classified according to their phase winding configuration, being either wye or delta and the number of magnetic poles as described in [4].

Sensored BLDCM Control: The majority of applications employing BLDCM systems in the global market today are designed using the inferior and less efficient sensored brushless motor controller technology, outlined in [5]. Generally these controller designs use Hall Effect semiconductor sensors inside the motors to detect rotor position, which increases manufacturing costs due to extra components and inter-wiring connections required. Whilst sensored motor control systems do not exhibit start-up and low speed operation problems, the sensors can be subjected to operation at very high temperatures, electric and magnetic interference, assembly placement errors leading to reduced energy efficiency and torque, and mechanical failures. As a result, the sensored brushless systems have lower reliability and higher operating costs compared to the sensorless brushless technology.

Sensorless BLDCM Control: Instead of using external sensors, sensorless BLDCM control techniques use only electrical measurements obtained from the motor. Those skilled in the art of sensorless BLDCM controller design are familiar with the inherent challenges of operating such motors at and near zero speeds [5], particularly in the presence of demanding dynamic loads. In sensorless brushless operation, issues arise because of the difficulty of obtaining precise BLDCM rotor position information at zero and low speeds, which is essential for robust electronic commutation of such motors.

There exists a significant amount of prior art related to the design of sensorless BLDCM controllers [5], [6]. However, it is evident that no single controller solution alone can reliably operate motors from start to high speed. Thus generally, sensorless controller designs have to use a hybrid approach, which can encompass one or more of the following key areas of controller operation: Initial rotor position detection; Sensorless operation at zero and low motor speeds; Sensorless operation at high motor speeds.

Initial Rotor Position Detection: Initial rotor position detection is the first challenge of sensorless brushless controllers to successfully operate a BLDCM from start to high speed. Most simple techniques in the prior art drive a current through the motor windings to force the rotor into a known alignment position. This can result in up to 180° motor rotation opposite to the desired direction, unwanted overshoot and ringing in the system, and increased start-up time. An open loop technique is then generally applied to spin the motor with a predetermined commutation sequence until sufficiently high speed is reached to allow a sensorless technique such as BEMF voltage sensing to be employed, for one example as outlined in [7]. However, due to the lack of control of synchronization between motor phase currents and voltages, these inferior techniques fail to commutate the motor properly during start-up in applications where system dynamics and motor loads are particularly demanding.

More advanced techniques attempt to estimate the actual rotor position by exciting the motor windings with low level currents and performing electrical measurements. A comprehensive overview of such prior art initial rotor position detection techniques is provided in [8]. Broadly, these fall into one of the following: Voltage and reactive power harmonics; Inductance variation methods; Patterns of voltage and current vectors; Observer and Kalman filter techniques; Pulse voltage vector; and High frequency signal injection.

Most of these rotor position measurement methods require specialized electronic hardware circuitry, for example to generate and detect high frequency injection signals and measure phase currents, which increases the size and cost of the controller. Such design requirements make them unattractive for cost sensitive and compact controller brushless motor control applications.

Inductance variation methods are commonly used in rotor position detection by exploiting the rotor inherent and magnetic saturation saliency properties of BLDC motors with a series of short current pulses applied to the motor phase windings [9]. The majority of prior art solutions are focused on phase current measurements to estimate the initial rotor position [9], [10]. These techniques can have several disadvantages.

Firstly, they require specialized electronic hardware circuitry to accurately measure phase current amplitudes or rise times, which increases overall system cost, size and makes them highly sensitive to electrical noise and measurement errors when operating at high temperatures, commonly encountered in practical motor control applications. Current sensing resistors required in these prior art solutions also reduce system efficiency and increase power losses.

Secondly, these current sensing techniques require a finite time to raise the inductive currents in motor windings to a measurable level necessary for detection. The resultant rotor position detection time can thus take in order of tens of ms, which can be disadvantageous in many applications, one example being professional racing of remote controlled electric vehicles where extremely fast motor starts are crucial.

Thirdly, BLDC motors with stators which exhibit unbalanced (asymmetric) phase winding inductances and resistances can lead to inaccurate initial rotor position detections when using one of these prior art inductance variation techniques based on phase current measurements, for example, current rise times. Most prior art initial rotor position detection methods also assume a BLDCM at standstill (0 RPM).

Power supply voltage variations and fluctuations during initial rotor position detection and motor start can present another great challenge for sensorless BLDCM controllers in applications where power sources with high internal resistance and motors with low phase resistance and inductance are used—for example, battery operated equipment, such as mobility, electric wheel chairs and cordless electric power tools, which experience increasing supply voltage variations and fluctuations as the battery discharges during operation. In the prior art methods based on the inductance variations measurements, it is evident that this can lead to incorrect rotor position detections and false motor starts.

Sensorless BLDCM Operation: Numerous sensorless brushless controller techniques have been developed to date to address the challenge of operating BLDCMs across their entire speed range, ie. from standstill to high speed. An overview of the most common prior art sensorless BLDC motor control solutions is provided in [5] and [6]. These generally fall into one of the following: Direct and indirect BEMF voltage detection methods; BEMF voltage integration methods (including third harmonic); Freewheeling diode conduction detection methods; Estimation and model based methods (FOC, sliding-mode observers, extended Kalman filters, model reference adaptive systems, adaptive observers, artificial neural networks); Flux linkage variation methods; and Inductance variation methods The BEMF voltage detection methods, some detailed examples which can be found in [11],[12],[13] are the simplest of all of the sensorless brushless techniques. However, since the BEMF is zero at standstill and proportional to rotational speed, these methods are known to have severe limitations when operating at low motor speeds and as such are only suitable for higher, constant speed motor applications, for example, driving motor fans and pumps. These methods generally also require additional hardware circuitry, such as described in U.S. Pat. No. 6,633,145, which increases overall controller cost.

In an attempt to address the issues of operation at low motor speeds, more complex controllers have been developed employing system model and estimation based methods to operate BLDCMs using field oriented control (FOC) [14], [15]. However, these solutions require a greater system understanding and tuning of motor and controller parameters, which significantly increase development time. These controllers also require more complex electronic hardware designs, with very accurate current measurement circuitry, increasing overall system cost, size and reducing efficiency due to power loses in current sensing resistors. The higher system complexity also makes their practical implementation more difficult and limits the range of different types of BLDCMs that they can operate with. Whilst these techniques offer an improvement over BEMF sensing methods, it is evident to those skilled in the field that they still perform inadequately at start-up and zero and low speeds and are therefore inoperable in demanding applications such as cordless electric drills where operation down to motor stall without errors is important.

An example of one of the best FOC sensorless brushless motor controller solutions used in the industry today, is the InstaSPIN-FOC controller whose method is a trade secret of Texas Instruments [16]. Whilst this controller has simplified the task of controller parameter tuning through an automated process and features an improved motor performance near zero speed and when changing direction of motor spin, it is still inoperable at zero motor speed, or with reversed rotor momentum and can have unsatisfactory start-up operation under heavy loads. Therefore, there still exists the need to further improve sensorless brushless motor operation at start-up and zero speeds.

High performing sensorless BLDCM controller solutions at zero motor speeds are based on the inductance variation methods in which changes due to motor phase inductances with respect to rotor position are detected and used as motor commutation points. One such example is described in [17] (CH698071). In this technique, rotor position detection is performed by measuring the voltage response of the open-phase terminals during PWM on-time and off-time motor driving switching intervals. From these +30° advanced timing motor commutation points are obtained, however these have the significant disadvantage of reduced output motor torque and efficiency. Furthermore, as observed in practice, this technique fails to attain reliable commutation points for all different BLDCMs available on the market and thus the number of possible applications using this method is limited in practice.

Another practical example of inductance variation based sensorless brushless motor controller is the ELMOS E910.68/88 [18]. By applying short (μsec) duration test pulses, this controller detects rotor position in motion and standstill by measuring the voltage variation at the motor's neutral point connection. However, this technique is limited to operation with wye configuration BLDCMs, which must have a fourth motor connection present. This requires an additional hardware connection which is inconvenient for most brushless motor systems and adds to their cost. This sensorless brushless control realization is also unsuitable for delta winding BLDCMs commonly used in high power motor systems, such as cordless electric power tools, because they do not have this fourth neutral point connection. Therefore, the range of possible motor applications with this controller is limited.

Starting and operating BLDCMs with reversed rotor momentum or in systems employing gearboxes that generate backlash disturbances presents a further challenge for sensorless brushless motor control applications, for example, commonly experienced in mobility equipment and cordless electric power tools. The prior art solutions may not explicitly addressed these challenges either.

Synchronous Rectification: Synchronous rectification (SR) is a technique used in inductive load PWM switching applications to reduce controller power losses. Instead of freewheeling PWM off-time currents through a diode, an active semiconductor device, such as a MOSFET or IGBT transistor with a lower resistance path is used, thus improving efficiency. A review of this method is presented in [19]. Synchronous rectification is most commonly applied in switching power converters, such as DC/DC power supplies, for example described in [20]. This method generally requires specialized electronic hardware circuitry to optimally control rectification on-time duration in response to inductive PWM off-time currents flowing during each PWM cycle, resulting in increased system cost and size and for this reason synchronous rectification is less common in BLDCM control applications. Furthermore, it is evident to the inventor of this disclosure, that implementation of optimally controlled synchronous rectifiers in PWM switching sensorless BLDCM control applications is challenging, because they can potentially interfere with sensorless detection and operation.

Practical examples of synchronous rectification in sensored and sensorless BLDCM control applications are presented in [21] and [22] respectively. The control approaches presented in these prior art solutions, however, use a simpler technique with fixed duration rectifier timing synchronized to the PWM off-time to actively control motor inductive currents. This non-optimal method activates the lower resistance rectifier devices for the entire PWM off-time duration, which can in practice lead to unwanted motor braking during operation at higher motor speeds and lighter loads, resulting in increased system energy losses. This problem is undesirable in many motor applications—one example being mobility equipment.

Regenerative Motor Braking: A general primer of regenerative braking technologies used in BLDC motors today is provided in [23], [24], [25]. There is little prior art on regenerative motor braking applications employing synchronous rectification, particularly in sensorless BLDC motor applications.

Rotor Magnetic Field Strength Measurement: Brushless DC motors use rotors consisting of magnets and to determine their condition some form of rotor magnetic field strength measurement is performed. This is desirable in many motor applications operating in high temperature environments, one example being professional racing of remote controlled electric vehicles, where extreme temperatures degrade a rotor's magnetic field and thus motor performance. Currently this testing process is highly inaccurate and subjective because the operators try to feel the strength of the magnets simply by rotating the rotor shaft with their fingers. In such applications a rotor magnetic field strength measurement is desirable to determine the magnetic state of the rotor and when it needs to be replaced.

Prior art methods of measuring the magnetic field strength of a rotor can employ expensive measurement equipment, such as described in [26] and [27]. However, these measurements must be performed manually with the system off-line and require disassembly of the motor to access the rotor, which can be labour intensive and a costly maintenance procedure. It would be desirable if an alternative could be provided.

Little prior art exists in this challenging area of brushless motor control application, particularly when attempting to address this problem with an automatic rotor magnetic field strength measurement built into the BLDC motor controller. One reason is that the existing controller solutions use unsuitable methods of approach, which make it difficult to address this challenge.

Motor Temperature Measurement: BLDCM applications operating in high ambient temperature environments or under high loads require monitoring of internal motor temperature in order to prevent motor winding damage in the event of excessive temperatures. The known prior art methods of motor temperature monitoring use either temperature sensors mechanically placed near the copper windings, non-contact measurement employing infra-red (IR) thermometry, or copper winding resistance measurement techniques, as described in [34].

These methods require either expensive sensors, such as resistance temperature detectors, thermocouples or infrared sensors, mechanical hardware to mount sensors near the motor windings, interconnection wiring and electronic circuitry to measure the motor temperature during operation, significantly increasing the system cost. It would be advantageous if an alternative was provided.

Three-Phase Power Control PCB Layout: With today's modern semiconductor switching devices, such as surface mount technology MOSFETs which are available with ultra low on-resistance values, typically less <2 m$\Omega$ [29], the layout design of the printed circuit board (PCB) containing these power switching devices to control the phase currents becomes important in three-phase power control applications, such as BLDC motors. When these power transistors are paralleled to decrease the total resistance and increase the maximum current capability of the controller, the total PCB copper track resistance can be significant, resulting in higher overall power losses and heating of the controller during high current demanding power applications.

One BLDCM industry example where controller's power PCB layout design presents a challenge is the professional R/C electric vehicle racing, where compact, small footprint PCB layouts are used to reduce the size of the controller, such as described in [30] and [31]. This size requirement places tremendous stress on thermal and cooling needs of these BLDCM controllers. Currently, motor controllers available in this industry use a rectangular shape PCB layout design with all power wires exiting on one side of the controller, for example as shown in [30] and [31] for two leading R/C motor controller manufacturers. This PCB layout and power wire connection configuration is not optimal for three-phase BLDCM controller applications. It would be advantageous if an improved layout was provided.

Another three-phase power control application where the PCB layout design is critical is BLDC motors with motor controllers integrated inside the motor, such as the R/C electric vehicles motor system described in [32]. The combined power losses of the BLDC motor stator copper windings and three-phase BLDCM power controller electronics in these motor systems, which are located in the same unit, present an even greater thermal and power cooling challenge. It is evident that in these motor systems which generally use power transistors mounted in a rectangular configuration on the PCB, such as shown in [32], further performance improvements are also possible with a different PCB layout configuration.

SUMMARY OF THE INVENTION

It is an object of the invention, in its preferred form to provide for an improved form of electric motor controller.

Initial Rotor Position State Determination

In accordance with a first aspect of the present invention, there is provided a method of optimizing the operation of a multiphase electric motor, the method including the step of: activating a series of bottom-side power switches during an off-time interval of the pulse measurement for each of a series of measurement pulse combinations In accordance with a further aspect of the present invention, there is provided a method of optimizing the operation of a multiphase electric motor, the method including the step of: measuring on-time (Vs) and off-time (Vs_off) supply voltages to correct open phase voltage measurements (Von, Voff) for power supply voltage fluctuations In accordance with a further aspect of the present invention, there is provided a method of optimizing the operation of a multiphase electric motor, the method including the step of: measuring both on-time (Von) and off-time (Voff) of open phase winding voltages to deduce the rotor position within the electric motor.

In accordance with a further aspect of the present invention, there is provided a method of optimizing the operation of a multiphase electric motor, the method including the step of: applying a preceding short duration pulses to demagnetize the multiphase stator core.

In accordance with a further aspect of the present invention, there is provided a method of optimizing the operation of a multiphase electric motor, the method including the step of: correlating the on-time (Von) and off-time (Voff) open phase voltages using on-time (Vs) and off-time (Vsoff) supply voltage measurements.

In accordance with a further aspect of the present invention, there is provided a method of optimizing the operation of a multiphase electric motor, the method including the step of: calculating an initial rotor position with a series of developed rotor position functions (RPF).

In accordance with a further aspect of the present invention, there is provided a method of optimizing the operation of a multiphase electric motor, the method including the step of: calculating initial rotor position utilizing an absolute rotor position calculation method.

In accordance with a further aspect of the present invention, there is provided a method of optimizing the operation of a multiphase electric motor, the method including the step of: determining motor rotation direction with a series of developed rotation direction functions (RDF).

In accordance with a further aspect of the present invention, there is provided a method of optimizing the operation of a multiphase electric motor, the method including the step of: applying all of the above initial rotor position detection methods to measurements made with open phase current amplitudes or rise times.

Zero to Low Speed Sensorless BLDCM Operation

In accordance with a further aspect of the present invention, there is provided a method of optimizing the operation of a multiphase electric brushless DC motor (BLDCM), the method including the step of: applying a three interval PWM phase current control method to drive the BLDCM with a predetermined phase coil commutation sequences.

In accordance with a further aspect of the present invention, there is provided a method of optimizing the operation of a multiphase electric brushless DC motor (BLDCM), the method including the step of: inserting an on-time and off-time open phase winding and power supply voltage measurement pulses at the end of three interval PWM phase current control pulses to determine rotor position (commutation points) and rotation direction.

In accordance with a further aspect of the present invention, there is provided a method of optimizing the operation of a multiphase electric brushless DC motor (BLDCM), the method including the step of: activating a series of bottom-side power switches during an off-time interval of the pulse measurements to deduce BLDCM commutation points and rotation direction In accordance with a further aspect of the present invention, there is provided a method of optimizing the operation of a multiphase electric brushless DC motor (BLDCM), the method including the step of: measuring both on-time (Von) and off-time (Voff) open phase winding voltages to deduce commutation points and rotation direction.

In accordance with a further aspect of the present invention, there is provided a method of optimizing the operation of a multiphase electric brushless DC motor (BLDCM), the method including the step of: measuring on-time (Vs) and off-time (Vs_off) supply voltages to correct open phase voltage measurements (Von, Voff) for power supply voltage fluctuations.

In accordance with a further aspect of the present invention, there is provided a method of optimizing the operation of a multiphase electric brushless DC motor (BLDCM), the method including the step of: correlating the on-time (Von) and off-time (Voff) open phase voltages using on-time (Vs) and off-time (Vsoff) supply voltage measurements.

In accordance with a further aspect of the present invention, there is provided a method of optimizing the operation of a multiphase electric brushless DC motor (BLDCM), the method including the step of: calculating zero to low speed sensorless BLDCM commutation points with a predetermined commutation point function (CPF).

In accordance with a further aspect of the present invention, there is provided a method of optimizing the operation of a multiphase electric brushless DC motor (BLDCM), the method including the step of: calculating zero to low speed sensorless BLDCM commutation points obtained from pre-determined possible combinations of correlated on-time (Von) and off-time (Voff) open phase voltage measurements of said motor.

In accordance with a further aspect of the present invention, there is provided a method of optimizing the operation of a multiphase electric brushless DC motor (BLDCM), the method including the step of: determining motor rotation direction during sensorless BLDCM operation with a method consisting of rotor position functions (RPF) and/or rotation direction functions (RDF).

In accordance with a further aspect of the present invention, there is provided a method of optimizing the operation of a multiphase electric brushless DC motor (BLDCM), the method including the step of: utilizing correlated on-time (Von) and off-time (Voff) measurements from two consecutive three-interval PWM cycles of the motor to reduce the number of open phase voltage measurement pulses required to calculate commutation point functions (CPFs) and rotation direction functions (RDFs).

In accordance with a further aspect of the present invention, there is provided a method of optimizing the operation of a multiphase electric brushless DC motor (BLDCM), the method including the step of: applying a quasi field oriented control (QFOC) method to increase motor torque during zero to low sensorless BLDCM operation.

Low to High Speed Sensorless BLDCM Operation

In accordance with a further aspect of the present invention, there is provided a method of optimizing the operation of a multiphase electric brushless DC motors (BLDCM), the method including the step of: using a CPFmax value measured during zero to low speed sensorless BLDCM operation to obtain quasi 0° timing L→H and H→L commutation point (CP) voltage thresholds for low to high speed sensorless BLDCM operation.

In accordance with a further aspect of the present invention, there is provided a method of optimizing the operation of a multiphase electric brushless DC motors (BLDCM), the method including the step of: using the CPFmax value to obtain an optimum commutation point with automatic motor temperature compensation In accordance with a further aspect of the present invention, there is provided a method of optimizing the operation of a multiphase electric brushless DC motors (BLDCM), the method including the step of: applying a software controlled PWM synchronous rectification method during the PWM off-time interval to increase controller efficiency and motor torque.

In accordance with a further aspect of the present invention, there is provided a method of optimizing the operation of a multiphase electric motor, the method including the step of: applying the above methods to high-side only, low-side only or alternate low-high side PWM switching topologies during sensorless BLDCM operation Rotor Magnetic Field Strength Measurement In accordance with a further aspect of the present invention, there is provided, in a power controller for controlling a motor system, a method of measuring the rotor magnetic field strength, the method including the step of: using the maximum computation point function value measured from computation point function value measurements during zero to low speed sensorless BLDCM operation to obtain an indication of the rotor magnetic field strength Motor Temperature Measurement In accordance with a further aspect of the present invention, there is provided, in a power controller for controlling a motor system, a method of measuring the motor temperature, the method including the step of: using a maximum computation point function value measured from computation point function during zero to low speed sensorless BLDCM operation to obtain an indication of the motor temperature Regenerative Motor Braking In accordance with a further aspect of the present invention, there is provided a method of optimizing the operation of a multiphase electric motor, the method including the step of: using a software controlled PWM synchronous rectification method during a PWM off-time interval to increase controller efficiency and amount of energy returned to the power source during motor braking In accordance with a further aspect of the present invention, there is provided a method of optimizing the operation of a multiphase electric motor, the method including the step of: applying a software controlled synchronous rectification method to high-side only, low-side only or alternate low-high side PWM switching topologies during regenerative motor braking.

In accordance with a further aspect of the present invention, there is provided a method of optimizing the operation of a multiphase electric motor, the method including the step of: applying the motor regenerative braking methods in all electric motor applications, such as sensorless brushless, sensored brushless and brushed motors Software Controlled Synchronous Rectification In accordance with a further aspect of the present invention, there is provided a method of optimizing the operation of a multiphase electric motor, including implementing a software controlled synchronous rectification including the step of: (a) implementing a controlled synchronous rectification duration ($T_{SR}$) during which the rectifier power switch is activated; (b) providing at least two distinct modes of operation: when $T_{SR}$<PWM off-time period ($T_{OFF}$) and when $T_{SR}=T_{OFF}$; (c) measuring a feedback voltage ($V_{FB}$) at the end of synchronous rectification interval ($T_{SR}$); and (d) using feedback voltage to optimally regulate the active synchronous rectification duration ($T_{SR}$).

In accordance with a further aspect of the present invention, there is provided a method of optimizing the operation of a multiphase electric motor, the method including the step of: applying a software controlled synchronous rectification method to high-side only, low-side only or alternate low-high side PWM switching topologies during inductive load switching applications.

In accordance with a further aspect of the present invention, there is provided a method of optimizing the operation of a multiphase electric motor, the method including the step of: applying a software controlled PWM synchronous rectification method in all inductive load switching applications such as DC/DC power supplies, during motor driving and braking operations of brushed, sensorless brushless and sensored brushed motors Radially Symmetrical Three-Phase Optimized Power Control PCB Layout In accordance with a further aspect of the present invention, there is provided a method of optimizing the layout of power control circuitry, of a multi phase power controller, the method including the step of: placing groups of single or paralleled power transistors (low-side and high-side switching) belonging to each phase in a radial symmetry about the center of a PCB.

In some embodiments, the power transistors are placed on the top or bottom PCB layers.

In some embodiments, the method can include placing phase output power wire PCB connections in the middle of each power transistor group geometry to physically reduce the PCB copper track resistance in each phase.

In some embodiments, the method can include only the low-side or the high-side switching power transistors on one side of the PCB. In some embodiments, the method can include the power transistors are placed on both the low-side or the high-side switching power transistors on one side of the PCB In accordance with a further aspect of the present invention, there is provided a method of optimizing the layout of power control circuitry, of a multi phase power controller, the method including the step of: applying a radially symmetrical PCB design in three-phase power control applications such as R/C electric vehicle BLDC motor controllers and BLDC motors with the PCB and controller hardware built inside the motor.

BRIEF DESCRIPTION OF THE DRAWINGS

Embodiments of the invention will now be described, by way of example only, with reference to the accompanying drawings in which.

DETAILED DESCRIPTION

Figure 1:
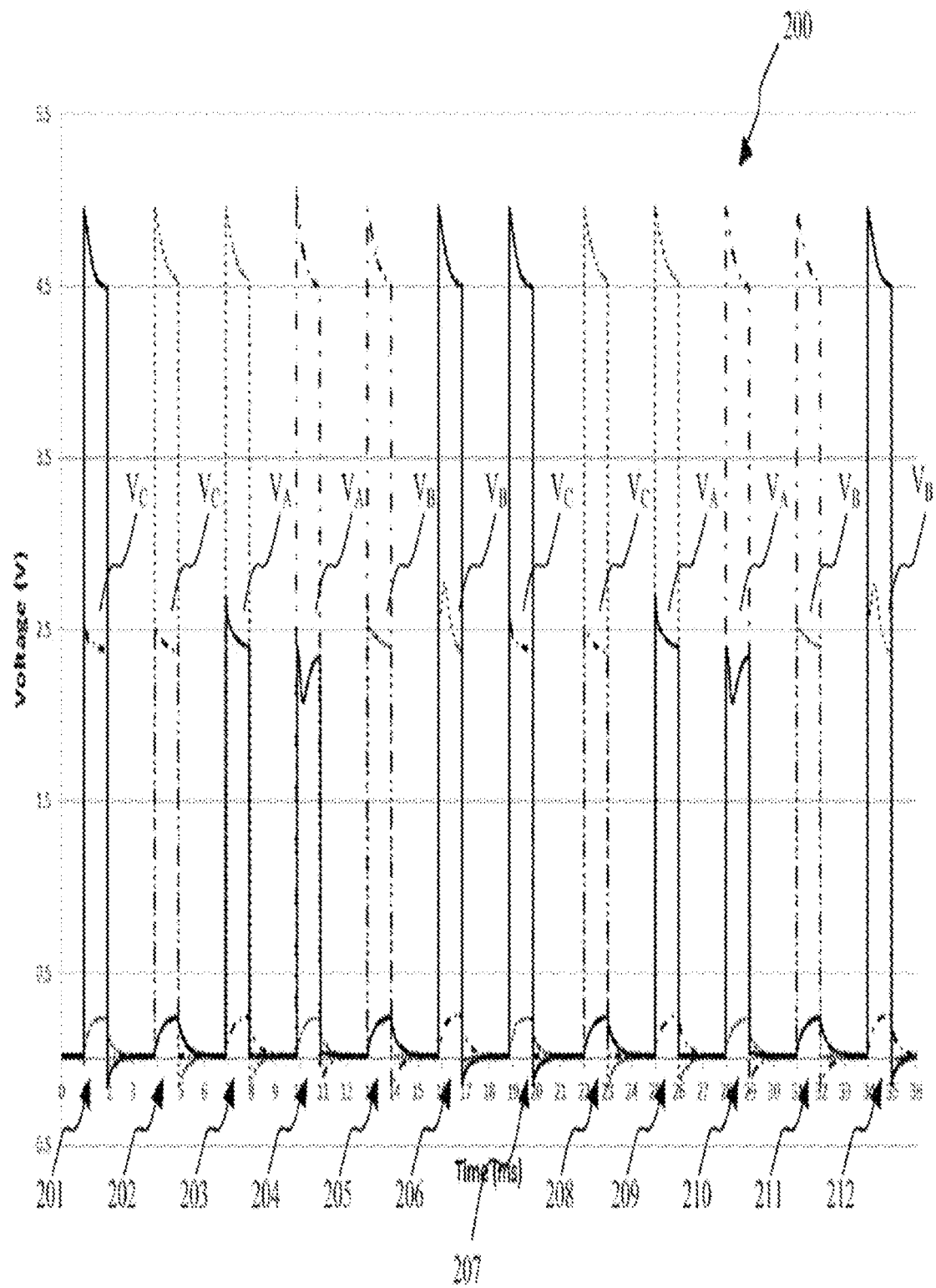
FIG. 1 illustrates a disclosed hybrid sensorless brushless DC motor controller operation flowchart.

The embodiments are directed to the area of control of electric brushless DC motors (BLDCMs), with a particular focus on the sensorless BLDCM control application, constraint and optimization for compact and efficient dynamically controlled motor systems—one example being cordless electric power tools. The application and technology relate generally to the challenges of creating effective and efficient sensorless BLDCM control to manage the performance and life cycle of such electric motors. A set of challenges for sensorless BLDCM controllers are apparent, which translate across a large set of applications and realizations, these are:

Motor start at standstill and in motion; Motor start with reversed rotor momentum; Motor start in presence of external load disturbances, gearbox backlash; Motor start time and response; Motor operation and torque control down to stall (0 RPM), at low speed, with reversed rotor momentum, dynamic loads and external disturbances; Controller operation with a broader range of BLDCMs available on the market (salient and non-salient pole, wye and delta winding, asymmetric stator phase winding inductances and resistances); Controller efficiency during motor operation, regenerative motor braking; Energy return to the power source during regenerative motor braking; Controller sensitivity to supply voltage and temperature variations, noise; Controller setup and tuning, integration time; Controller electronic circuit design complexity, size, cost; Motor and controller system reliability, operation and maintenance cost; Rotor magnetic field strength measurement in real time and monitoring over life time of operation; Motor temperature measurement and monitoring in real time; Printed circuit board (PCB) layout optimization in three-phase power control applications.

The embodiments provide for sensorless BLDCM controller designs that have improved performance, operational behaviour and greater possibility across one or more of these areas of challenge. As such, the disclosure of the embodiments is applicable to a wide area, and more broadly applicable to the application of BLDCMs across applications, including and not limited to power tools, locomotion, mobility, robotics, automation and control, automotive, medical, consumer, computer, hobby, etc. A general primer of the breadth and applicability of the areas of interest and application of BLDCMs can be found in The following prior art references provide general background information in the field.

[1], [2], [3].

The embodiments provide an initial rotor position detection which presents a method that is insensitive to phase winding asymmetries in BLDCMs.

The embodiments provide an improved inductance variation technique employing only voltage measurements to detect the initial rotor position and as such do not require any additional electronic circuitry. The disclosed technique also makes it possible to detect the initial rotor position of a wide range of BLDCMs extremely fast, typically in <1 ms, whilst doing so with greater accuracy and precision.

The embodiments specifically address the challenges of detecting the initial rotor position with the motor already spinning at very low speeds, for example, below the BEMF voltage measurement threshold, or when starting with a reversed rotor momentum. These sensorless brushless motor control challenges are frequently encountered in applications, such as mobility equipment and cordless electric power tools.

The synchronous rectification method disclosed in the embodiments provides a near optimal, software controlled approach that integrates seamlessly into the sensorless BLDCM operation during PWM switching and dynamic regenerative motor braking. This is achieved without any additional electronic hardware circuitry, leading to further improvements in controller output efficiency under all motor loads. It is evident that the disclosed synchronous rectification method can also be applied to any other inductive PWM switching applications. For example, DC/DC power supplies, brushed and sensored brushless motors.

The novel software controlled synchronous rectification technique disclosed in the embodiments can be used to increase controller efficiency and the amount of energy recycled back into the power source during motor braking. It can thus improve the performance of battery operated motor applications, such as mobility equipment, by increasing the time before battery recharging is required.

An innovative step of the disclosed controller embodiments is the ability to measure a BLDCM's rotor magnetic field strength during operation without requiring any additional hardware or electronic circuitry. It is also possible to monitor the rotor magnetic field strength over the entire life cycle of operation. In many brushless motor applications such a built-in, automatic rotor measurement can have the advantage of decreasing operation and maintenance costs and increasing system performance.

The embodiments disclose a novel BLDC motor temperature measurement that does not require any additional temperature sensing equipment, hardware or electronic circuitry. The disclosed method uses electrical motor measurements obtained during sensorless BLDCM mode of operation from which reliable motor temperature measurements in real time of operation are obtained.

To address power and thermal loss challenges in three-phase power control applications, the embodiments also disclose a novel PCB layout design consisting of power transistors placed in a radially symmetrical configuration that achieves a significant reduction in the PCB copper track resistance in each phase compared to the prior art, reducing power and thermal losses and increasing controller efficiency.

The sensorless brushless DC motor controller of the preferred embodiment exploits the inductance variations which exist in BLDC motors due to rotor inherent and magnetic saturation (RIMS) saliency. The disclosed controller methods improve the accuracy, precision and speed of initial rotor position detection compared to the prior art and extend the inductance variation properties to novel commutation point detection methods for sensorless operation of BLDC motors at zero and high speeds. The disclosed sensorless BLDCM control operation is highly robust during start-up and operation at near zero speed, providing torque control down to motor stall and operation with reversed rotor momentum with a broader range of wye and delta configuration BLDCMs. The disclosed sensorless BLDCM controller is also independent of motor parameters and uses simplified hardware circuitry that requires only voltage measurements, making it easier and cheaper to implement in practical applications.

As will be further described below, the embodiments disclose a hybrid sensorless BLDCMs control approach, as illustrated by the flow chart 1 of FIG. 1, to address a set of BLDC motor control system challenges across a large set of applications and realizations and extends motor controller innovation in the following key areas: Initial rotor position detection; Zero to low speed sensorless BLDCM operation; Low to high speed sensorless BLDCM operation; BLDC motor regenerative braking; PWM synchronous rectification; and Rotor magnetic field strength and motor temperature measurement.

To address the controller challenge of robust sensorless brushless operation with the broadest possible range of BLDC motors, two different controller embodiments are disclosed with the second embodiment denoted with the Δ suffix.

To proceed with the description, it is instructive to introduce some brushless motor controller background information.

A Sensorless BLDCM Controller Circuit

Figure 2:
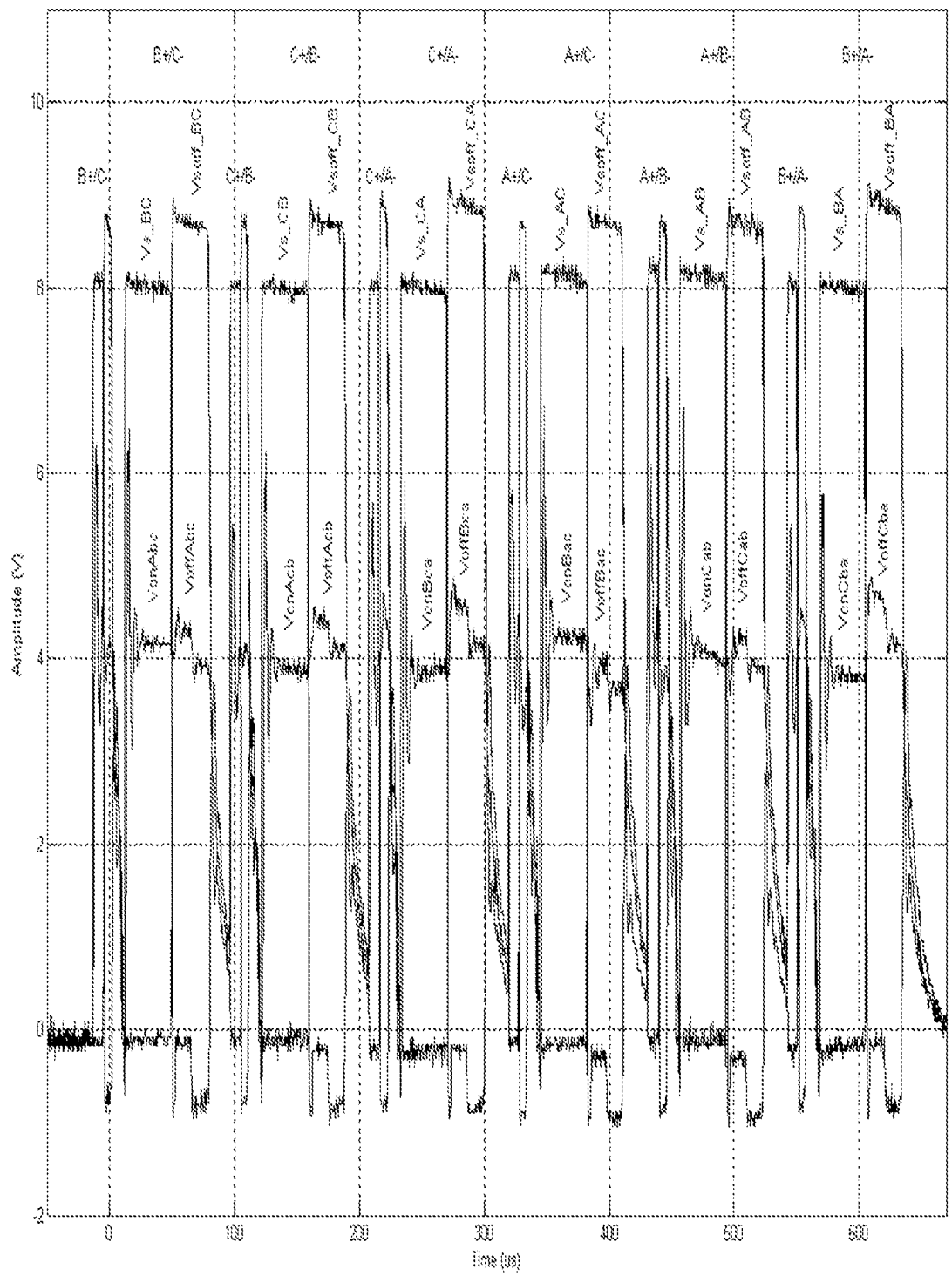
FIG. 2 illustrates a disclosed sensorless brushless DC motor controller circuitry.

The basic equivalent circuit for the control of the BLDCM according to the disclosed embodiments is illustrated 20 in FIG. 2. The sensorless BLDCM control system includes:

BLDC motor 21 with a stator consisting of plurality of coil phase windings, wye or delta phase winding configuration (FIG. 2 depicting a delta winding), a rotor 22 which includes a permanent magnet, arranged to rotate in or around the stator of the motor.

BLDC motor switching control circuit 23 consisting of plurality of semiconductor power transistor switches (A_L, A_H, B_L, B_H, C_L, C_H) such as MOSFETs or IGBTs to control the phase winding currents in a synchronized manner with the rotor position and includes freewheeling semiconductor diodes e.g. 24 to conduct off-time switching inductive currents.

Power transistor gate control circuit consisting of plurality of gate drivers (A_L, A_H, B_L, B_H, C_L, C_H) 27 to optimally control the power transistors 23 during switching operation. Additionally, an Analog to digital converter circuit 29, consisting of high speed plurality of analog voltage measurements (Va, Vb, Vc), which can include voltage resistor divider networks to reduce the sampled analog voltages to an acceptable level for measurement with an ADC and capacitors to reduce measured analog voltage bandwidth and filter out electrical noise.

A Microcontroller 28 provides various functionalities according to the various embodiments. The controller may comprise an integrated high speed ADC circuit, volatile memory such as DRAM, and non-volatile memory such as PROM, EPROM, EEPROM, FLASH, MRAM, PCRAM, and other functionalities such as input and output interfacing, and communication ports etc.

Electrical voltage source (Vs) such as a transformer or a switching power supply or a battery.

Rotor Inherent Saliency

Figure 3:
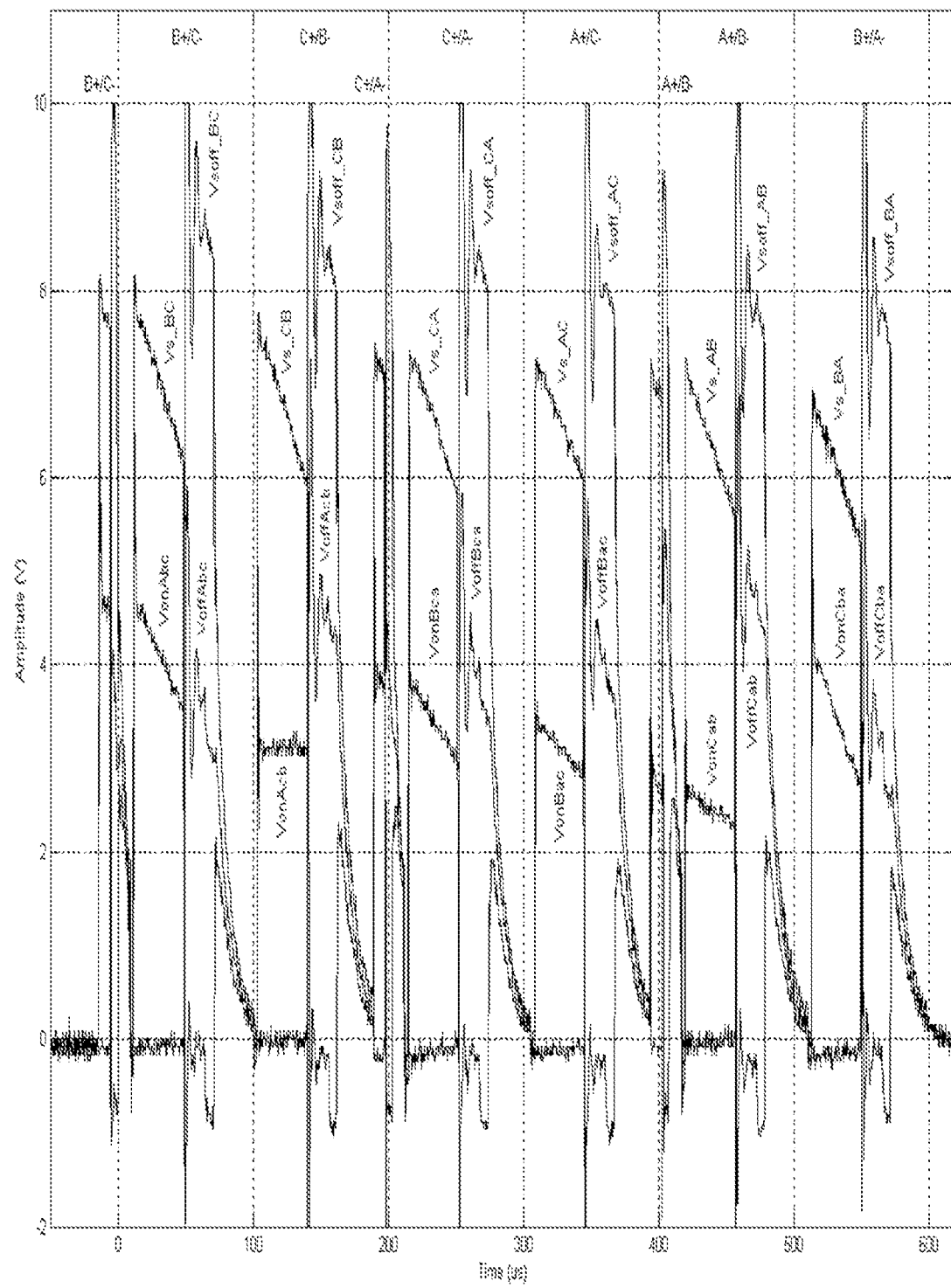
FIG. 3 illustrates a phase winding inductance variation due to rotor inherent saliency (prior art).

If the flux from the permanent magnets in the rotor is large enough to magnetically saturate the stator iron in a BLDC motor, then a variation in the rotor's direct and quadrature magnetic axes with respect to the stator coils leads to a variation in phase inductance shown 30 in FIG. 3. When the permanent magnet rotor flux is fully aligned (direct) with the stator coil the iron stator core is maximally saturated which reduces the coil's inductance (90° and 270° rotor positions 31, 32). When the permanent magnet rotor flux is perpendicular (quadrature) to the stator coil, no iron stator coil saturation occurs and the inductance is largest (0° and 180° rotor positions 33, 34).

Magnetic Saturation Saliency

Figure 4:
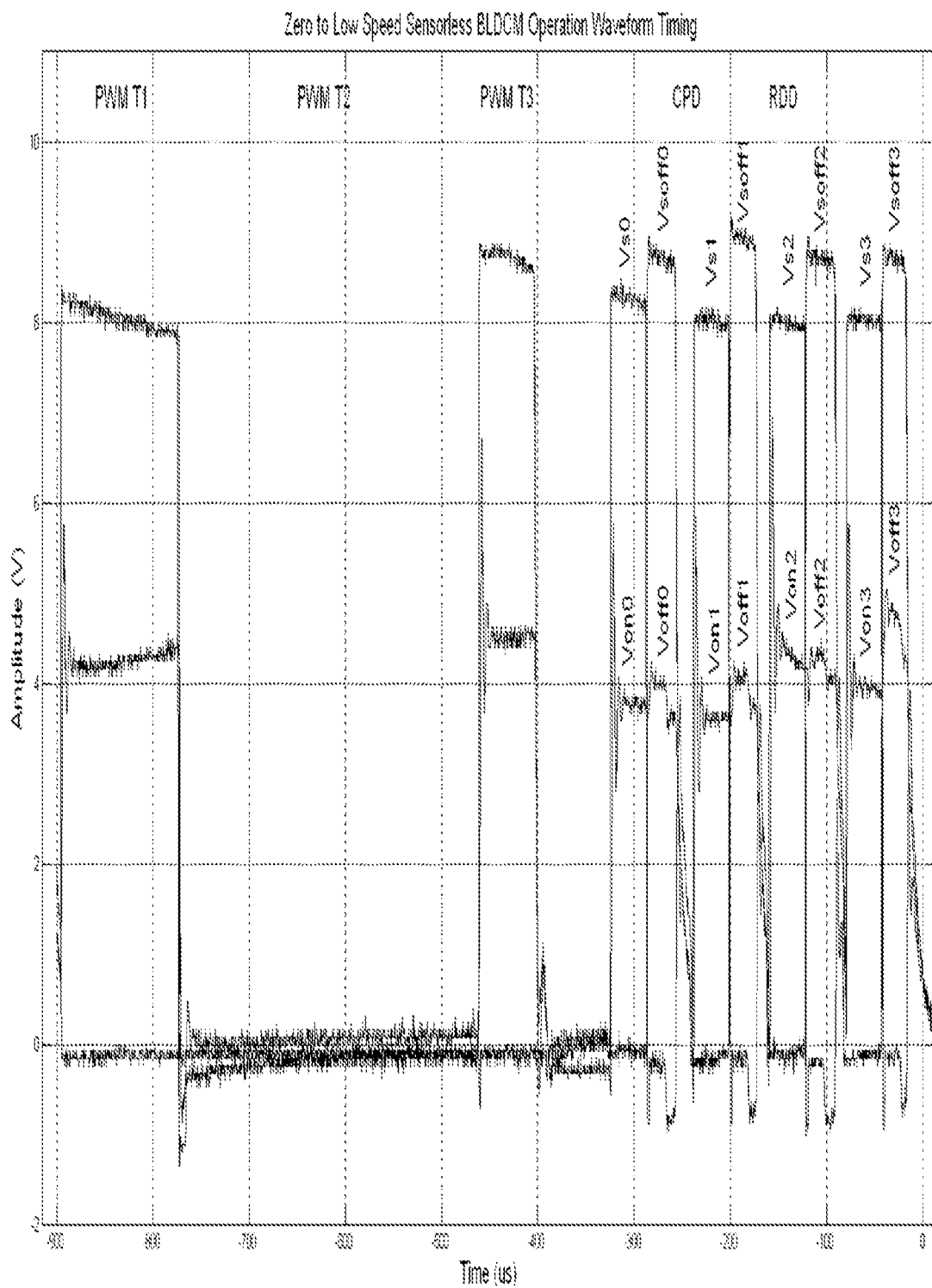
FIG. 4 illustrates a phase winding inductance variation due to rotor inherent and magnetic saturation saliency (prior art).

If current is flowing through the phase coils of a permanent magnet BLDC motor, then the flux produced by the phase coils in the stator interacts with the flux from the permanent magnet rotor, leading to additional variations in the troughs of the phase inductances as illustrated 40 in FIG. 4. When the north-pole is aligned with the phase coil, the current increases the flux linked by the coil, resulting in increasing stator saturation and slightly decreasing the phase inductance (270° rotor position 41). When the south-pole is aligned with the coil, the current in the phase coil decreases the flux linked by the coil, decreasing stator saturation and slightly increasing the phase inductance (90° rotor position 42). By measuring these variations in inductance of the coils, it is possible to detect the position of the permanent magnet rotor [9].

Inductance Variation Measurement

Figure 5:
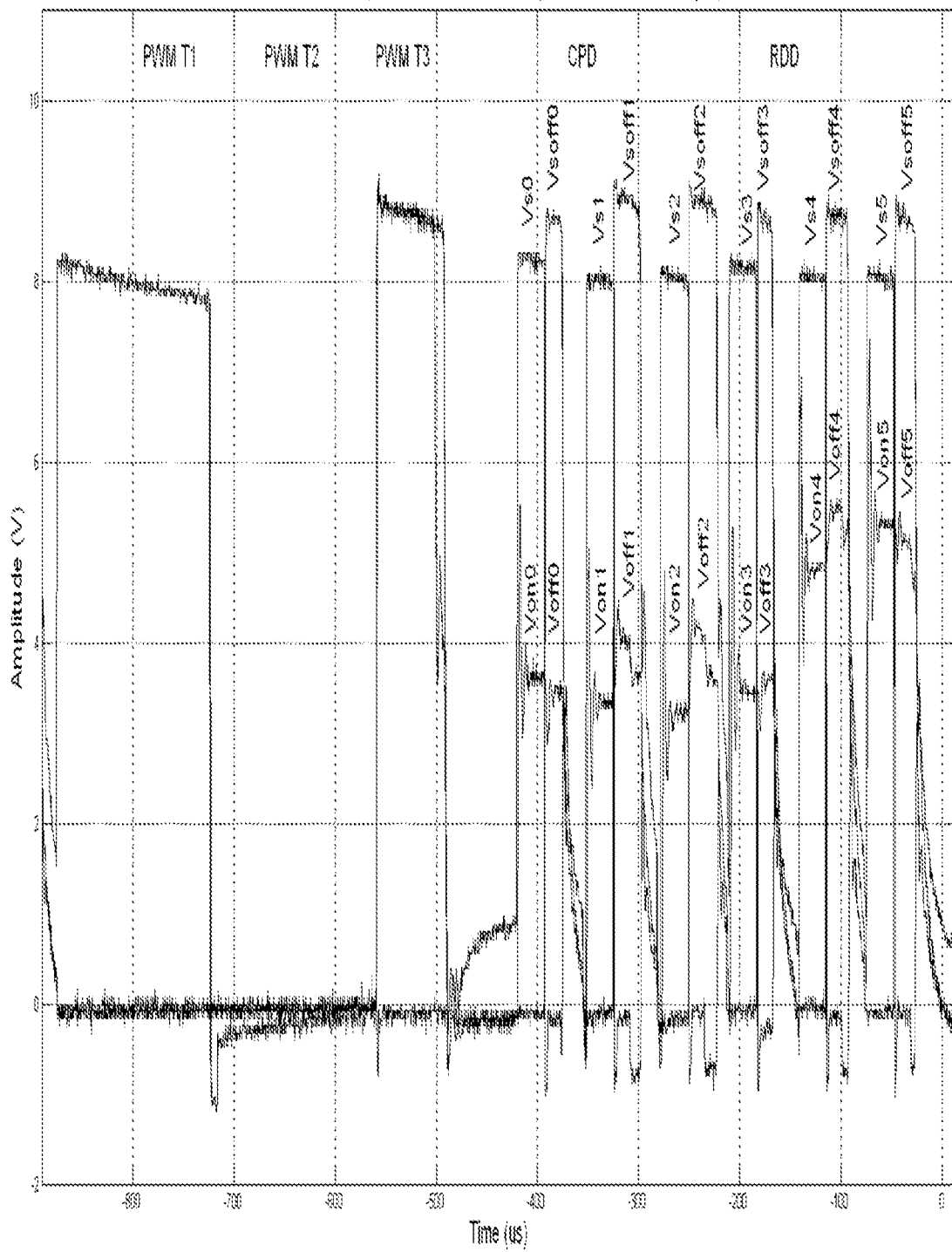
FIG. 5 illustrates a phase winding inductance variation detection using fixed current threshold to measure current rise times (prior art).
Figure 6:
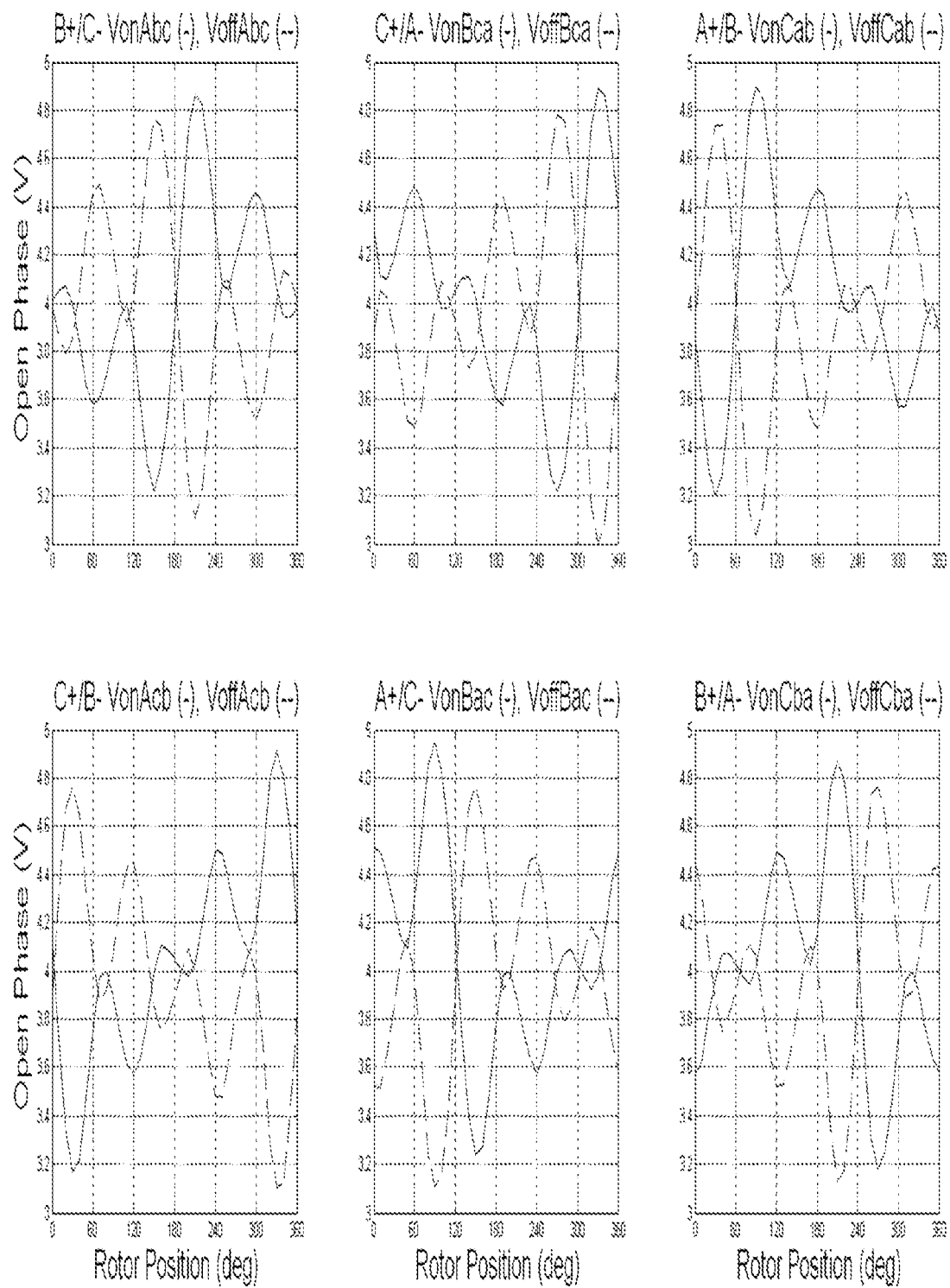
FIG. 6 illustrates a phase winding inductance variation detection using fixed current rise time to measure current amplitudes (prior art).

In the embodiments, phase coils inductance variation due to RIMS saliency is measured indirectly as a voltage variation at the output of inactive (open) phase coil after applying a short duration current pulse to a pair of phase coils. This open phase winding voltage measurement technique is different to the prior art, such as disclosed in U.S. Pat. Nos. 5,028,852, 5,191,270, 6,172,498, 6,850,863, 7,023,155, 7,489,096, 7,592,761, 7,944,159, WO 2012/010065, U.S. Pat. Nos. 8,400,086, 8,796,974, where current variations due to phase inductance changes are measured in deducing the rotor position, for example as illustrated in FIG. 5 and FIG. 6. A significant disadvantage of these prior art methods is the necessity for phase current measurement circuitry, consisting of current sensing resistors, voltage amplifiers and comparators. These increase controller cost and size. Due to the low amplitude voltage nature of signals used in such phase current measurements, the resultant circuitry is also more sensitive to electrical noise and voltage drift and offset errors, which can occur due to high temperature variations in motor control applications. These prior art methods can lead to inaccurate rotor position detections during motor start-up in demanding applications.

Figure 7:
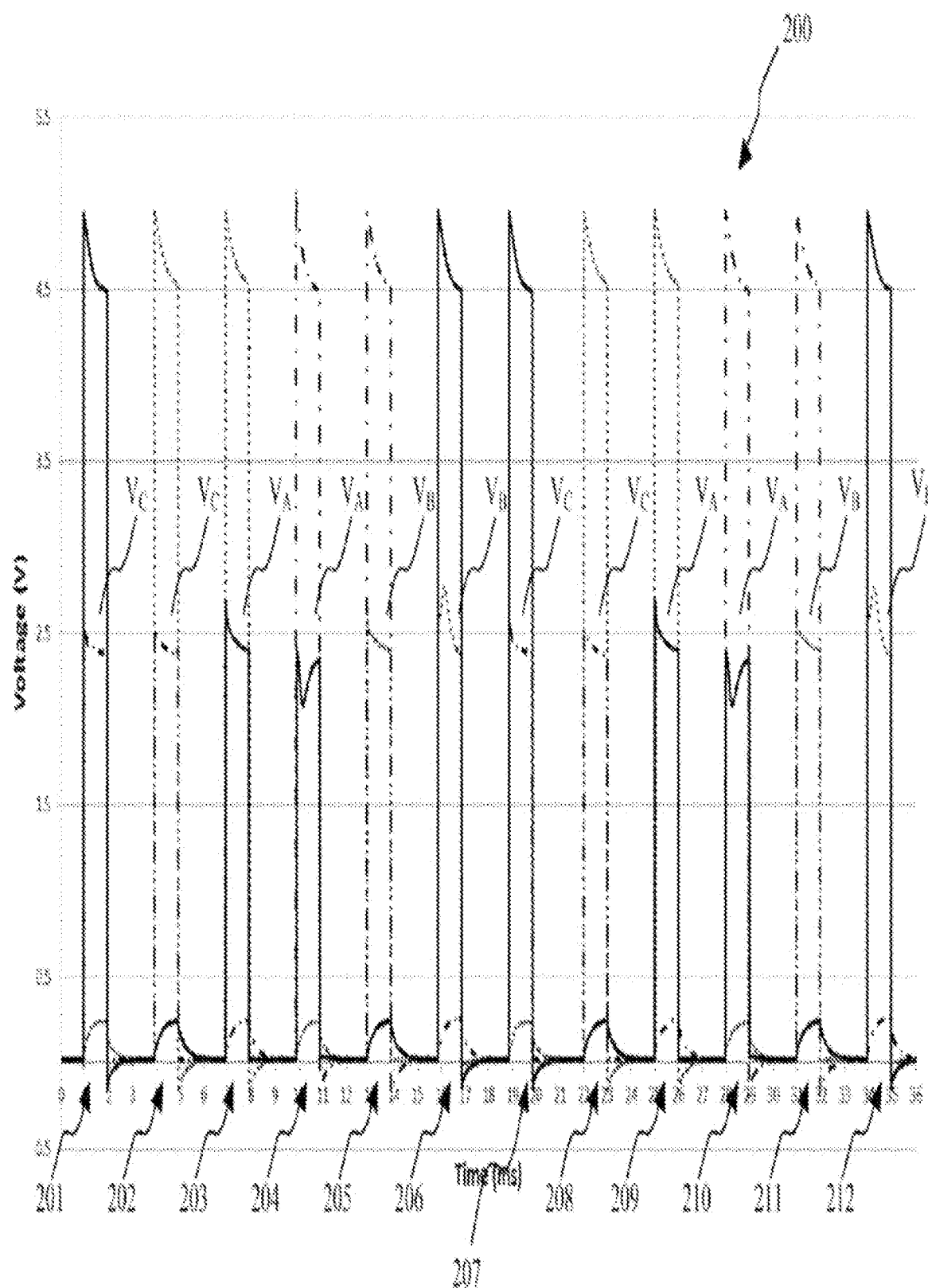
FIG. 7 illustrates a phase winding inductance variation detection using open phase on-time voltage measurements (prior art).

Some examples of inductance variation based measurement techniques from the prior art employing open phase voltage measurements are disclosed in U.S. Pat. Nos. 6,344,721, 6,650,082 and US2014/0015458. It is evident that these techniques only employ voltage measurements at the open phase winding during the on-time period of pulse to estimate the rotor position, as shown in FIG. 7 of disclosure US2014/0015458.

In contrast to the prior art, the present embodiments use both the on-time and off-time open phase winding measurements in the generated pulses to ascertain the rotor position. In an attempt to address a set of challenges in the area of sensorless BLDCM controllers, the embodiments offer several advantages, including: increased rotor position angle detection accuracy; faster rotor position detection time; rotor position detection independent of rotor speed; insensitivity to stator phase winding inductance and resistance asymmetries in BLDC motors.

Initial Rotor Position Detection

This section discloses the initial rotor position detection methods developed. A description of the pulse generation and on-time and off-time phase voltage measurements for each phase coil pair combination is presented first. This is followed by a description of novel rotor position functions (RPF) and rotation direction functions (RDF) used to calculate accurate rotor position and spin direction.

The key constituents of the initial rotor position detection methods disclosed in this section are: On-time and off-time open phase voltage measurement; Rotor position functions (RPF); Enhanced rotor position functions (ERPF); Absolute angle rotor position calculation (θ); and Rotation direction functions (RDF).

Figure 16:
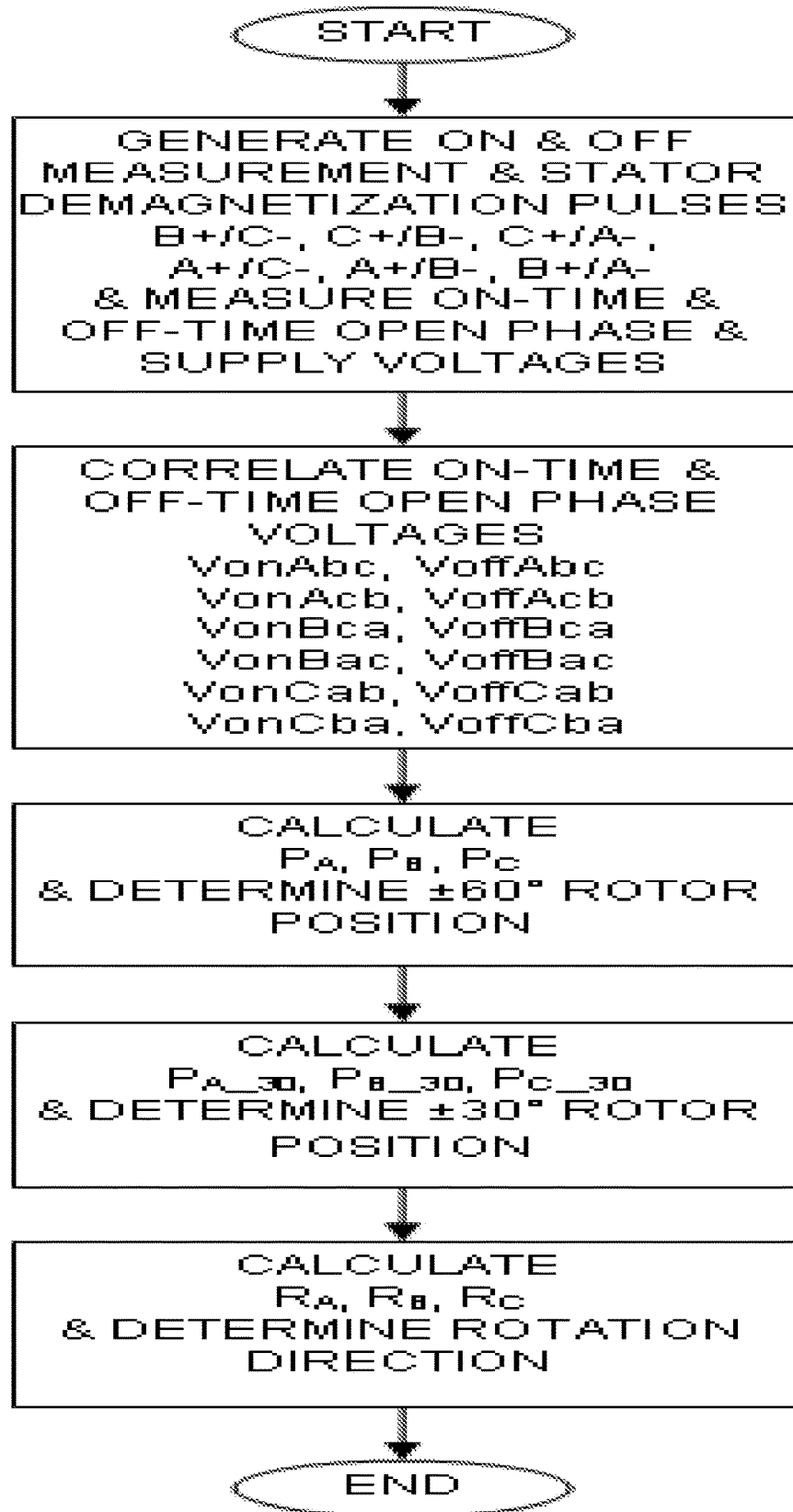
FIG. 16 illustrates a rotor position and rotation direction detection flowchart with RPFs.
Figure 17:
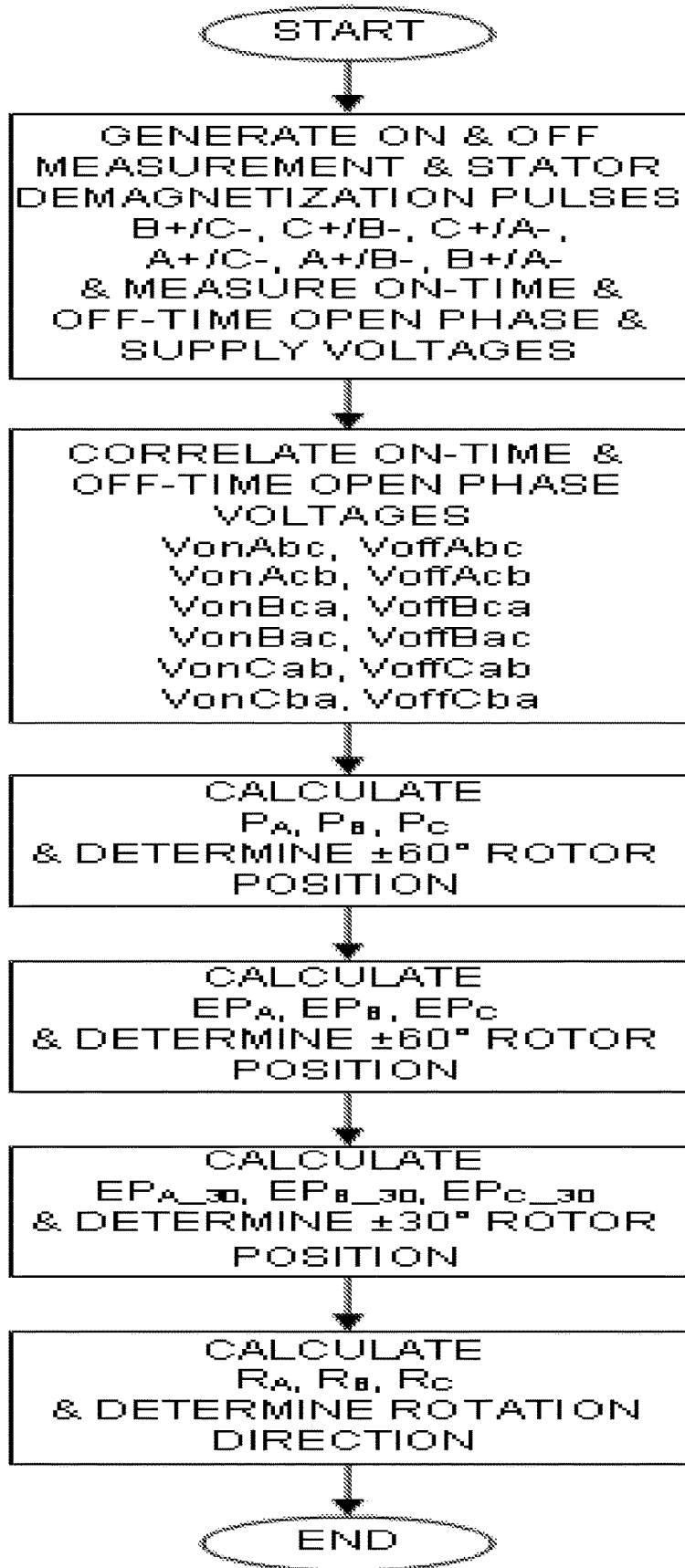
FIG. 17 illustrates a rotor position and rotation direction detection flowchart with RPFs and ERPFs.
Figure 18:
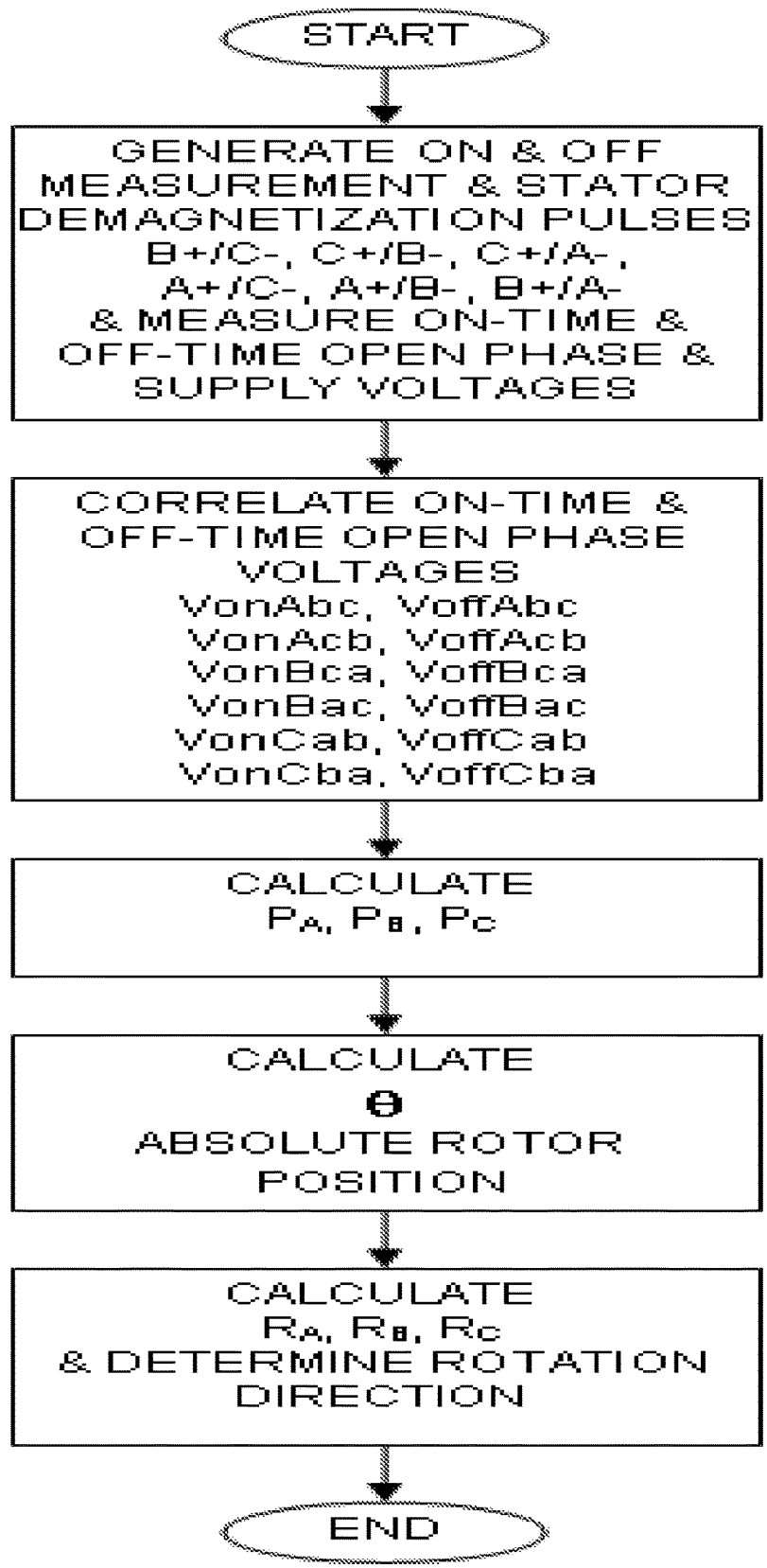
FIG. 18 illustrates an absolute rotor position calculation and rotation direction detection flowchart.

The operation flowcharts of the three different initial rotation direction detection methods disclosed in this section are illustrated in FIG. 16, FIG. 17 and FIG. 18. For each of these, two initial rotor position detection calculation embodiments are also disclosed, with the 2nd embodiment denoted with the Δ suffix.

(a) On-Time and Off-Time Open Phase Voltage Measurement

Figure 8:
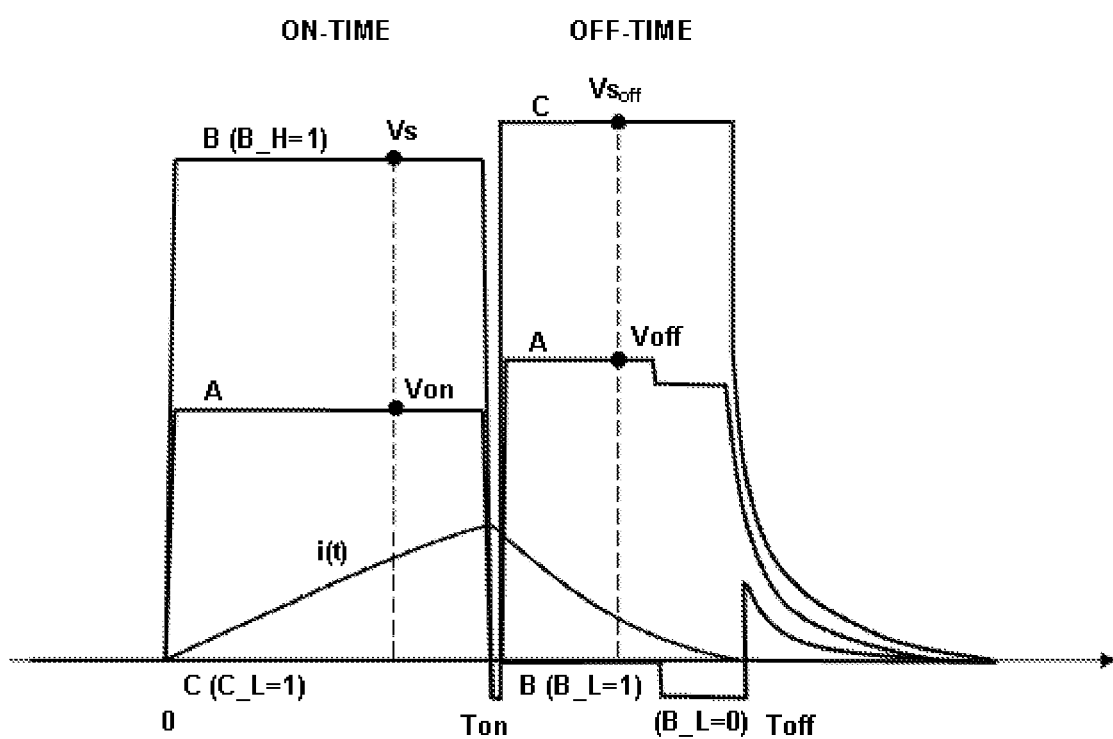
FIG. 8 illustrates a phase winding inductance variation detection employing a short duration phase coil excitation pulse and on-time and off-time open phase winding and supply voltage measurements.

Both the on-time and the off-time voltage responses are measured at the inactive phase coil winding for each of the six possible phase coil pair combination (B+/C−, C+/B−, C+/A−, A+/C−, A+/B−, B+/A−) and then consequently used to calculate the rotor position. This is one of the key advantages. An example of the voltage and current waveforms generated in the disclosed method for the case when B+/C− phase coils (B_H and C_L power transistors in circuit diagram in FIG. 2 are active) are pulsed for a short duration resulting in a current flowing through the phase windings, is illustrated in FIG. 8. The on-time and off-time (Von and Voff) open phase voltage levels depend on inductances of phase windings B and C which vary with rotor position due to RIMS variations, effectively forming a voltage divider circuit. This first step of the disclosed initial rotor position detection is shown in the flowcharts in FIG. 16, FIG. 17 and FIG. 18, and it is the same for all three different detection methods presented in later sections.

(i) On-Time Measurement Pulse Interval

The on-time (Ton) pulse measurement duration, shown in FIG. 8 is adapted to the BLDC motor's electrical time constant (τ), which can be measured off-line or during operation. In practical BLDC motors tested, τ values were measured in the range between 150 μs to 1500 μs. One of the requirements for this inductance variation voltage measurement method is that Ton<<τ. Accordingly, Ton duration in the range 20 μs-70 μs was found to work well in practice. This on-time pulse duration is significantly shorter compared to other techniques which are, in turn, known to generate on-time pulse as long as 1 ms or even greater, for example as shown in the prior art FIG. 7. The embodiments therefore have a significantly faster initial rotor position detection time.

During the on-time interval of the generated pulse, the Von measurement is taken at the open phase winding. In the example shown in FIG. 8, this would be performed at the A open phase winding. In practice, the most accurate results are obtained when this measurement is performed towards the end of the on-time pulse interval, for example when t>Ton/2. This allows the current in phase windings to reach to an appreciable level and induce measurable voltages in the phase windings and also allows any switching voltage transients at the start of each pulse in the open phase windings to decay, for example as can be observed in the measurement sequence in FIG. 9. Accurate open phase voltage measurements can then be obtained.

Figure 10:
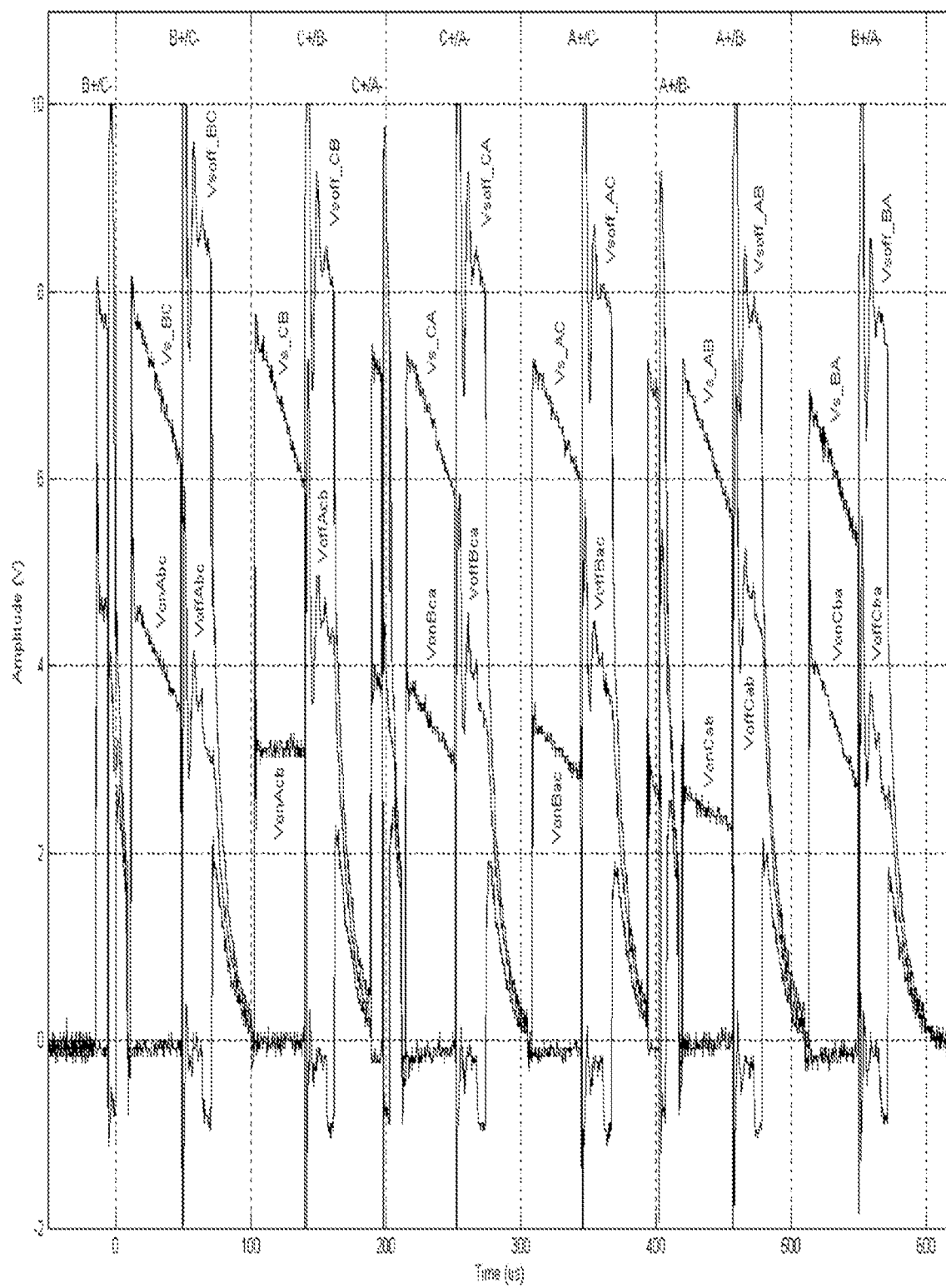
FIG. 10 illustrates an initial rotor position detection phase winding pulsing sequence employing on-time and off-time open phase and supply voltage measurements with three preceding stator core demagnetization short duration pulses for the case when supply voltage is fluctuating.

In addition to the open phase voltage measurement (Von), the supply voltage rail (Vs) is also measured during this on-time pulse interval. This is performed to correct the open phase voltage measurements of all phase coil pair combinations for any fluctuations in the supply voltages, for example as shown in FIG. 10, which can occur with low internal resistance supply sources such as batteries. This challenge does not appear to have been addressed in the prior art. This voltage correlation procedure is explained in more detail below.

(ii) Off-Time Measurement Pulse Interval

After the on-time interval has elapsed the B_H and C_L power transistor devices are turned off and B_L transistor is turned on, as illustrated in the example of FIG. 8. Compared to the prior art methods which simply turn-off both of these power transistors after the completion of on-time pulse interval, this disclosed technique has two distinct advantages: 1) Reduced power losses in the bottom phase coil (B) power transistor (B_L) as a result of bypassing the freewheeling diode which normally conducts the inductive turn-off current; and 2) Bottom phase coil (B) voltage reference is set to the ground rail (0V) instead of the freewheeling diode voltage drop (−Vd) allowing open phase voltage correlation calculations to be performed to correct the open phase winding measurements for any supply voltage fluctuations during initial rotor position detection, for example as shown in FIG. 10.

The off-time (Voff) voltage measurement is performed as soon as the turn-off switching transients in the open phase winding have decayed away. In practice, this was found to typically occur around 5 μsec-15 μsec after the end of on-time (Ton) period. After the completion of Voff open phase winding voltage measurement, the bottom power transistor (B_L) is turned-off, as illustrated in FIG. 8.

During the off-time interval the current i(t) in phase coils B and C flows through the freewheeling diode of power transistor C_H until it decays to zero, as depicted in FIG. 8. This action also returns back some energy to the power supply voltage source (Vs), which can benefit battery operated applications. Since the inactive C_H transistor's freewheeling diode is conducting the current i(t) during this off-time period, the voltage seen at the C phase winding is equal to the supply voltage (Vs) plus the diode voltage drop (Vd), that is Vsoff=Vs+Vd.

To correlate the measured off-time open phase voltage to the one measured during on-time pulse interval, the embodiment also performs a voltage measurement at the C phase winding, as shown in FIG. 8, which sees a positive voltage (Vsoff) during this off-time interval when the freewheeling diode in transistor C_H is conducting the current.

(iii) On-Time and Off-Time Measurement Pulse Interval Extensions

It should be noted that it is also possible to use the same method to measure the on-time (Von) and off-time (Voff) open phase voltages with respect to the supply voltage (Vs) rail, instead of the ground (0V) voltage rail. In this case, during the off-time pulse measurement interval, the phase coil with the positive voltage polarity is actively connected to the supply voltage (Vs) rail via the high-side power transistor, by turning it on. The phase coil with the negative voltage polarity is disconnected from the ground rail (0V) by turning-off the low-side power transistor. This allows the decaying phase current i(t) to circulate to the ground voltage rail via the low-side power transistor's internal freewheeling diode. To illustrate this variation in the disclosed off-time interval pulse measurement method with a practical example in FIG. 8, the positive voltage polarity phase coil (C) is instead connected to the supply voltage (Vs) rail by turning-on power transistor C_H. The phase coil with negative voltage polarity (B) is disconnected from the ground rail (0V) by turning-off power transistors B_L. The internal body diode of power transistor B_L freewheels the decaying current i(t) and clamps the voltage at phase coil B to −Vd volts with respect to the ground rail (0V). The voltage seen at phase winding B, with respect to the supply voltage rail (Vs) which is used as the measurement reference, is equal to the supply voltage (Vs) plus the diode voltage drop (Vd), that is Vsoff=Vs+Vd. With the power transistors activated in these states, the off-time (Voff) open phase voltage measurement is then performed with respect to the supply voltage rail (Vs). After the completion of this off-time (Voff) open phase voltage measurement, the low-side power transistor B_L is turned-off, thus completing the off-time interval measurement cycle.

As a further extension to the disclosed on-time (Von) and off-time (Voff) open phase voltage measurements, it is also possible to make the off-time (Voff) open phase voltage measurements during the off-time pulse interval with all power transistors turned-off. This variation in the disclosed method during the off-time pulse measurement interval, illustrated in FIG. 8, is achieved in practise by disconnecting the positive voltage polarity phase coil (C) from the supply voltage (Vs) rail by turning-off power transistor C_H, and disconnecting the negative voltage polarity phase coil (B) from the ground rail (0V) by turning-off power transistors B_L. In this case, the decaying phase coil current i(t) clamps the positive polarity phase coil (C) to the positive supply voltage (Vs) rail via power transistor C_H internal freewheeling diode, where for example, phase coil C voltage equals to Vs+Vd with respect to ground rail (0V). The decaying phase coil current i(t) also clamps the negative polarity phase coil (B) to the ground rail (0V) via power transistor B_L internal freewheeling diode, where for example, phase coil B voltage equals to −Vd with respect to the ground rail (0V). The off-time (Voff) open phase voltage measurement can then be made with respect to the ground rail (0V) or supply voltage rail (Vs) as the measurement reference point.

(b) On-Time and Off-Time Voltage Measurement Sequence

Figure 9:
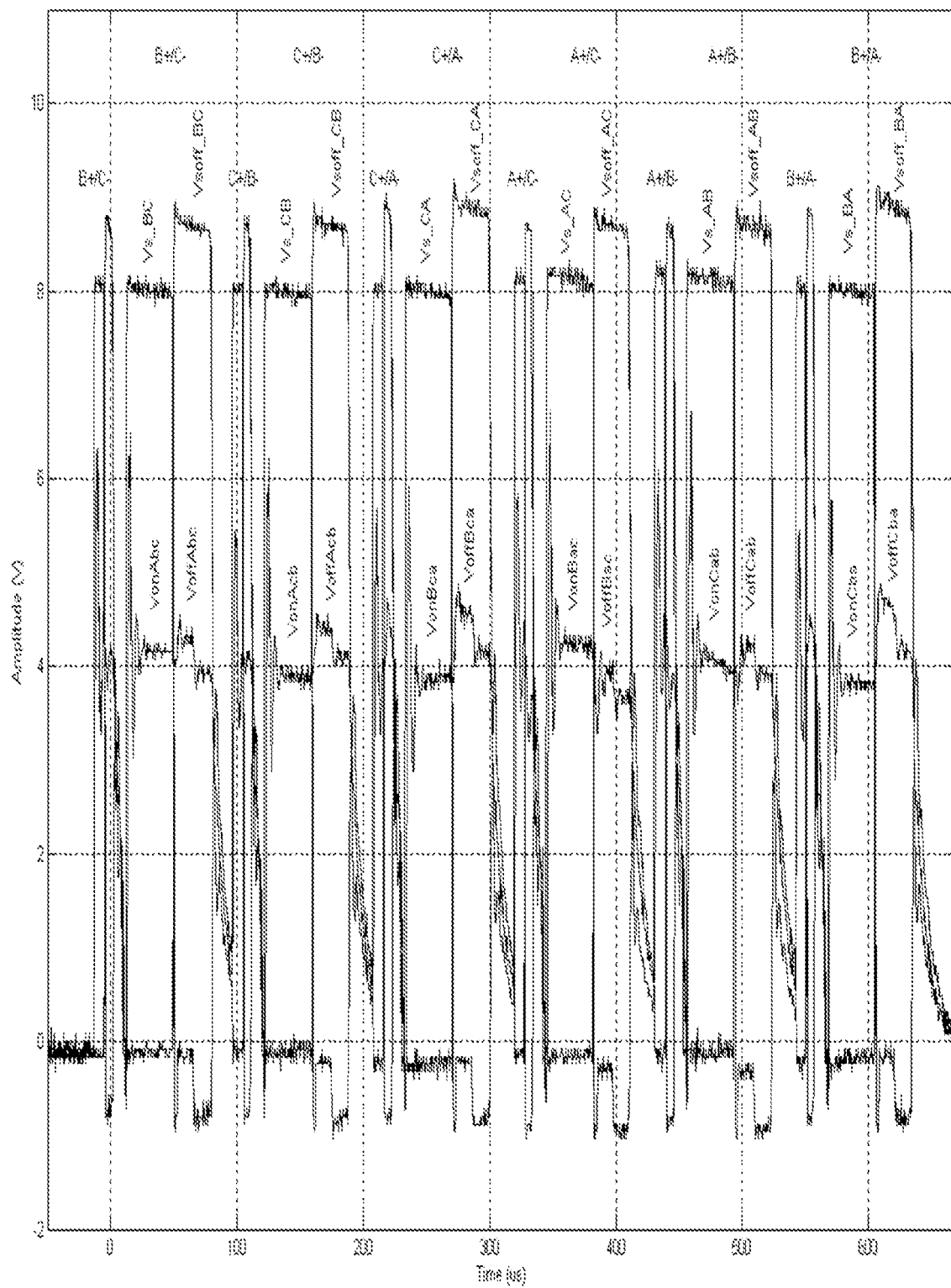
FIG. 9 illustrates an initial rotor position detection phase winding pulsing sequence employing on-time and off-time open phase and supply voltage measurements with six preceding stator core demagnetization short duration pulses.

To determine the initial rotor position, a sequence of on-time and off-time open phase winding and supply voltage measurements corresponding to the six possible pairs of phase combinations is performed first. An example sequence captured from a practical BLDC motor is shown in FIG. 9. In this application example phase windings B+/C−, C+/B−, C+/A−, A+/C−, A+/B−, B+/A− are pulsed by activating the power transistor devices B_H/C_L, C_H/B_L, C_H/A_L, A_H/C_L, A_H/B_L, B_H/A_L (shown in FIG. 2) respectively. It should be noted that any other pulse sequences with any other phase coil pair combinations can also be used in the disclosed method to achieve the same effect, for example a sequence such as B+/A−, A+/B−, B+/C−, C+/B−, A+/C−, C+/A−.

Since the pulse on-time durations are very short, typically in the range between 20 μsec-70 μsec, no net torque is imposed on the BLDCM rotor to cause it to turn and thus the rotor remains stationary. The entire measurement process takes <1 ms to complete (typ. ~600 us) which is very short.

(i) On-Time and Off-Time Open Phase Voltage Measurements

Table 1 below shows the six pairs of on-time and off-time open phase winding voltage measurements, obtained from the measurement sequence shown in FIG. 9.

TABLE 1

| On-time and Off-time open phase voltage measurements | | |
|---|---|---|
| Active Phase Coil Pair | On-time Open Phase Voltage | Off-time Open Phase Voltage |
| B+/C− | VonAbc | VoffAbc |
| C+/B− | VonAcb | VoffAcb |
| C+/A− | VonBca | VoffBca |
| A+/C− | VonBac | VoffBac |
| A+/B− | VonCab | VoffCab |
| B+/A− | VonCba | VoffCba |

For example, the notation VonAbc refers to open phase winding A on-time voltage measurement with phase coil B connected to Vs via B_H switch and phase coil C connected to the ground via C_L switch. Similarly, the notation VoffAbc refers to open phase winding A off-time voltage measurement with phase coil C freewheeling to Vs+Vd via C_H switch diode and phase coil B connected to the ground via B_L switch.

(ii) On-Time and Off-Time Supply Voltage Measurements

The six pairs of supply voltage measurements during the on-time and off-time pulse intervals shown in Table 2 are also performed during the measurement sequence presented in FIG. 9.

TABLE 2

On-time and Off-time open phase voltage measurements

| Active Phase Coil Pair | On-time Open Phase Voltage | Off-time Open Phase Voltage |
|---|---|---|
| B+/C− | Vs_BC | Vsoff_BC |
| C+/B− | Vs_CB | Vsoff_CB |
| C+/A− | Vs_CA | Vsoff_CA |
| A+/C− | Vs_AC | Vsoff_AC |
| A+/B− | Vs_AB | Vsoff_AB |
| B+/A− | Vs_BA | Vsoff_BA |

Where, for example, the notation Vs_BC refers to on-time supply voltage (Vs) measurement with phase coil B connected to Vs via B_H switch and phase coil C connected to the ground via C_L switch. Similarly, the notation Vsoff_BC refers to off-time supply voltage measurement (Vs+Vd) with phase coil C freewheeling to Vs+Vd voltage level via C_H switch diode and phase coil B connected to the ground via B_L switch.

(iii) On-Time and Off-Time Voltage Measurement Correlation

In the disclosed method, the measured on-time and off-time open phase voltages are correlated to each other for the following key reasons: 1) To scale down the off-time (Voff) open phase winding voltage measurements that are referenced to voltage level Vs+Vd, instead of Vs as in on-time (Von) open phase winding measurements; 2) To compensate on-time (Von) and off-time (Voff) open phase winding voltage measurements for any fluctuations in the power supply, as shown in FIG. 10, which is commonly found in battery operated applications; 3) The rotor position detection calculations disclosed require that all of the on-time (Von) and off-time (Voff) open phase winding voltages in the measurement sequence have the same supply voltage reference level.

Correlation of Voff to Von measurements is performed via the scaling calculation Vs/Vsoff using their respective Vs and Vsoff supply voltage measurements, as shown in the following equations for each phase coil pair:

$$VoffAbc' = VoffAbc \cdot Vs\_BC/Vsoff\_BC \quad (1)$$

$$VoffAcb' = VoffAcb \cdot Vs\_BC/Vsoff\_CB \quad (2)$$

$$VoffBca' = VoffBca \cdot Vs\_BC/Vsoff\_CA \quad (3)$$

$$VoffBac' = VoffBac \cdot Vs\_BC/Vsoff\_AC \quad (4)$$

$$VoffCab' = VoffCab \cdot Vs\_BC/Vsoff\_AB \quad (5)$$

$$VoffCba' = VoffCba \cdot Vs\_BC/Vsoff\_BA \quad (6)$$

It should be noted that, in this embodiment, all Voff open phase measurements in the measurement sequence are correlated to the open phase measurement of the first phase coil pair. In the example measurement sequence shown in FIG. 9 and FIG. 10, this is the B+/C− active phase coil pair. However, any other active phase coil pairs in the measurement sequence could also be realized as the reference coil pair.

To prevent fluctuations in supply voltage rail (Vs) from affecting the Von and Voff open phase winding measurements in the entire measurement sequence, as shown in FIG. 10, the same voltage scaling adjustment for each coil pair is also performed for all Von open phase winding measurements with the following calculations:

$$VonAbc' = VonAbc \quad (7)$$

$$VonAcb' = VonAcb \cdot Vs\_BC/Vs\_CB \quad (8)$$

$$VonBca' = VonBca \cdot Vs\_BC/Vs\_CA \quad (9)$$

$$VonBac' = VonBac \cdot Vs\_BC/Vs\_AC \quad (10)$$

$$VonCab' = VonCab \cdot Vs\_BC/Vs\_AB \quad (11)$$

$$VonCba' = VonCba \cdot Vs\_BC/Vs\_BA \quad (12)$$

The open phase voltage correlation step is shown in initial rotor position detection operation flowcharts in FIG. 16, FIG. 17 and FIG. 18, and it is the same for all three different detection methods disclosed in later sections.

(iv) Stator Core Demagnetization

During testing of the disclosed sensorless BLDCM controller, it was found that high motor currents can leave a net residual magnetic flux in the iron stator core in BLDCM motors. This can lead to reduced accuracy and precision of the detected initial rotor positions. To address this issue, a novel and improved measurement technique was developed that consists of the application of very short duration pulses before the main on-time and off-time measurement pulses, as shown in FIG. 9. In this example embodiment each main measurement active phase coil pair (B+/C−, C+/B−, C+/A−, A+/C−, A+/B−, B+/A−) is preceded by a shorter on-time pulse with exactly the same polarity.

Pulse durations in the range between 5 μsec-15 μsec were tested to work well in practice. The purpose of these shorter preceding pulses is to quickly demagnetize the iron stator core in the event that it contains some net residual magnetic flux fields from a previous sensorless BLDCM operation. The accuracy and precision of Von and Voff measurements and thus the resultant rotor position detection is improved in practical application.

In time critical initial rotor position detection applications, where the fastest possible detection time is required, it was found that equal improvements were also obtained by applying the shorter duration iron stator core demagnetization pulses to only every second phase coil pair (B+/C−, C+/A−, A+/B−) as shown in FIG. 10. In this embodiment the groups with the same active phase coil pairs (B+/C− and C+/B−, C+/A− and A+/C−, A+/B− and B+/A−) are preceded by a single shorter on-time pulse (B+/C−, C+/A−, A+/B−) with same polarity as the first active coil pair in the group.

The disclosed short preceding pulses, which offer a performance improvement, are not critical to the working of the overall embodiment. Thus they can also be completely omitted from the on-time and off-time phase voltage measurements pulse sequence.

(c) Rotor Position Functions

The six pairs of correlated Von and Voff open phase winding measurements obtained from the sequence of voltage pulses, as shown in application examples in FIG. 9 and FIG. 10, are used directly in the calculations of the novel rotor position functions developed to determine accurate BLDC motor angular rotor position. These rotor position functions are important, and address the following challenges:

1) Increased rotor position angle detection accuracy to within ±30° sectors, compared to ±60° sectors commonly disclosed in the prior art methods, thus increasing motor start-up performance;

2) Absolute rotor position calculation to with few angular degrees using additional trigonometric calculations;

3) Rotor position detection independent of rotor speed, making detection possible at standstill or in motion;

4) Insensitivity to stator phase winding inductance and resistance asymmetries in BLDC motors Two embodiments used to calculate the RPFs are disclosed, with the 2nd embodiment denoted with the Δ suffix.

(i) Rotor Position Function Calculations (1st Embodiment)

According to the first embodiment, the rotor position functions (PA, PB, PC) consisting of correlated Von and Voff open phase winding measurements are calculated with:

$$PA=(VonCab-VoffCab)+(VonCba-VoffCba)+ \\ (VonBca-VoffBca)+(VonBac-VoffBac)-2\cdot(Von\text{-} \\ Abc-VoffAbc)-2\cdot(VonAcb-VoffAcb) \quad (13)$$

$$PB=(VonAbc-VoffAbc)+(VonAcb-VoffAcb)+(Von\text{-} \\ Cab-VoffCab)+(VonCba-VoffCba)-2\cdot(VonBca- \\ VoffBca)-2\cdot(VonBac-VoffBac) \quad (14)$$

$$PC=(VonBca-VoffBca)+(VonBac-VoffBac)+(Von\text{-} \\ Abc-VoffAbc)+(VonAcb-VoffAcb)-2\cdot(VonCab- \\ VoffCab)-2\cdot(VonCba-VoffCba) \quad (15)$$

Figure 11:
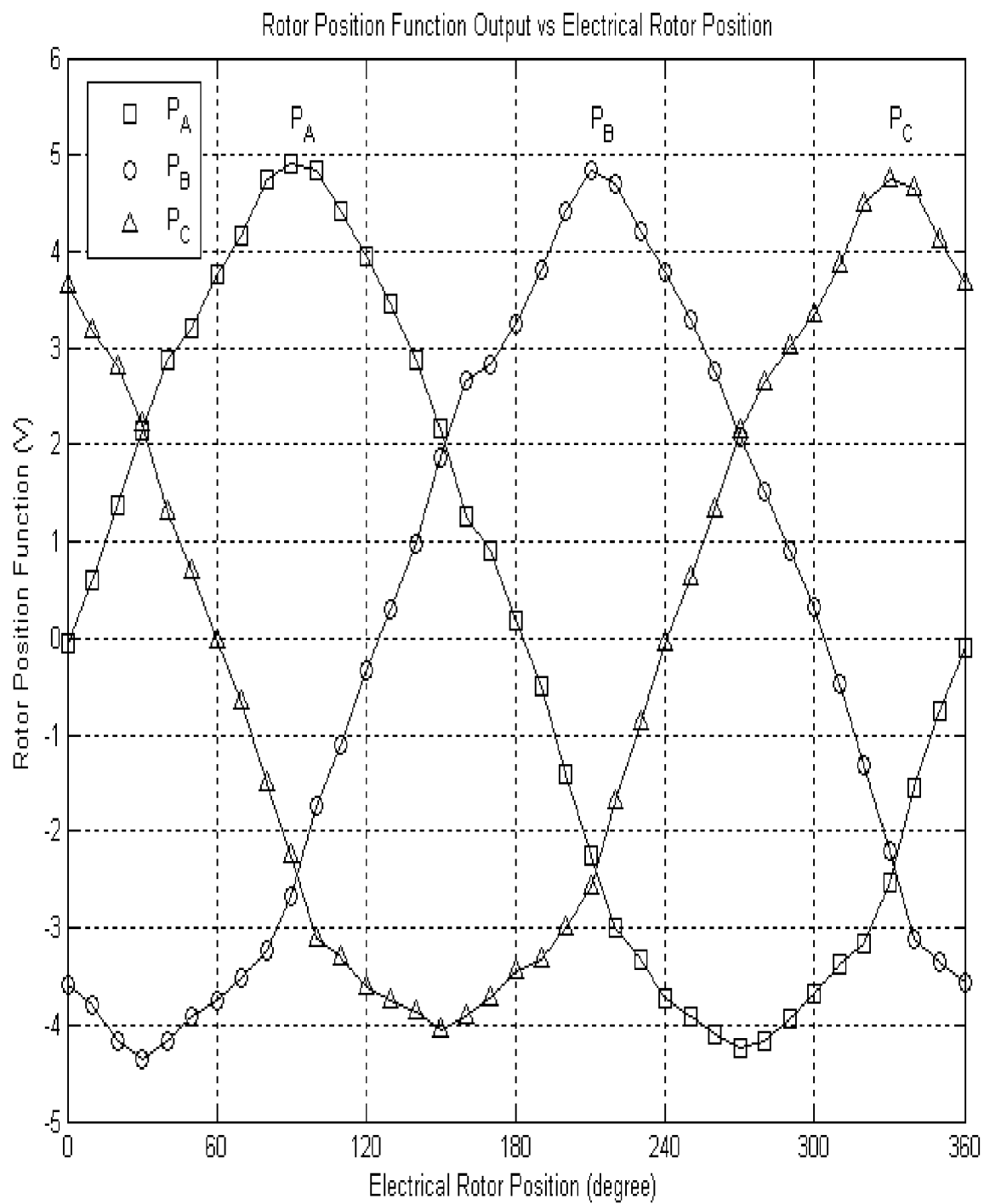
FIG. 11 illustrates a calculated rotor position function output vs electrical rotor position.

An application example of the output rotor positions calculated by these functions in a BLDC motor is presented in FIG. 11. As shown, these functions (PA, PB, PC) have sinusoidal properties and they are shifted apart by 120° from which accurate rotor position within ±60° sectors can be deduced.

In addition, a set of rotor position functions (PA_30, PB_30, PC_30) shifted by +30° compared to (PA, PB, PC) are also disclosed. They are used to further improve the detected rotor position accuracy to within ±30° sectors and are calculated with the following functions consisting of correlated Von and Voff measurements:

$$PA\_30=(VonCab-VoffCab)+(VonCba-VoffCba)- \\ (VonAbc-VoffAbc)-(VonAcb-VoffAcb) \quad (16)$$

$$PB\_30=(VonAbc-VoffAbc)+(VonAcb-VoffAcb)- \\ (VonBca-VoffBca)-(VonBac-VoffBac) \quad (17)$$

$$PC\_30=(VonBca-VoffBca)+(VonBac-VoffBac)- \\ (VonCab-VoffCab)-(VonCba-VoffCba) \quad (18)$$

Figure 12:
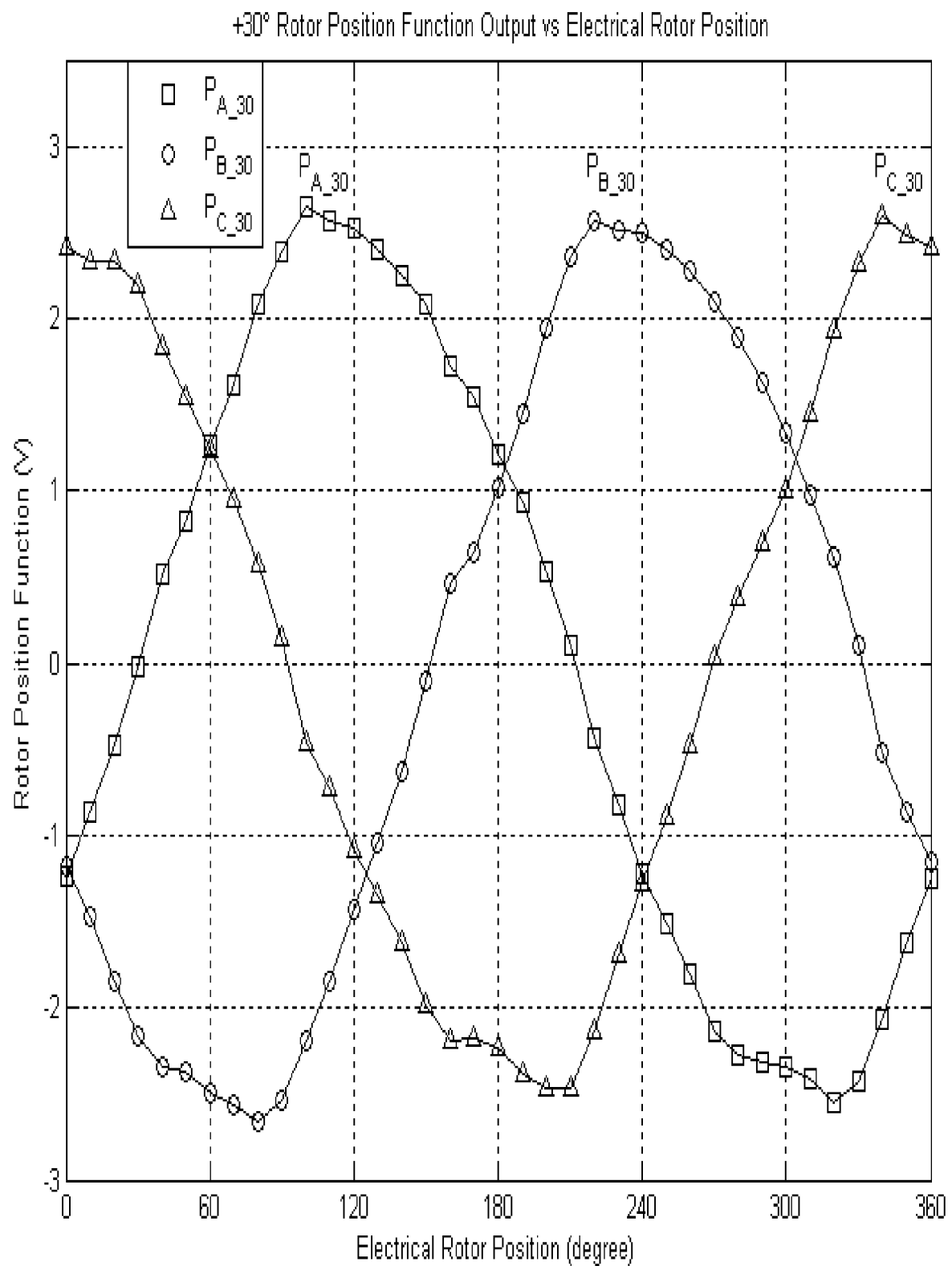
FIG. 12 illustrates a calculated +30° shifted rotor position function output vs electrical rotor position.

An example of the +30° shifted output rotor positions calculated by these functions in a practical BLDC motor application is shown in FIG. 12.

(ii) −30° Shifted Rotor Position Function Calculations (2nd Embodiment (Δ))

In certain challenge applications of initial rotor position detection of BLDC motors, it was found advantageous to employ rotor positions functions shifted by −30° compared to the functions (PA, PB, PC) and (PA_30, PB_30, PC_30) disclosed in the first embodiment. The reasons for this will become more apparent below. Apart from this −30° phase shift, these rotor position functions have the same properties as the sets of functions (PA, PB, PC) and (PA_30, PB_30, PC_30) disclosed in the first embodiment.

According to the second embodiment of this invention, the −30° shifted rotor position functions (PA_Δ, PB_Δ, PC_Δ) consisting of correlated Von and Voff open phase winding measurements are calculated with:

$$PA\_\Delta=(VonBca-VoffBca)+(VonBac-VoffBac)-(Von\text{-} \\ Abc-VoffAbc)-(VonAcb-VoffAcb) \quad (19)$$

$$PB\_\Delta=(VonCab-VoffCab)+(VonCba-VoffCba)- \\ (VonBca-VoffBca)-(VonBac-VoffBac) \quad (20)$$

$$PC\_\Delta=(VonAbc-VoffAbc)+(VonAcb-VoffAc)-(Von\text{-} \\ Cab-VoffCab)-(VonCba-VoffCba) \quad (21)$$

Similarly, according to this second embodiment, the set of rotor position functions (PA_30_Δ, PB_30_Δ, PC_30_Δ) shifted by +30° compared to (PA_Δ, PB_Δ, PC_Δ) are calculated with the following functions consisting of correlated Von and Voff measurements:

$$PA\_30\_\Delta=PA \quad (22)$$

$$PB\_30\_\Delta=PB \quad (23)$$

$$PC\_30\_\Delta=PC \quad (24)$$

(iii) Rotor Position Detection Implementation with RPFs

The following section presents the implementation of the disclosed rotor position detection. The RPF calculations from the first 1st embodiment are presented. For the implementation of the 2nd embodiment, the function equations with the Δ suffix are used, for example PA_Δ instead of PA. The steps used to determine the rotor position within ±30° sectors are:

1) Calculate (PA, PB, PC) RPFs using the six pairs of correlated Von and Voff open phase winding measurements as inputs.

2) Determine initial rotor position to within 60° sector by checking the sign of the RPFs, as shown in Table 3. The corresponding commutation state number is obtained.

3) Refine rotor position to within 30° sector with (PA_30, PB_30, PC_30) RPFs corresponding to commutation state determined in step 1. The sign of this RPF determines the ±30° sector within current 60° sector, as shown in Table 4.

TABLE 3

Initial rotor position estimate within 60° sector using (PA, PB, PC) RPFs

| Rotor Position Sector θ | Commutation State | PA RPF Sign Check | PB RPF Sign Check | PC RPF Sign Check |
|---|---|---|---|---|
| 0-60° | 0 | PA ≥ 0 | PB < 0 | PC ≥ 0 |
| 60-120° | 1 | PA ≥ 0 | PB < 0 | PC < 0 |
| 120-180° | 2 | PA ≥ 0 | PB ≥ 0 | PC < 0 |
| 180-240° | 3 | PA < 0 | PB ≥ 0 | PC < 0 |
| 240-300° | 4 | PA < 0 | PB ≥ 0 | PC ≥ 0 |
| 300-360° | 5 | PA < 0 | PB < 0 | PC ≥ 0 |

TABLE 4

Refined rotor position estimate within 30° sectors using (PA_30, PB_30, PC_30) RPFs

| Rotor Position Sector θ | Commutation State | RPF Sign Check |
|---|---|---|
| 0-30° | 0 | PA_30 < 0 |
| 30-60° | 0 | PA_30 ≥ 0 |
| 60-90° | 1 | PC_30 ≥ 0 |
| 90-120° | 1 | PC_30 < 0 |
| 120-150° | 2 | PB_30 < 0 |
| 150-180° | 2 | PB_30 ≥ 0 |

TABLE 4-continued

Refined rotor position estimate within 30° sectors using (PA_30, PB_30, PC_30) RPFs

| Rotor Position Sector θ | Commutation State | RPF Sign Check |
|---|---|---|
| 180-210° | 3 | PA_30 ≥ 0 |
| 210-240° | 3 | PA_30 < 0 |
| 240-270° | 4 | PC_30 < 0 |
| 270-300° | 4 | PC_30 ≥ 0 |
| 300-330° | 5 | PB_30 ≥ 0 |
| 330-360° | 5 | PB_30 < 0 |

This initial rotor position detection method is also presented in the operation flowchart shown in FIG. 16.

(d) Enhanced Rotor Position Functions

During development of the disclosed sensorless BLDCM controller, it was found that some BLDC motors exhibit undesirable characteristics which make it more difficult to detect accurate and precise rotor position using the rotor position function calculations disclosed in the 1st embodiment (PA, PB, PC) and (PA_30, PB_30, PC_30), and the 2nd embodiment (PA_Δ, PB_Δ, PC_Δ) and (PA_30_Δ, PB_30_Δ, PC_30_Δ). These non-ideal characteristics can exist in some BLDC motor due to their physical construction, the level of rotor magnetic field strength and effects such as mutual inductance.

Consequently, a set of additional initial rotor position detection embodiments have also been developed to address this challenge. These consist of a set of enhanced rotor position functions (ERPF) developed to work in conjunction with the previously disclosed RPFs that have similar properties.

As with RPFs, two ERPF embodiments are disclosed, with the 2nd embodiment denoted with the Δ suffix.

(i) Enhanced Rotor Position Function Calculations (1st Embodiment)

The enhanced rotor position functions (EPA0, EPC1, EPB2, EPA3, EPC4, EPB5), consisting of correlated Von and Voff open phase winding measurements are calculated with:

$$EPA0 = (VonCba-VoffCab)+(VonBac-VoffBca)-2\cdot(VonAcb-VoffAbc) \ (300°\leq\theta<60°) \tag{25}$$

$$EPC1 = (VonBca-VoffBac)+(VonAbc-VoffAcb)-2\cdot(VonCab-VoffCba) \ (0°\leq\theta<120°) \tag{26}$$

$$EPB2 = (VonAcb-VoffAbc)+(VonCba-VoffCab)-2\cdot(VonBac-VoffBca) \ (60°\leq\theta<180°) \tag{27}$$

$$EPA3 = (VonCab-VoffCba)+(VonBca-VoffBac)-2\cdot(VonAbc-VoffAcb) \ (120°\leq\theta<240°) \tag{28}$$

$$EPC4 = (VonBac-VoffBca)+(VonAcb-VoffAbc)-2\cdot(VonCba-VoffCab) \ (180°\leq\theta<300°) \tag{29}$$

$$EPB5 = (VonAbc-VoffAcb)+(VonCab-VoffCba)-2\cdot(VonBca-VoffBac) \ (240°\leq\theta<360°) \tag{30}$$

Figure 13:
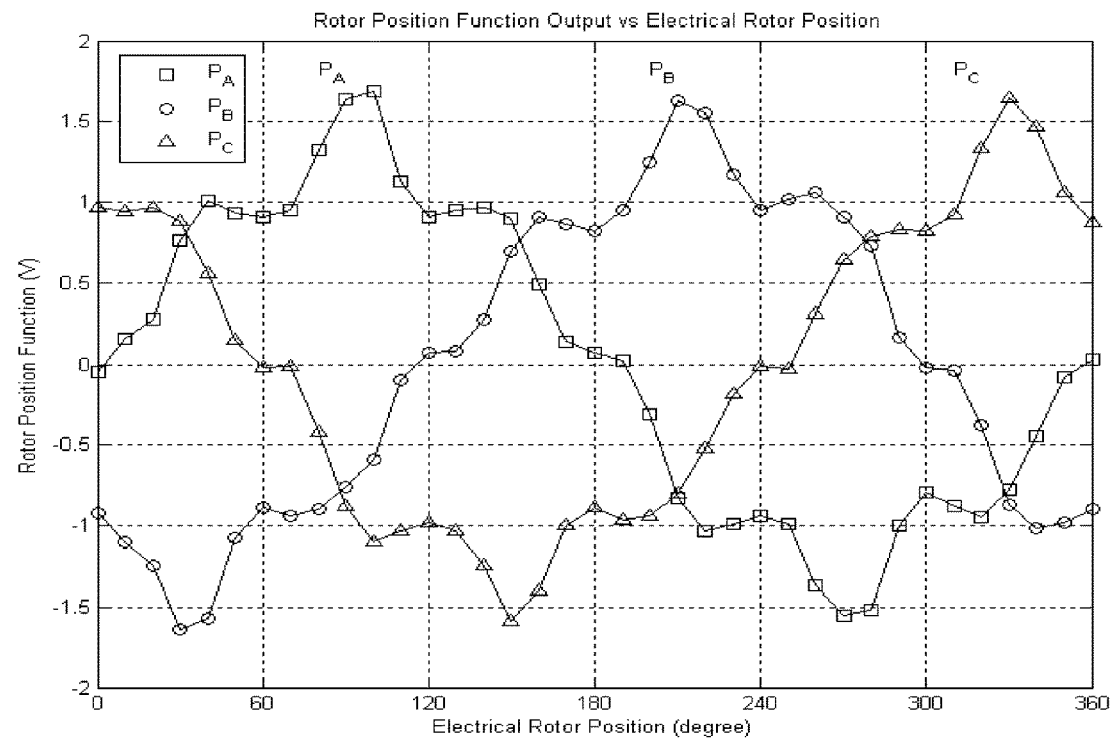
FIG. 13 illustrates a rotor position function output vs electrical rotor position calculated in a BLDCM exhibiting flat regions and kinks at the 60° sector zero-crossings.
Figure 14:
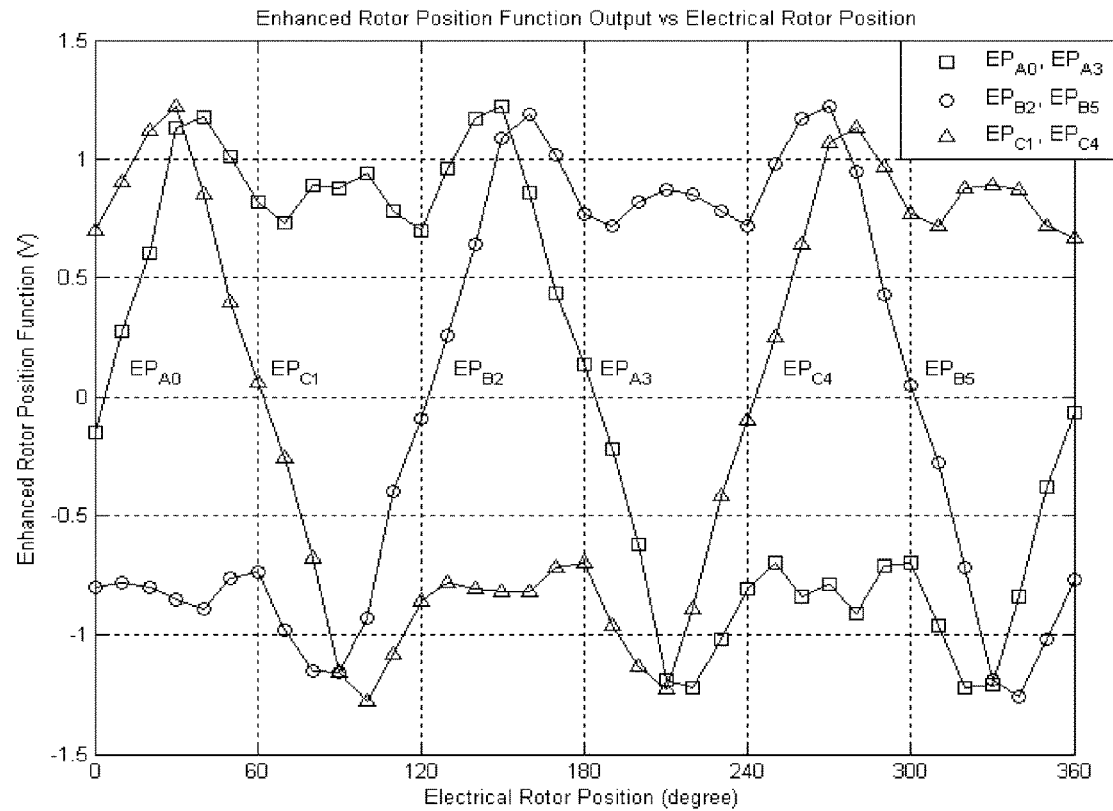
FIG. 14 illustrates an enhanced rotor position function output vs electrical rotor position calculated for the BLDCM with RPF (PA, PB, PC) outputs shown in FIG. 13, resulting in removal of the flat regions and kinks at the 60° sector zero-crossings and increased rotor position detection accuracy.

These enhanced rotor position functions are applied to each of the six 60° rotor position sectors to improve the zero crossings of the calculated rotor position functions, as shown in the practical example in FIG. 13 and FIG. 14. With this method, the BLDCM rotor position function outputs calculated with RPFs in FIG. 13 are further refined using EPRF calculations resulting in the output functions shown in FIG. 14, where the flat regions and kinks at the zero-crossings are removed. Thus ERPFs can provide an improved and more decisive and accurate rotor position detection of each 60° sector zero-crossing with certain BLDC motors as tested.

In addition, a set of rotor position functions (EPA0_30, EPC1_30, EPB2_30, EPA3_30, EPC4_30, EPB5_30) shifted by +30° compared to (EPA0, EPC1, EPB2, EPA3, EPC4, EPB5) are also disclosed in this embodiment. As with the RPFs, they are used to further improve the detected rotor position accuracy to within ±30° sectors and are calculated with the following functions consisting of correlated Von and Voff measurements:

$$EPA0\_30 = (VonCab-VoffCba)-(VonAcb-VoffAbc) \ (0°\leq\theta<60°) \tag{31}$$

$$EPC1\_30 = (VonBac-VoffBca)-(VonCab-VoffCba) \ (60°\leq\theta<120°) \tag{32}$$

$$EPB2\_30 = (VonAbc-VoffAcb)-(VonBac-VoffBca) \ (120°\leq\theta<180°) \tag{33}$$

$$EPA3\_30 = (VonCba-VoffCab)-(VonAbc-VoffAcb) \ (180°\leq\theta<240°) \tag{34}$$

$$EPC4\_30 = (VonBca-VoffBac)-(VonCba-VoffCab) \ (240°\leq\theta<300°) \tag{35}$$

$$EPB5\_30 = (VonAcb-VoffAbc)-(VonBca-VoffBac) \ (300°\leq\theta<360°) \tag{36}$$

(ii) −30° Shifted Enhanced Rotor Position Function Calculations (2nd Embodiment (Δ))

The enhanced rotor position functions (EPA0_Δ, EPC1_Δ, EPB2_Δ, EPA3_Δ, EPC4_Δ, EPB5_Δ) shifted by −30° compared to the functions (EPA0, EPC1, EPB2, EPA3, EPC4, EPB5) are calculated with the following functions consisting of correlated Von and Voff measurements:

$$EPA0\_\Delta = (VonBca-VoffBac)-(VonAcb-VoffAbc) \ (300°\leq\theta<60°) \tag{37}$$

$$EPC1\_\Delta = (VonAcb-VoffAbc)-(VonCab-VoffCba) \ (0°\leq\theta<120°) \tag{38}$$

$$EPB2\_\Delta = (VonCab-VoffCba)-(VonBac-VoffBca) \ (60°\leq\theta<180°) \tag{39}$$

$$EPA3\_\Delta = (VonBac-VoffBca)-(VonAbc-VoffAcb) \ (120°\leq\theta<240°) \tag{40}$$

$$EPC4\_\Delta = (VonAbc-VoffAcb)-(VonCba-VoffCab) \ (180°\leq\theta<300°) \tag{41}$$

$$EPB5\_\Delta = (VonCba-VoffCab)-(VonBca-VoffBac) \ (240°\leq\theta<360°) \tag{42}$$

Similarly, a set of rotor position functions (EPA0_Δ_30, EPC1_Δ_30, EPB2_Δ_30, EPA3_Δ_30, EPC4_Δ_30, EPB5_Δ_30) shifted by +30° compared to (EPA0_Δ, EPC1_Δ, EPB2_Δ, EPA3_Δ, EPC4_Δ, EPB5_Δ) are calculated with the following functions consisting of correlated Von and Voff measurements:

$$EPA0\_\Delta\_30 = EPA0 \ (0°\leq\theta<60°) \tag{43}$$

$$EPC1\_\Delta\_30 = EPC1 \ (60°\leq\theta<120°) \tag{44}$$

$$EPB2\_\Delta\_30 = EPB2 \ (120°\leq\theta<180°) \tag{45}$$

$$EPA3\_\Delta\_30 = EPA3 \ (180°\leq\theta<240°) \tag{46}$$

$$EPC4\_\Delta\_30 = EPC4 \ (240°\leq\theta<300°) \tag{47}$$

$$EPB5\_\Delta\_30 = EPB5 \ (300°\leq\theta<360°) \tag{48}$$

(iii) Rotor Position Detection Implementation with RPFs and ERPFs

If improvements in the accuracy of rotor position calculations are required to overcome the flat regions and kinks in RPF zero-crossing that exist in some BLDC motors, for example as shown in FIG. 13 and FIG. 14, then ERPFs are employed to calculate the rotor position. The RPF and ERPF calculations from the first 1st embodiment are presented in this section. For the implementation of the 2nd embodiment, the function equations with the Δ suffix are used, for example EPA0_Δ instead of EPA0. The steps used to determine the rotor position within ±30° sectors are:

1) Calculate (PA, PB, PC) using the 6 sets of correlated Von and Voff measurements as inputs.

2) Determine initial rotor position to within 60° sector by checking the sign of (PA, PB, PC) RPFs, as shown in Table 3. The corresponding commutation state number is obtained.

3) Improve the accuracy of rotor position estimate obtained in step 2, by checking (EPA0, EPC1, EPB2, EPA3, EPC4, EPB5) ERPFs as outlined in Table 5. A refined output rotor position, θ and commutation state are obtained after this step.

4) Refine rotor position to within 30° sector with (EPA0_30, EPC1_30, EPB2_30, EPA3_30, EPC4_30, EPB5_30) ERPF corresponding to the commutation state determined in step 3. The sign of this ERPF determines rotor position to ±30° within current 60° sector, as shown in Table 6.

TABLE 6

Refined rotor position estimate within 30° sectors using (EFA0_30, EPC1_30, EPB2_30, EPA3_30, EPC4_30, EPB5_30) ERPFs

| Rotor Position Sector θ | Commutation State | ERPF Sign Check |
|---|---|---|
| 0-30° | 0 | EPA0_30 < 0 |
| 30-60° | 0 | EPA0_30 ≥ 0 |
| 60-90° | 1 | EPC1_30 ≥ 0 |
| 90-120° | 1 | EPC1_30 < 0 |
| 120-150° | 2 | EPB2_30 < 0 |
| 150-180° | 2 | EPB2_30 ≥ 0 |
| 180-210° | 3 | EPA3_30 ≥ 0 |
| 210-240° | 3 | EPA3_30 < 0 |
| 240-270° | 4 | EPC4_30 < 0 |
| 270-300° | 4 | EPC4_30 ≥ 0 |
| 300-330° | 5 | EPB5_30 ≥ 0 |
| 330-360° | 5 | EPB5_30 < 0 |

This initial rotor position detection method employing both RPF and ERPF calculations is presented in the operation flowchart shown in FIG. 17.

(iv) Enhanced Rotor Position Functions Extensions

In application with certain types of BLDC motors, such as internal permanent magnet (IPM) motors, it was found that the calculation order of the enhanced rotor position functions (EPA0, EPC1, EPB2, EPA3, EPC4, EPB5), and +30° shifted functions (EPA0_30, EPC1_30, EPB2_30, EPA3_30, EPC4_30, EPB5_30) of the 1st and 2nd (Δ) embodiments had to be modified, in order to obtain the same effect. This is achieved by swapping the enhanced rotor

TABLE 5

Refined rotor position using (EPA0, EPC1, EPB2, EPA3, EPC4, EPB5) ERPFs

| Input Rotor Pos. | | ERPF | | Output Rotor Pos. | |
|---|---|---|---|---|---|
| Comm. State | Sector θ | ERPFs Comparison | Sign Check | Comm. | Sector θ |
| 0 | 0-60° | EPA0 < EPC1 | EPA0 < 0 | 5 | 300-360° |
|   |   |   | EPA0 ≥ 0 | 0 | 0-60° |
| 0 | 0-60° | EPA0 ≥ EPC1 | EPC1 < 0 | 1 | 60-120° |
|   |   |   | EPC1 ≥ 0 | 0 | 0-60° |
| 1 | 60-120° | EPC1 > EPB2 | EPC1 < 0 | 1 | 60-120° |
|   |   |   | EPC1 ≥ 0 | 0 | 0-60° |
| 1 | 60-120° | EPC1 ≤ EPB2 | EPB2 < 0 | 1 | 60-120° |
|   |   |   | EPB2 ≥ 0 | 2 | 120-180° |
| 2 | 120-180° | EPB2 < EPA3 | EPB2 < 0 | 1 | 60-120° |
|   |   |   | EPB2 ≥ 0 | 2 | 120-180° |
| 2 | 120-180° | EPB2 ≥ EPA3 | EPA3 < 0 | 3 | 180-240° |
|   |   |   | EPA3 ≥ 0 | 2 | 120-180° |
| 3 | 180-240° | EPA3 > EPC4 | EPA3 < 0 | 3 | 180-240° |
|   |   |   | EPA3 ≥ 0 | 2 | 120-180° |
| 3 | 180-240° | EPA3 ≤ EPC4 | EPC4 < 0 | 3 | 180-240° |
|   |   |   | EPC4 ≥ 0 | 4 | 240-300° |
| 4 | 240-300° | EPC4 < EPB5 | EPC4 < 0 | 3 | 180-240° |
|   |   |   | EPC4 ≥ 0 | 4 | 240-300° |
| 4 | 240-300° | EPC4 ≥ EPB5 | EPB5 < 0 | 5 | 300-360° |
|   |   |   | EPB5 ≥ 0 | 4 | 240-300° |
| 5 | 300-360° | EPB5 > EPA0 | EPB5 < 0 | 5 | 300-360° |
|   |   |   | EPB5 ≥ 0 | 4 | 240-300° |
| 5 | 300-360° | EPB5 ≤ EPA0 | EPA0 < 0 | 5 | 300-360° |
|   |   |   | EPA0 ≥ 0 | 0 | 0-60° | position function calculations with the same phase coil pairs (eg. EPAx, EPBx, EPCx) as outlined below:

$$EPA0x = EPA3x \ (0° \leq \theta < 60°)$$

$$EPC1x = EPC4x \ (60° \leq \theta < 120°)$$

$$EPB2x = EPB5x \ (120° \leq \theta < 180°)$$

$$EPA3x = EPA0x \ (180° \leq \theta < 240°)$$

$$EPC4x = EPC1x \ (240° \leq \theta < 300°)$$

$$EPB5x = EPB2x \ (300° \leq \theta < 360°)$$

Where: x={' ', _30, _Δ, _Δ_30}

Thus, this calculation swap applies to all of the following disclosed enhanced rotor position function calculations, eg. normal (no shift) and shifted by +30°, of the 1st and 2nd (Δ) embodiments:

(EPA0, EPC1, EPB2, EPA3, EPC4, EPB5)|
(EPA0_30, EPC1_30, EPB2_30, EPA3_30, EPC4_30, EPB5_30)
(EPA0_Δ, EPC1_Δ, EPB2_Δ, EPA3_Δ, EPC4_Δ, EPB5_Δ)
(EPA0_Δ_30, EPC1_Δ_30, EPB2_Δ_30, EPA3_Δ_30, EPC4_Δ_30, EPB5_Δ_30)

(e) Absolute Rotor Position Calculation

Accurate rotor position detection within ±30° sectors is possible with simple interpretations of the zero-crossing points and intersection points of the rotor position functions, as disclosed in the previous sections. This embodiment presents a method employing trigonometric calculations to improve the angular resolution to within a few degrees of the actual electrical rotor position. The complex vector space is an example of such a method that projects (PA, PB, PC) RPF voltage magnitudes from which the resultant rotor position vector (PR) is calculated with the following equation:

$$PR = \sqrt{[(PA-PB/2-PC/2)^2 + \tfrac{3}{4} \cdot (PB-PC)^2]} \cdot \exp\{j \cdot \tan^{-1}[\sqrt{(3/2) \cdot (PB-PC)/(PA-PB/2-PC/2)}]\} \quad (49)$$

The absolute rotor position (θ) is then given by:

$$\theta = \tan^{-1}[\sqrt{(3/2) \cdot (PB-PC)/(PA-PB/2-PC/2)}] \quad (50)$$

Figure 15:
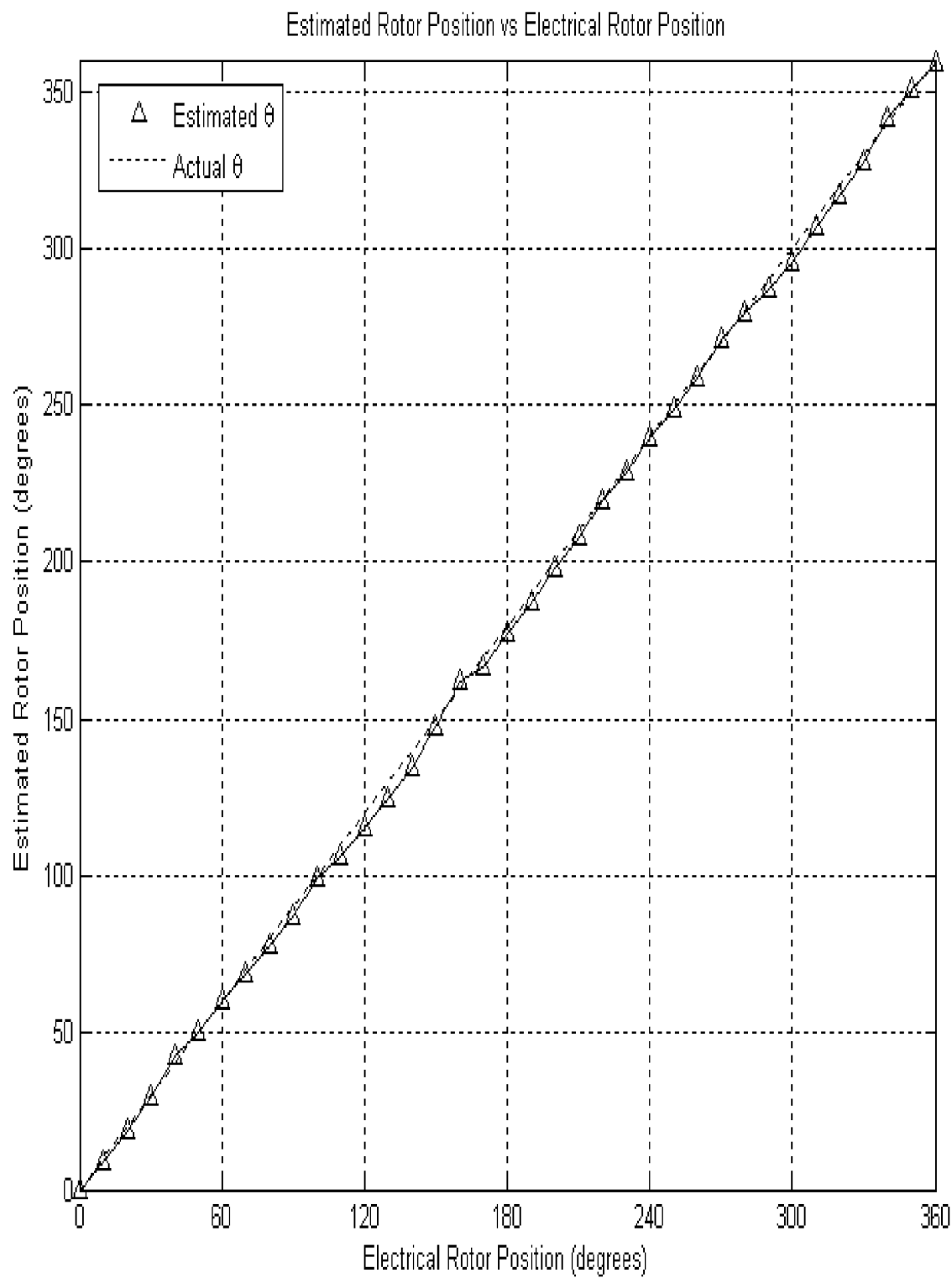
FIG. 15 illustrates an absolute rotor position obtained with trigonometric calculations providing increased angular resolution for the practical BLDCM with RPF (PA, PB, PC) outputs shown in FIG. 11.

For the implementation of the 2nd embodiment of the disclosed controller, the function equations with the Δ suffix are used, for example PA_Δ instead of PA. FIG. 15 shows the estimated absolute rotor position angle (θ) using the BLDC motor with (PA, PB, PC) RPFs presented in FIG. 11. The implementation of this rotor position calculation is presented in the operation flowchart shown in FIG. 18.

(f) Rotation Direction Functions

When starting with a BLDC motor in motion, the forward or reverse rotor spin direction is determined with a set of developed rotation direction functions (RDF), which are calculated using correlated off-time (Voff) open phase winding measurements. These disclosed rotation direction functions evaluate to either a positive or negative value depending on the rotor spin direction. As with RPFs and ERPFs, two embodiments are disclosed, with the 2nd embodiment denoted with the Δ suffix. It should be noted that it is equally possible to calculate the rotor spin direction with the same equations using correlated on-time (Von) open phase measurements, the only difference being that the signs of the output functions have the opposite value (i) Rotor Direction Function Calculations (1st Embodiment)

The rotation direction functions (RA, RB, RC) are calculated with the following equations consisting of correlated Voff measurements:

$$RA = (VoffAbc + VoffAcb) - (VoffCab + VoffCba) \quad (51)$$

$$RB = (VoffBca + VoffBac) - (VoffAbc + VoffAcb) \quad (52)$$

$$RC = (VoffCab + VoffCba) - (VoffBca + VoffBac) \quad (53)$$

(ii) −30° Shifted Rotor Direction Function Calculations (2nd Embodiment (Δ))

According to the second embodiment, the rotation direction functions (RA_Δ, RB_Δ, RC_Δ) shifted by −30° compared to the functions (RA, RB, RC) of the first embodiment are calculated with the following equations consisting of correlated Voff measurements:

$$RA\_\Delta = 2 \cdot (VoffAbc + VoffAcb) - (VoffCab + VoffCba) - (VoffBca + VoffBac) \quad (54)$$

$$RB\_\Delta = 2 \cdot (VoffBca + VoffBac) - (VoffAbc + VoffAcb) - (VoffCab + VoffCba) \quad (55)$$

$$RC\_\Delta = 2 \cdot (VoffCab + VoffCba) - (VoffBca + VoffBac) - (VoffAbc + VoffAcb) \quad (56)$$

(iii) Rotation Direction Detection Implementation

At start-up, rotation direction of a BLDCM in motion is determined by calculating the disclosed (RA, RB, RC) RDFs, which evaluate to a positive or negative value depending on direction of rotation. This detection method is implemented during the initial rotor position operation as shown in the flowcharts in FIG. 16, FIG. 17 and FIG. 18, for the three rotor position detection methods employing RPFs, RPFs and ERPFs, and absolute angle (θ) calculations respectively.

For the implementation of the 2nd embodiment, the function equations with the Δ suffix are used, for example RA_Δ instead of RA. The steps required to determine rotation direction are:

1. Calculate (RA, RB, RC) RDFs corresponding to commutation state determined during rotor position detection with RPFs and EPRFs. The sign of the RDF output determines forward or reverse rotation direction as shown in Table 7.

TABLE 7

| Rotation direction calculation with (RA, RB, RC) RDFs | | | |
| --- | --- | --- | --- |
| Rotor Position Sector θ | Commutation State | Forward Rotation RDF Sign Check | Reverse Rotation RDF Sign Check |
| 0-60° | 0 | RA > 0 | RA < 0 |
| 60-120° | 1 | RC < 0 | RC > 0 |
| 120-180° | 2 | RB > 0 | RB < 0 |
| 180-240° | 3 | RA < 0 | RA > 0 |
| 240-300° | 4 | RC > 0 | RC < 0 |
| 300-360° | 5 | RB < 0 | RB > 0 |

(g) Initial Rotor Position Detection Extensions

The disclosed initial rotor position detection method uses on-time and off-time open phase voltage measurements to detect inductance variations in BLDC motor phase coils. In practice, it is also possible to apply these disclosed methods to on-time and off-time inductance variation measurements obtained from phase current amplitude and rise time measurements in order to ascertain a BLDC motor's rotor position.

Zero to Low Speed Sensorless BLDCM Operation

The initial rotor position detection methods disclosed in previous sections provide accurate and precise starting rotor position information. To successfully drive a BLDC motor from standstill to high speed, a reliable sensorless operation in the zero to low speed range is required. This section discloses the RIMS inductance variation based commutation point functions (CPF) developed to provide accurate sensorless brushless commutation at zero and low motor speeds. They are combined with the previously disclosed rotor position functions (RPF, ERPF) and rotation direction functions (RDF) to deliver a highly robust sensorless operation at zero and low motor speeds in the presence of external load disturbances and with reversed rotor momentums.

A PWM phase current control method consisting of three PWM time intervals is also disclosed. It allows effective injection of on-time and off-time open phase voltage measurement pulses required for the RIMS based commutation point detection. This PWM method is combined with a quasi Field Oriented Control (QFOC) algorithm developed to maximize output torque during 60° step sensorless operation.

When motor speed is sufficiently high, sensorless operation switches over to the low to high speed sensorless commutation technique presented in the next section, as depicted in FIG. 1.

Figure 25:
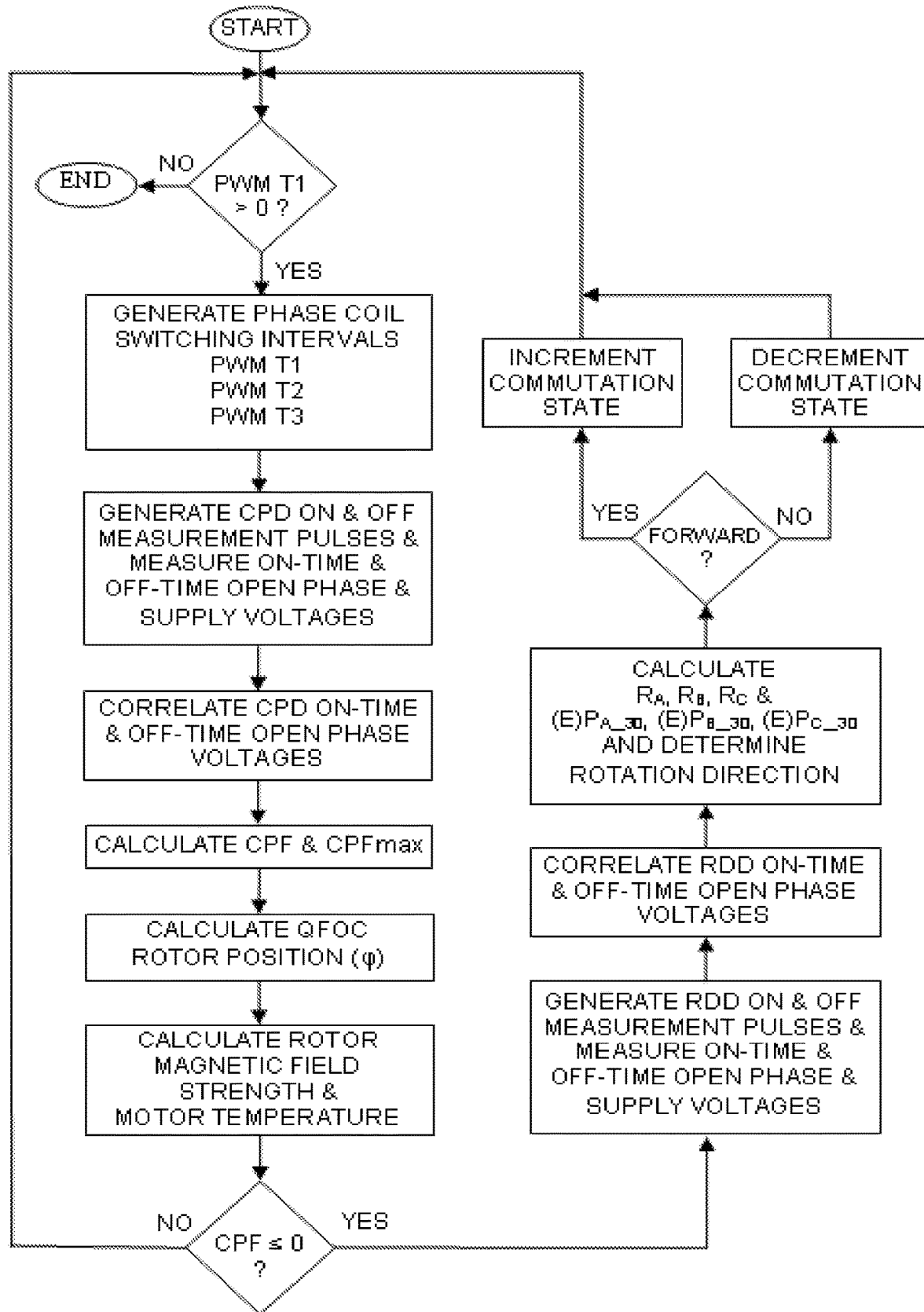
FIG. 25 illustrates a zero to low speed sensorless BLDCM controller operation flowchart.

The key parts of the disclosed zero to low speed sensorless BLDCM operation are:
  PWM phase current control using three intervals (PWMT1-PWMT3)
  Commutation point detection functions (CPF)
  Rotor position and rotation direction functions (RPF, ERPF, RDF)
  60° step sensorless commutation
  Quasi field oriented control (QFOC)
  CPFmax measurement used in rotor magnetic field strength and motor temperature measurement The operational flowchart of the disclosed zero to low speed sensorless BLDCM controller operation is illustrated in FIG. 25. As in initial rotor position detection, two zero to low speed controller embodiments are disclosed, with the 2nd embodiment denoted with the Δ suffix.

(a) PWM Phase Current Control

Figure 19:
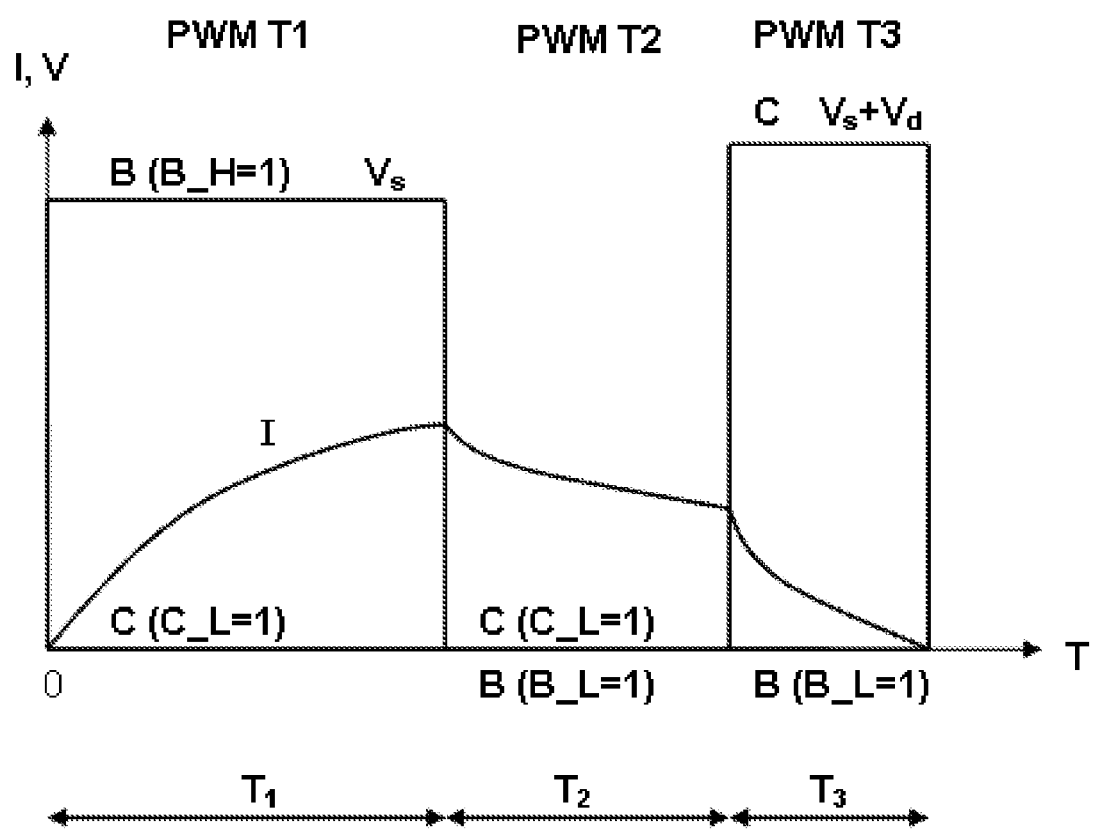
FIG. 19 illustrates a phase current and voltage waveforms during a single cycle of the three intervals PWM method used to generate the BLDC motor driving torque.
Figure 20:
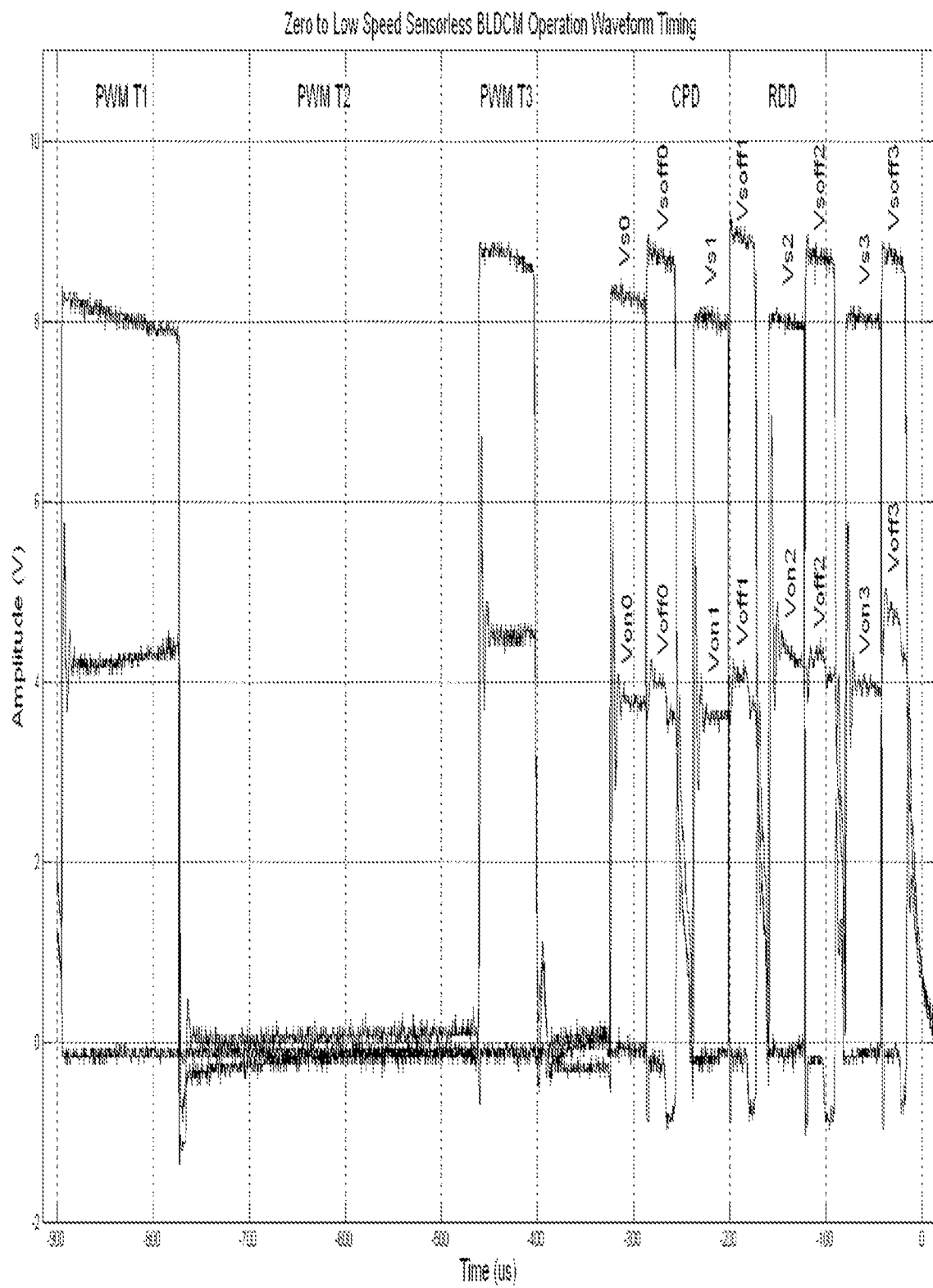
FIG. 20 illustrates a zero to low speed sensorless BLDC operation in the 1st embodiment showing one PWM cycle pulses (PWMT1-3) and four pairs of Von and Voff phase measurement pulses used in commutation point (CPD) and rotation direction detection (RDD).
Figure 21:
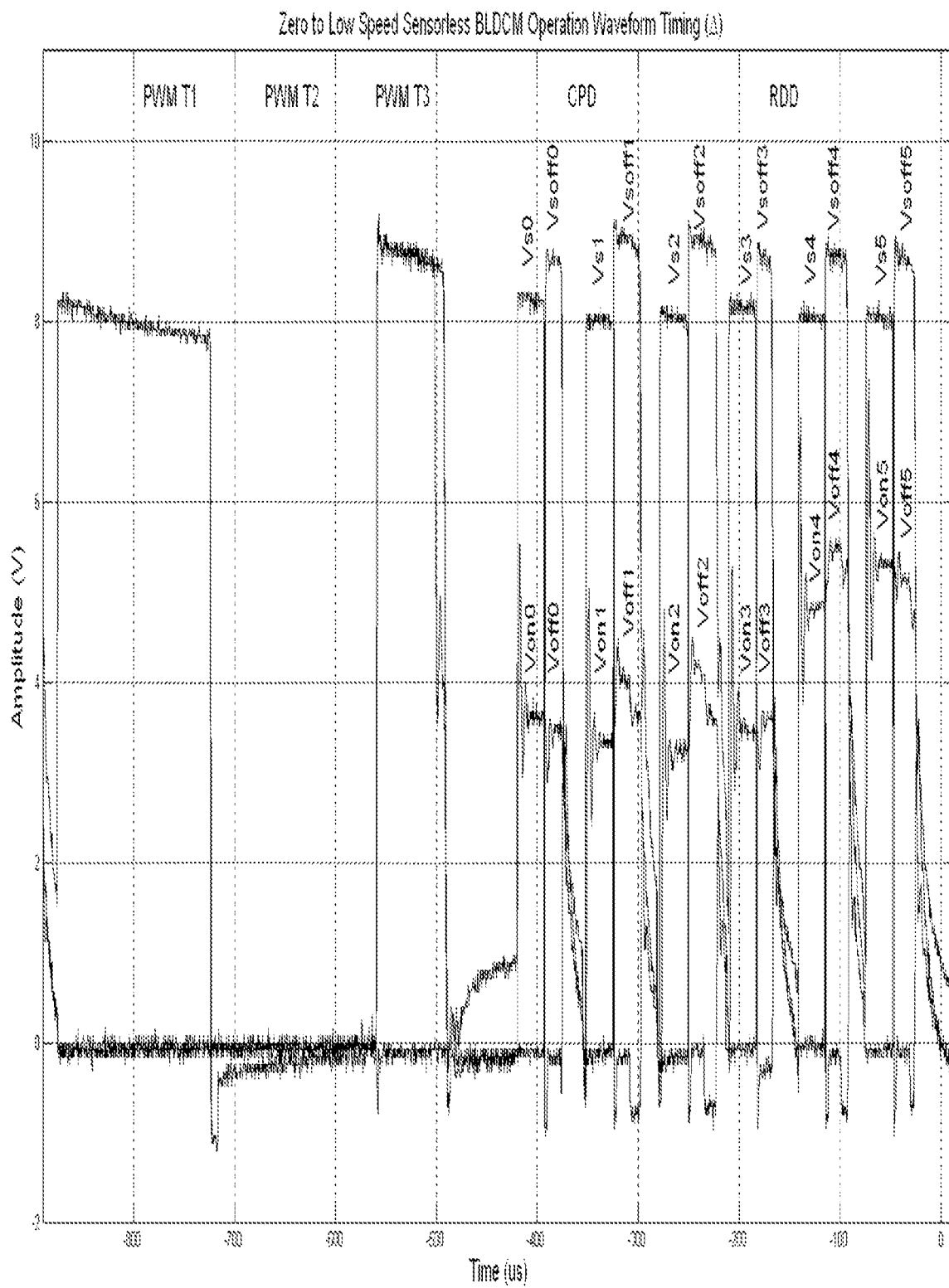
FIG. 21 illustrates a zero to low speed sensorless BLDC operation in the 2nd embodiment (Δ) showing one PWM cycle pulses (PWMT1-3) and six pairs of Von and Voff phase measurement pulses used in commutation point (CPD) and rotation direction detection (RDD).

The zero to low speed sensorless method of operation disclosed requires that the BLDCM phase driving currents are reduced to zero, as illustrated in FIG. 19, before injecting the on-time and off-time measurement pulses used in commutation point and rotation direction detection. This three interval PWM method is important to the operation of the disclosed controller because it prevents any residual currents from flowing through the inactive phase coils during the on-time and off-time measurements and thus affecting the results. It is evident that the disclosed method of combining rotor position measurement pulses with the stream of PWM motor phase currents, as shown in FIG. 20 and FIG. 21, is not common in the prior art. This method provides highly accurate and robust rotor position detection with reduced motor torque. With reference to FIG. 19, the disclosed PWM phase current control method consists of three distinct PWM intervals:

1. PWM T1: on-time phase current interval (T1), where the active phase windings (B+/C−) are connected to the supply (Vs) via the high-side power transistor (B_H) and to the ground (0V) rail via the low-side power transistor (C_L). A quasi FOC method, as described in later section of this disclosure, is also integrated to increase the BLDCM driving torque by maintaining a constant 90° torque angle between the BLDCM rotor and stator.

2. PWM T2: first off-time interval (T2) with slow phase current fall time, where both of the active phase coils (B and C) are connected to the ground (0V) rail via the low-side power transistors (B_L and C_L).

3. PWM T3: second off-time interval (T3) with fast phase current fall time down to zero, where only the B phase coil is actively connected to the ground (0V) rail via the low-side power transistor (B_L). The inactive high-side phase coil (C) is connected to the power supply rail (Vs) via the turn-off current conducted by the freewheeling diode of the high-side transistor (C_H), clipping the phase C voltage to Vs+Vd. The energy from this turn-off current is returned back to the power supply.

Together these three PWM interval durations control the amplitude of the driving current which can be set depending on the BLDCM application. The control of PWM T1, PWM T2 and PWM T3 interval durations is not limited to any particular realization. For example, these PWM interval durations can be pre-calculated and stored in a look-up table in the controller memory, say to perform a simple open loop BLDCM motor speed control, or they can be calculated in real time to perform torque control or to achieve any other BLDCM controller driving optimization. An example of a simple method of PWM control, which has been tested to work well in practise, can be realized by setting the PWM T2 duration to zero and regulating the PWM T1 duration from 0% to 100% in order to control the level of the motor driving current. The PWM T1, PWM T2 and PWM T3 intervals of the disclosed zero to low speed sensorless method of operation are generated in the step shown in the operation flowchart in FIG. 25.

(b) On-Time and Off-Time Open Phase and Supply Voltage Measurements

In this disclosure both the on-time and the off-time open phase voltage measurements are used to determine accurate sensorless operation commutation points using the developed commutation points functions. The same measurements are also used to determine the rotation direction of a BLDC motor. These on-time and off-time open phase voltage measurements are an important part of the zero to low speed sensorless BLDCM controller operation.

As disclosed previously, the on-time and off-time phase supply voltages are also measured during this step to correlate the Von and Voff measurements and address the challenge of controller sensitivity to power supply voltage fluctuations. These steps in the zero to low speed controller operation are shown in the flowchart in FIG. 25.

(i) On-Time and Off-Time Voltage Measurement (1st Embodiment)

The same method of on-time and off-time open phase voltage measurement, as illustrated in FIG. 8 and disclosed previously in the initial rotor position detection, is also used during the zero to low speed sensorless BLDCM operation.

In this 1st controller embodiment, these on-time and off-time phase measurement pulses are inserted after the PWM (PWM T1, PWM T2, PWM T3) phase current control pulses, as shown in a practical BLDCM operation in FIG. 20. From these up to four pairs of on-time and off-time phase voltage measurements are obtained:

TABLE 8

On-time and Off-time open phase and supply voltage measurements during zero to low speed sensorless BLDCM controller in the 1st embodiment

| On-time Open Phase Voltage | Off-time Open Phase Voltage | On-time Phase Supply Voltage | Off-time Phase Supply Voltage |
|---|---|---|---|
| Von0 | Voff0 | Vs0 | Vsoff0 |
| Von1 | Voff1 | Vs1 | Vsoff1 |
| Von2 | Voff2 | Vs2 | Vsoff2 |
| Von3 | Voff3 | Vs3 | Vsoff3 |

The Von measurements are next correlated to the first measurement (Von0) with following calculations:

$$Von0' = Von0 \quad (57)$$

$$Von1' = Von1 \cdot Vs0/Vs1 \quad (58)$$

$$Von2' = Von2 \cdot Vs0/Vs2 \quad (59)$$

$$Von3' = Von3 \cdot Vs0/Vs3 \quad (60)$$

Similarly, the Voff measurements are correlated to the first measurement (Voff0) with following calculations:

$$Voff0' = Voff0 \cdot Vs0/Vsoff0 \quad (61)$$

$$Voff1' = Von1 \cdot Vs0/Vsoff1 \quad (62)$$

$$Voff2' = Von2 \cdot Vs0/Vsoff2 \quad (63)$$

$$Voff3' = Von3 \cdot Vs0/Vsoff3 \quad (64)$$

These correlated Von and Voff measurements are used in calculations of commutation point detection functions and rotation direction detection functions of the 1st embodiment of this invention, which are disclosed in the proceeding sections.

(ii) On-Time and Off-Time Voltage Measurement (2nd Embodiment (Δ))

In the 2nd controller embodiment up to six pairs of on-time and off-time phase measurement pulses are inserted after the PWM (PWM T1, PWM T2, PWM T3) phase current control pulses, as shown in a practical BLDCM operation in FIG. 21. The following six pairs of on-time and off-time phase voltage measurements are obtained:

TABLE 9

On-time and Off-time open phase and supply voltage measurements during zero to low speed sensorless BLDCM controller in the 2nd embodiment (Δ). The Von measurements are next correlated to the first measurement (Von0) with following calculations:

| On-time Open Phase Voltage | Off-time Open Phase Voltage | On-time Phase Supply Voltage | Off-time Phase Supply Voltage |
|---|---|---|---|
| Von0 | Voff0 | Vs0 | Vsoff0 |
| Von1 | Voff1 | Vs1 | Vsoff1 |
| Von2 | Voff2 | Vs2 | Vsoff2 |
| Von3 | Voff3 | Vs3 | Vsoff3 |
| Von4 | Voff4 | Vs4 | Vsoff4 |
| Von5 | Voff5 | Vs5 | Vsoff5 |

$$Von0' = Von0 \quad (65)$$

$$Von1' = Von1 \cdot Vs0/Vs1 \quad (66)$$

$$Von2' = Von2 \cdot Vs0/Vs2 \quad (67)$$

$$Von3' = Von3 \cdot Vs0/Vs3 \quad (68)$$

$$Von4' = Von4 \cdot Vs0/Vs4 \quad (69)$$

$$Von5' = Von5 \cdot Vs0/Vs5 \quad (70)$$

Similarly, the Voff measurements are correlated to the first measurement (Von0) with following calculations:

$$Voff0' = Voff0 \cdot Vs0/Vsoff0 \quad (71)$$

$$Voff1' = Von1 \cdot Vs0/Vsoff1 \quad (72)$$

$$Voff2' = Von2 \cdot Vs0/Vsoff2 \quad (73)$$

$$Voff3' = Von3 \cdot Vs0/Vsoff3 \quad (74)$$

$$Voff4' = Von4 \cdot Vs0/Vsoff4 \quad (75)$$

$$Voff5' = Von5 \cdot Vs0/Vsoff5 \quad (76)$$

These correlated Von and Voff measurements are used in calculations of commutation point detection functions and rotation direction detection functions, in the 2nd embodiment of this invention, denoted with the Δ suffix, which are disclosed in the proceeding sections.

(c) Commutation Point Detection

This section discloses the developed commutation point functions (CPF), derived using the RIMS variation detection methods, from which six robust 60° step sensorless brushless commutation intervals are obtained. It is evident that BLDC motors are available in a variety of mechanical and winding configurations and as such they can have different RIMS variations properties. Consequently, two CPF detection embodiments are disclosed to cater for the differences in BLDC motors, with each having a further set of CPF detection method variations to address the challenge of sensorless controller operation with a broader range of BLDC motor applications. The required Von and Voff open phase winding measurements for CPF calculations are integrated into the PWM cycle of the zero to low speed sensorless BLDCM control method as shown in FIG. 20 and FIG. 21, for the 1st and 2nd embodiment (Δ) of this invention respectively. The disclosed commutation point detection method steps are illustrated in the operation flowchart in FIG. 25.

(i) Commutation Point Functions using Von and Voff Measurements (1st Embodiment)

In this first BLDCM controller embodiment, the correlated Von0 and Voff0 open phase measurements, obtained using the methods disclosed previously and as shown in FIG. 20, are used to derive the commutation points for each 60° commutation interval with the following calculations:

| | | |
|---|---|---|
| CPF0_Von_Voff = VoffCab−VonCab | ($0° \leq \theta < 60°$) | (77) |
| CPF1_Von_Voff = VonBac−VoffBac | ($60° \leq \theta < 120°$) | (78) |
| CPF2_Von_Voff = VoffAbc−VonAbc | ($120° \leq \theta < 180°$) | (79) |
| CPF3_Von_Voff = VonCba−VoffCba | ($180° \leq \theta < 240°$) | (80) |
| CPF4_Von_Voff = VoffBca−VonBca | ($240° \leq \theta < 300°$) | (81) |
| CPF5_Von_Voff = VonAcb−VoffAcb | ($300° \leq \theta < 360°$) | (82) |

Figure 22:
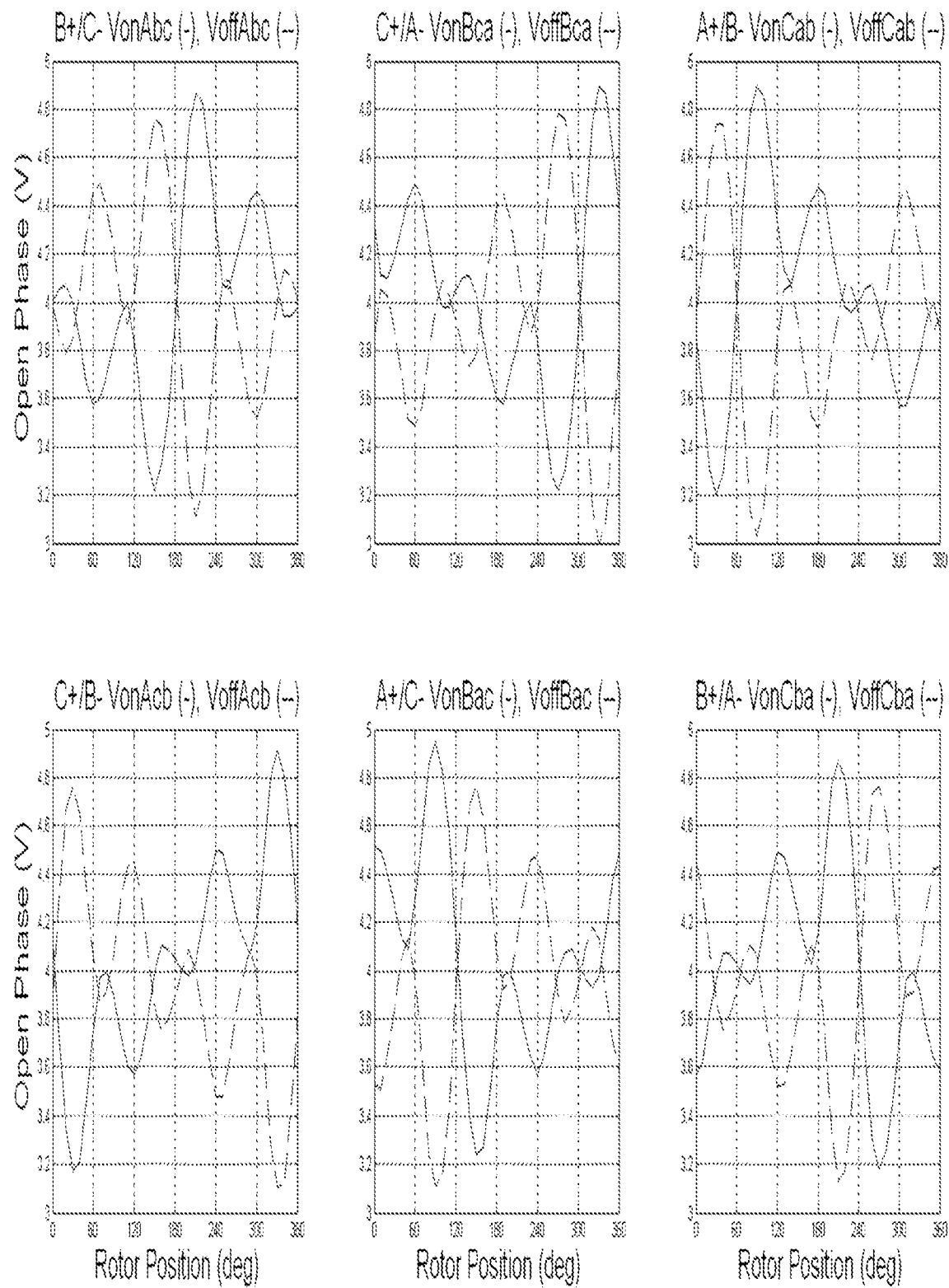
FIG. 22 illustrates correlated Von and Voff open phase voltage measurements in a practical BLDCM.
Figure 23:
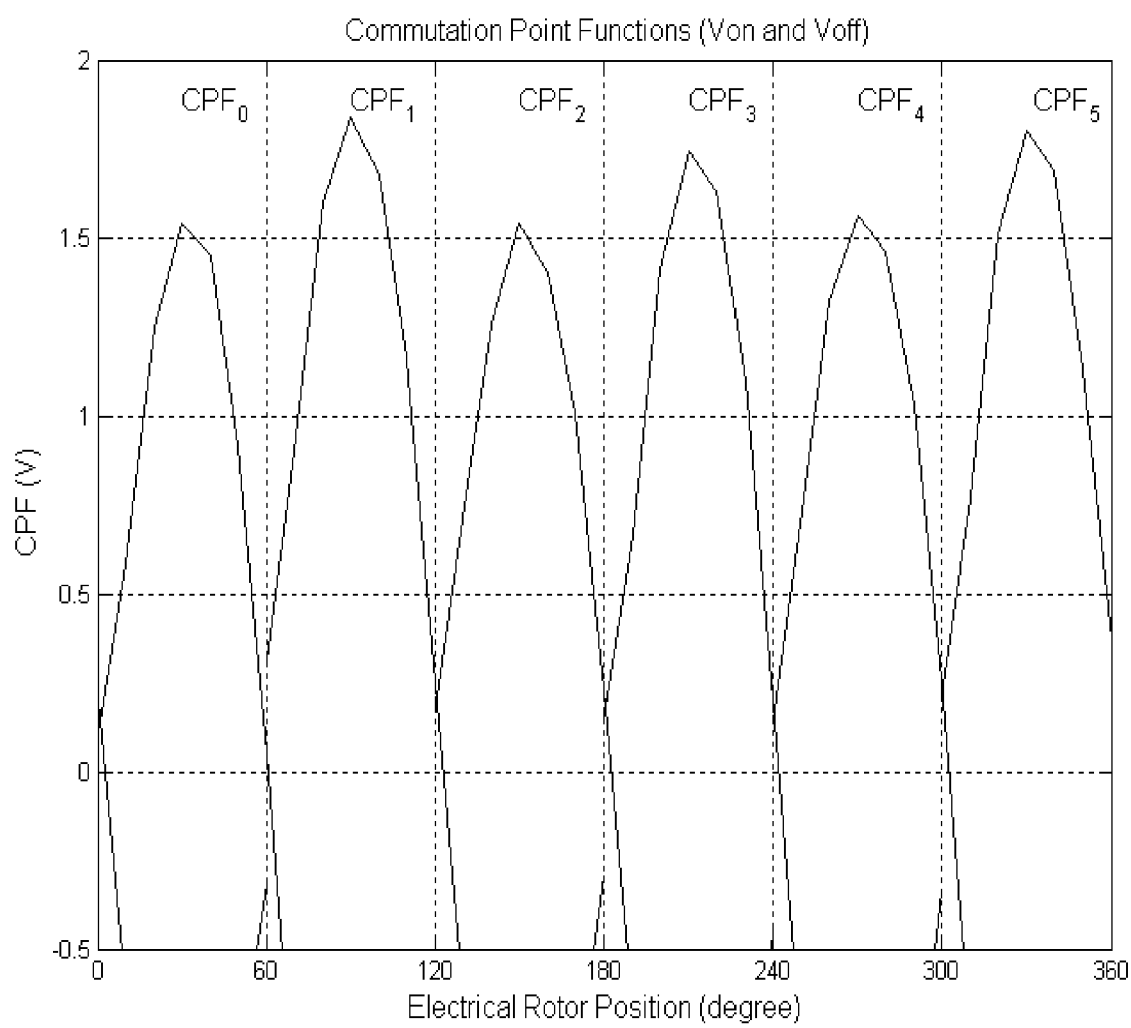
FIG. 23 illustrates CPFs calculated for BLDCM with correlated Von and Voff open phase measurements shown in FIG. 22.

A practical example of correlated Von and Voff open phase voltages measured in a BLDC motor is shown in FIG. 22 for one BLDCM electrical revolution (0°-360°). From these measurements decisive commutation points with sharp zero-crossings are calculated using the disclosed CPF calculations, as shown in FIG. 23 for one electrical revolution. The commutation points are detected when the CPFs cross the zero voltage level, that is CPF≤0.

This method of commutation point detection requires only the measurement of the first pulse shown in FIG. 20, containing the Von0 and Voff0 measurement. The other three measurement pulses containing Von1-3 and Voff1-3 measurements are inserted into the PWM stream only after a commutation point has been detected (CPF≤0) in order to determine direction of rotation using the RDF calculations. This will become apparent in the next section.

(ii) Commutation Point Functions using Von and Von Measurements (1st Embodiment)

In this first BLDCM controller embodiment, the correlated Von0 and Von1 open phase measurements, obtained using the methods disclosed previously and as shown in FIG. 20, are used to derive the commutation points for each 60° commutation interval with the following calculations:

$$CPF0\_Von\_Von = VonCba - VonCab \ (0° \leq \theta < 60°) \quad (83)$$

$$CPF1\_Von\_Von = VonBac - VonBca \ (60° \leq \theta < 120°) \quad (84)$$

$$CPF2\_Von\_Von = VonAcb - VonAbc \ (120° \leq \theta < 180°) \quad (85)$$

$$CPF3\_Von\_Von = VonCba - VonCab \ (180° \leq \theta < 240°) \quad (86)$$

$$CPF4\_Von\_Von = VonBac - VonBca \ (240° \leq \theta < 300°) \quad (87)$$

$$CPF5\_Von\_Von = VonAcb - VonAbc \ (300° \leq \theta < 360°) \quad (88)$$

The commutation points are detected when the CPFs cross the zero voltage level (CPF≤0). This method requires two measurement pulses containing the Von0, Voff0 and Von1 and Voff1 measurement pairs, as shown in FIG. 20. The other two measurement pulses containing Von2-3 and Voff2-3 measurements are inserted into the PWM stream only after a commutation point has been detected (CPF≤0) and are used to determine direction of rotation using the RDF calculations.

(iii) Commutation Point Functions using Von and Voff Measurements (2nd Embodiment (Δ))

During development it was found that with certain BLDCMs, such as delta winding configuration, it was not possible to obtain accurate commutation points using the CPFs (CPFX_Von_Voff, CPFX_Von_Von) disclosed in the first embodiment. In order to address the challenge of controller operation with the broadest possible range of BLDC motor applications, a further set of CPFs using combinations of Von and Voff open phase voltage measurements were developed. These work in conjunctions with the previously disclosed RPF and RDF equations of the 2nd embodiment, denoted with the Δ suffix.

In this second BLDCM controller embodiment, the correlated Von0 and Voff0 open phase measurements, obtained using the methods disclosed previously and as shown in FIG. 21, are used to derive the disclosed commutation points for each 60° commutation interval with the following calculations:

$$CPF0\_Von\_Voff\_\Delta = VoffBac - VonBac \ (0° \leq \theta < 60°) \quad (89)$$

$$CPF1\_Von\_Voff\_\Delta = VonAbc - VoffAbc \ (60° \leq \theta < 120°) \quad (90)$$

$$CPF2\_Von\_Voff\_\Delta = VoffCba - VonCba \ (120° \leq \theta < 180°) \quad (91)$$

$$CPF3\_Von\_Voff\_\Delta = VonBca - VoffBca \ (180° \leq \theta < 240°) \quad (92)$$

$$CPF4\_Von\_Voff\_\Delta = VoffAcb - VonAcb \ (240° \leq \theta < 300°) \quad (93)$$

$$CPF5\_Von\_Voff\_\Delta = VonCab - VoffCab \ (300° \leq \theta < 360°) \quad (94)$$

The commutation points are detected when the CPFs cross the zero voltage level (CPF≤0). This method of commutation point detection requires only the first measurement pulse containing the Von0 and Voff0 measurement, as shown in FIG. 21. The other five measurement pulses containing Von1-5 and Voff1-5 measurements are inserted into the PWM stream only after a commutation point has been detected (CPF≤0) in order to determine direction of rotation using the RDF calculations of the 2nd embodiment (Δ) of this invention.

(iv) Commutation Point Functions using Von and Von Measurements (2nd Embodiment (Δ))

In this second BLDCM controller embodiment, the correlated Von0 and Von1 open phase measurements, obtained using the methods disclosed previously and as shown in FIG. 21, are used to derive the commutation points for each 60° commutation interval with the following calculations:

$$CPF0\_Von\_Von\_\Delta = VonBca - VonBac \ (0° \leq \theta < 60°) \quad (95)$$

$$CPF1\_Von\_Von\_\Delta = VonAbc - VonAcb \ (60° \leq \theta < 120°) \quad (96)$$

$$CPF2\_Von\_Von\_\Delta = VonCab - VonCba \ (120° \leq \theta < 180°) \quad (97)$$

$$CPF3\_Von\_Von\_\Delta = VonBca - VonBac \ (180° \leq \theta < 240°) \quad (98)$$

$$CPF4\_Von\_Von\_\Delta = VonAbc - VonAcb \ (240° \leq \theta < 300°) \quad (99)$$

$$CPF5\_Von\_Von\_\Delta = VonCab - VonCba \ (300° \leq \theta < 360°) \quad (100)$$

The commutation points are detected when the CPFs cross the zero voltage level (CPF≤0). This method requires two measurement pulses containing the Von0, Voff0 and Von1 and Voff1 measurement pairs, as shown in FIG. 21. The other four measurement pulses containing Von2-5 and Voff2-5 measurements are inserted into the PWM stream only after a commutation point has been detected (CPF≤0) and are used to determine direction of rotation using the RDF calculations of the 2nd embodiment (Δ) of this invention.

(v) Commutation Point Function Detection Extensions

1. CPFs Obtained Using Other Combinations of Correlated Von and Voff Measurements The commutation point detection methods presented in the 1st and 2nd (Δ) controller embodiments are not only limited to the four disclosed CPFs (CPFX_Von_Voff, CPFX_Von_Von, CPFX_Von_Voff_Δ, CPFX_Von_Von_Δ) which were found to work with a broad range of BLDC motors in practice. Any other combinations of correlated Von and Voff open phase winding voltage measurements can also be used with the disclosed method to obtain accurate commutation points to cater for special BLDC motor applications, for example using Von and Voff measurement combinations of the form:

$$VonXxx - VoffXxx$$

$$VoffXxx - VoffXxx$$

$$VonXxx - VonXxx$$

In practice, it was found that the selection of the most suitable CPFs is dependent on the characteristics of the Von and Voff curves measured in a BLDC motor, for example as shown in FIG. 22. This can be performed as a controller optimization step with off-line measurements. Thus with the careful selection of Von and Voff measurements, it was found that it is possible to obtain CPFs with sharp zero-crossing points for any practical BLDC motor.

2. CPFs Obtained from Von or Voff Measurements in Consecutive PWM T1-T3 Cycles

Figure 24:
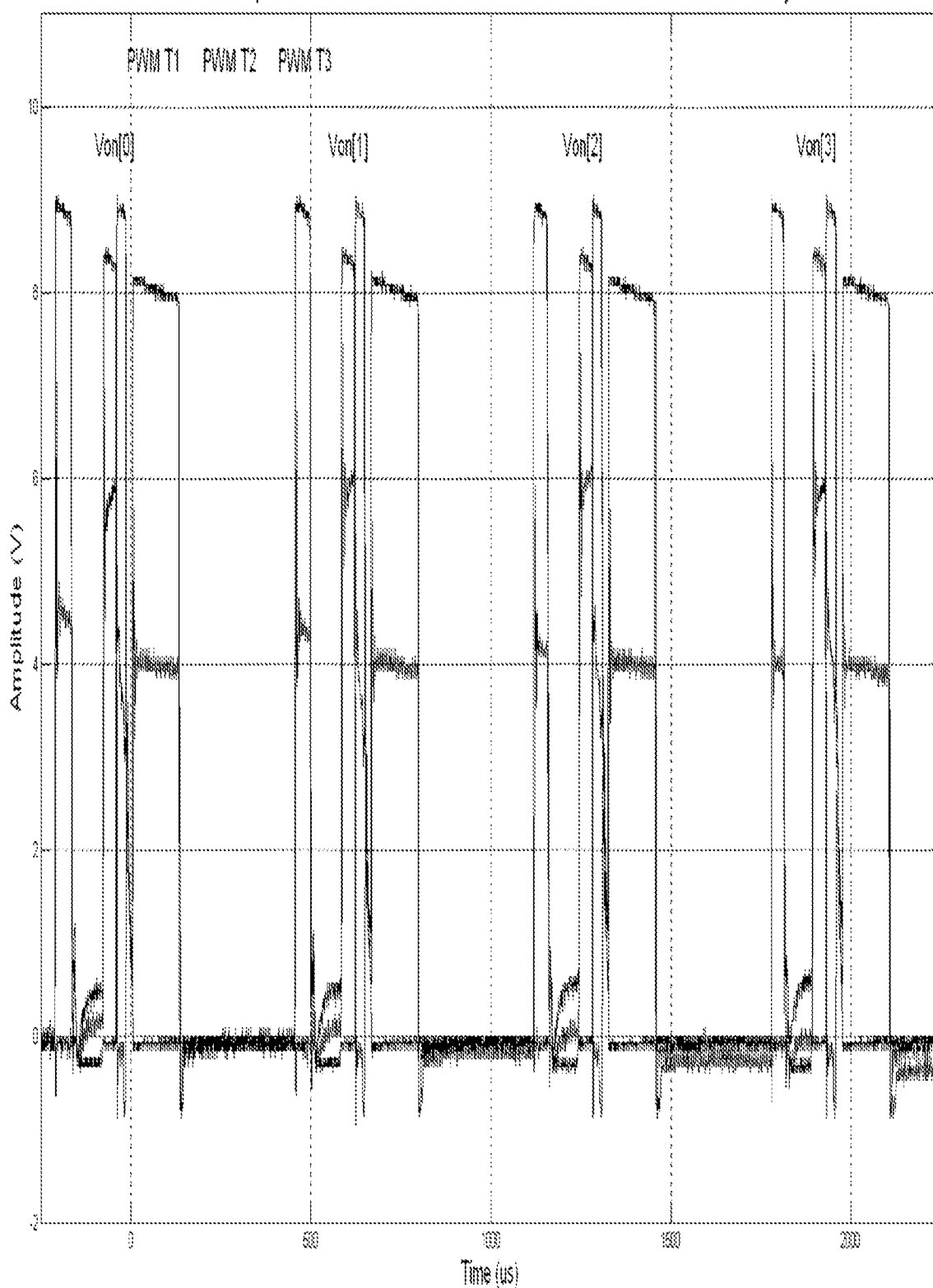
FIG. 24 illustrates an extension to CPD using only Von (or Voff) measurements from consecutive PWM T1-T3 cycles to calculate CPFs, implemented to reduce the number of required Von measurement pulses in each PWM cycle from 2 to 1.

Furthermore, as an extension to the disclosed commutation point detection methods of the $1^{st}$ and $2^{nd}$ embodiments, which use Von and Von measurements (CPFX_Von_Von) in a single PWM cycle, it is in practice also possible to combine Von and Von measurements from two consecutive PWM cycles for use in CPF calculations, as shown in FIG. 24. In this practical example CPFs are calculated with:

$CPFX\_Von\_Von[1]=Von[1]-Von[0]$ $CPFX\_Von\_Von[2]=Von[2]-Von[1]$ $CPFX\_Von\_Von[3]=Von[3]-Von[2]$

During commutation point detection with Von and Von measurements this has the advantage of reducing the number of required measurement pulses from two to one in each PWM T1-T3 cycle, which is then equivalent to the single pulse measurement method in the disclosed CPF calculation employing Von and Voff measurements (CPFX_Von_Voff). The same method can also be applied to CPFs obtained using only Voff measurements.

3. Commutation Points Obtained from Absolute Rotor Position (θ) Calculations

As a further variation to the disclosed commutation point detection methods for both the $1^{st}$ and $2^{nd}$ (Δ) embodiments, it is in practise also possible to calculate accurate commutation points for reliable sensorless brushless motor operation by using rotor position information obtained from the previously disclosed method involving the calculation of absolute rotor position (θ) in equation (50). As illustrated in the operation flowchart shown in FIG. 18, this method of rotor position (θ) detection involves the calculation of rotor position functions PA, PB and PC, by generating six pairs of correlated on-time (VonXxx) and off-time (VoffXxx) open phase measurements, which are inserted after the PWM T1-T3 cycle, as shown in the practical example in FIG. 21.

The necessary commutation points (CPF0-5) are then obtained directly from the calculated absolute rotor position, by checking the value of θ:

$CPF0: θ>=60°$ $CPF1: θ>=120°$ $CPF2: θ>=180°$ $CPF3: θ>=240°$ $CPF4: θ>=300°$ $CPF5: θ>=360°$ (d) Rotation Direction Detection To address the challenge of robust sensorless BLDCM controller operation at and near zero speeds and in the presence of external load disturbances and with reversed rotor momentum, a method for determining the rotation direction during the zero to low speed sensorless BLDCM operation is disclosed in this section. The rotation detection employs the calculation of the RPFs, ERPFs and RDFs, presented previously in the initial rotor position detection method disclosure of this controller invention.

Two rotation direction calculation embodiments are also disclosed, with the $2^{nd}$ embodiment denoted with the Δ suffix. For the implementation of the $2^{nd}$ embodiment, the function equations with the Δ suffix are used, for example RA_Δ instead of RA.

(i) Von and Voff Measurement

The required Von and Voff open phase winding measurements for rotation direction calculation are inserted after the completion of the PWM T1-PWM T3 stream, as shown in FIG. 20 for the 1st embodiment, and FIG. 21 for the 2nd embodiment (Δ) of this invention, only after a commutation point has been detected (CPF≤0). Thus during the zero to low speed sensorless BLDCM control method, the RDF calculation is performed only once for each 60° step commutation state in order to check the direction of rotation. This procedure is also illustrated in the operation flowchart in FIG. 25.

(ii) Rotation Direction Detection with RDFs and RPFs

The rotation direction detection truth table utilizing the RPF and RDF calculations for all six commutation intervals (0-360°) during sensorless operation is shown in Table 10. For example, if during forward operation forward rotation is detected, then the commutation state is incremented. Conversely, if reverse rotation is detected then the commutation state is decreased. This procedure is summarized in the operation flowchart in FIG. 25. It is valid for any of the CPF detection methods disclosed previously.

TABLE 10

Rotation direction detection during zero to low speed sensorless BLDCM operation with RDFs (RA, RB, RC) and RPFs (PA 30, PB 30, PC 30)

| Rotor Position Sector θ | Commutation State | Forward Rotation Detection Condition | Reverse Rotation Detection Condition |
|---|---|---|---|
| 0-60° | 0 | RA ≥ 0 \|\| PA_30 ≥ 0 | !(RA ≥ 0 \|\| PA_30 ≥ 0) |
| 60-120° | 1 | RC ≤ 0 \|\| PC_30 ≤ 0 | !(RC ≤ 0 \|\| PC_30 ≤ 0) |
| 120-180° | 2 | RB ≥ 0 \|\| PB_30 ≥ 0 | !(RB ≥ 0 \|\| PB_30 ≥ 0) |
| 180-240° | 3 | RA ≤ 0 \|\| PA_30 ≤ 0 | !(RA ≤ 0 \|\| PA_30 ≤ 0) |
| 240-300° | 4 | RC ≥ 0 \|\| PC_30 ≥ 0 | !(RC ≥ 0 \|\| PC_30 ≥ 0) |
| 300-360° | 5 | RB ≤ 0 \|\| PB_30 ≤ 0 | !(RB ≤ 0 \|\| PB_30 ≤ 0) |

(iii) Rotation Direction Detection with RDFs and ERPFs

The rotation direction detection truth table utilizing the ERPF and RDF calculations for all six commutation intervals (0-360°) during sensorless operation is shown in Table 11. It is valid for any of the CPF detection methods. The operation procedure is the same as with the RPF calculations, as shown in the flowchart in FIG. 25.

TABLE 11

Rotation direction detection during zero to low speed
sensorless BLDCM operation with RDFs (RA, RB, RC) and ERPFs
(EPA0_30, EPC1_30, EPB2_30, EPA3_30, EPC4_30, EPB5_30)

| Rotor Position Sector θ | Commutation State | Forward Rotation Detection Condition | Reverse Rotation Detection Condition |
|---|---|---|---|
| 0-60° | 0 | RA ≥ 0 \|\| EPA0_30 ≥ 0 | !(RA ≥ 0 \|\| EPA0_30 ≥ 0) |
| 60-120° | 1 | RC ≤ 0 \|\| EPC1_30 ≤ 0 | !(RC ≤ 0 \|\| EPC1_30 ≤ 0) |
| 120-180° | 2 | RB ≥ 0 \|\| EPB2_30 ≥ 0 | !(RB ≥ 0 \|\| EPB2_30 ≥ 0) |
| 180-240° | 3 | RA ≤ 0 \|\| EPA3_30 ≤ 0 | !(RA ≤ 0 \|\| EPA3_30 ≤ 0) |
| 240-300° | 4 | RC ≥ 0 \|\| EPC4_30 ≥ 0 | !(RC ≥ 0 \|\| EPC4_30 ≥ 0) |
| 300-360° | 5 | RB ≤ 0 \|\| EPB5_30 ≤ 0 | !(RB ≤ 0 \|\| EPB5_30 ≤ 0) |

(iv) Rotation Direction Detection Extensions

Depending on the BLDCM application, the disclosed forward/reverse rotation direction detection check can also be implemented using only RDFs (RA, RB, RC) calculations or only RPFs (PA_30, PB_30, PC_30)/ERPFs (EPA0_30, EPC1_30, EPB2_30, EPA3_30, EPC4_30, EPB5_30) calculations in order to reduce controller computation complexity.

Furthermore, it is also possible to obtain accurate rotation direction information by utilizing the absolute rotor position (θ) calculation disclosed previously in equation (50). This requires the six pairs of correlated on-time (VonXxx) and off-time (VoffXxx) open phase measurements, as shown in the practical example in FIG. 21, and can be calculated after each PWM T1-T3 cycle or after a new commutation point has been detected. Assuming that a forward mode of operation results in increasing rotor position angle (θ), the rotation direction can be determined by comparing the values of consecutive absolute rotor position (θ) calculations:

Forward Rotation: θ[$n$+1]>θ[$n$]

Reverse Rotation: θ[$n$+1]<θ[$n$]

(v) Rotation Direction Detection Extensions using Enhanced Rotor Position Functions In application with certain types of BLDC motors, such internal permanent magnet (IPM) motors, it was found that the calculation order of the +30° shifted enhanced rotor position functions (EPA0_30, EPC1_30, EPB2_30, EPA3_30, EPC4_30, EPB5_30) for both the 1st and 2nd (Δ) embodiments had to be modified, in order to obtain the same effect. This is achieved by swapping the enhanced rotor position function calculations with the same phase coil pairs (eg. EPAx_30, EPBx_30, EPCx_30) as outlined below:

$EPA0x\_30 = EPA3x\_30$ (0°≤θ<60°)

$EPC1x\_30 = EPC4x\_30$ (60°≤θ<120°)

$EPB2x\_30 = EPB5x\_30$ (120°≤θ<180°)

$EPA3x\_30 = EPA0x\_30$ (180°≤θ<240°)

$EPC4x\_30 = EPC1x\_30$ (240°≤θ<300°)

$EPB5x\_30 = EPB2x\_30$ (300°≤θ<360°)

Where: x={' ', _Δ}

Thus, this calculation swap applies to all of the following disclosed enhanced rotor position function calculations shifted by +30°, of the 1st and 2nd (Δ) embodiments:
(EPA0_30, EPC1_30, EPB2_30, EPA3_30, EPC4_30, EPB5_30)

(EPA0_Δ_30, EPC1_Δ_30, EPB2_Δ_30, EPA3_Δ_30, EPC4_Δ_30, EPB5_Δ_30)

(e) Sensorless BLDCM Commutation

The disclosed sensorless commutation point detection methods deliver decisive and robust commutation points to control the BLDCM stator magnetic field in 60° steps. The strength of the stator magnetic field is determined by the magnitude of the BLDCM phase currents, which are regulated with the disclosed PWM method consisting of three distinct intervals (PWM T1, PWM T2, PWM T3). This step is illustrated in operation flowchart in FIG. 25. The resultant stator magnetic field interacts with the magnetic field in the permanent magnet rotor, generating a torque on the rotor axis and forcing it to turn.

(i) Sensorless Commutation (1st Embodiment)

Figure 26:
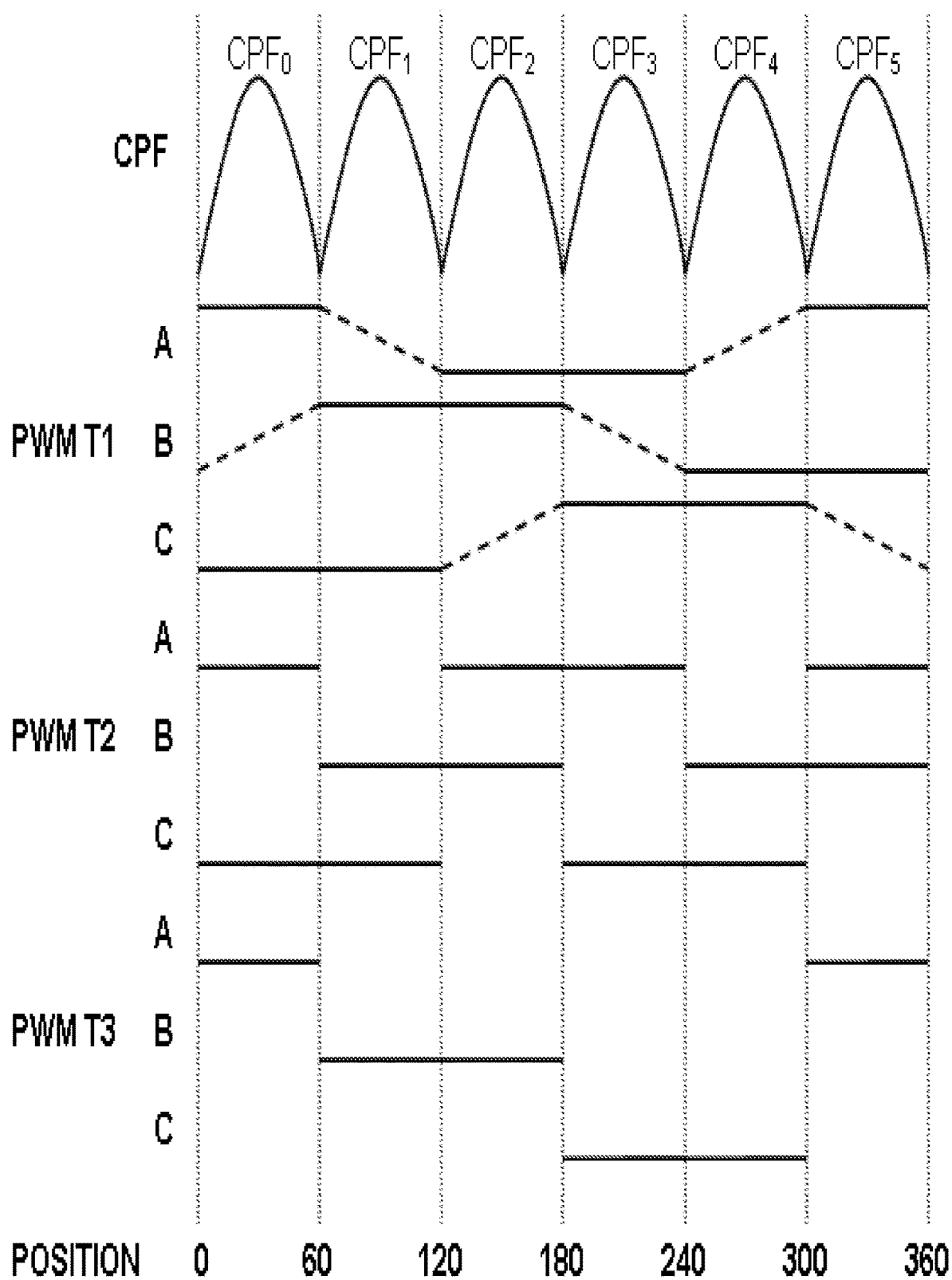
FIG. 26 illustrates a zero to low speed sensorless BLDCM controller commutation point detection and phase winding switching states including QFOC (- - -) (1st embodiment).

The active phase coils in each commutation state during PWM T1, PWM T2 and PWM T3 intervals in the 1st embodiment of this invention are summarized in Table 12, Table 13, Table 14 respectively. The corresponding commutation point function detection and the phase winding power transistor switching sequence for each of the six commutation steps is shown in FIG. 26.

TABLE 12

PWM T1 interval phase coil switching states in the 1st embodiment

| Rotor Position Sector θ | Commutation State | To Active Bottom Phase Coil | Active Phase Coil |
|---|---|---|---|
| 0-60° | 0 | A+ | C− |
| 60-120° | 1 | B+ | C− |
| 120-180° | 2 | B+ | A− |
| 180-240° | 3 | C+ | A− |
| 240-300° | 4 | C+ | B− |
| 300-360° | 5 | A+ | B− |

TABLE 13

PWM T2 interval phase coil switching states in the 1$^{st}$ embodiment

| Rotor Position Sector θ | Commutation State | Top Active Phase Coil | Bottom Active Phase Coil |
|---|---|---|---|
| 0-60° | 0 | — | C−, A− |
| 60-120° | 1 | — | C−, B− |
| 120-180° | 2 | — | A−, B− |
| 180-240° | 3 | — | A−, C− |
| 240-300° | 4 | — | B−, C− |
| 300-360° | 5 | — | B−, A− |

TABLE 14

PWM T3 interval phase coil switching states in the 1st embodiment

| Rotor Position Sector θ | Commutation State | Top Active Phase Coil | Bottom Active Phase Coil |
|---|---|---|---|
| 0-60° | 0 | — | A− |
| 60-120° | 1 | — | B− |
| 120-180° | 2 | — | B− |
| 180-240° | 3 | — | C− |
| 240-300° | 4 | — | C− |
| 300-360° | 5 | — | A− |

(ii) Sensorless Commutation (2nd Embodiment (Δ))

Figure 27:
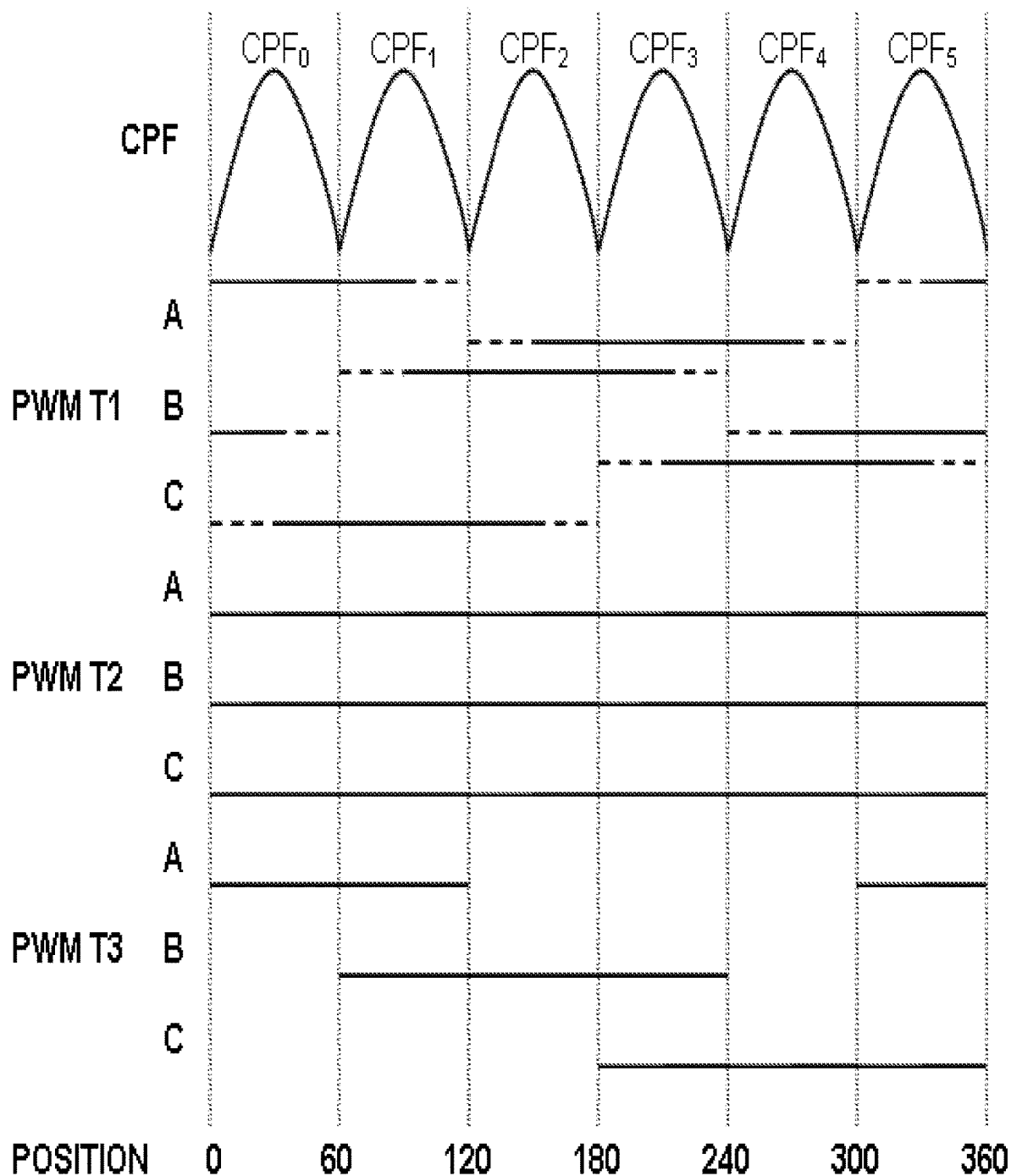
FIG. 27 illustrates a zero to low speed sensorless BLDCM controller commutation point detection and phase winding switching states including QFOC (- - -) (2nd embodiment (Δ)).

The active phase coils in each commutation state during PWM T1, PWM T2 and PWM T3 intervals in the 2nd embodiment (Δ) are summarized in Table 15, Table 16, Table 17 respectively. The corresponding commutation point function detection and the phase winding power transistor switching sequence for each of the six commutation steps is shown in FIG. 27.

TABLE 15

PWM T1 interval phase coil switching states in the 2nd embodiment (Δ)

| Rotor Position Sector θ | Commutation State | Top Active Phase Coil | Bottom Active Phase Coil |
|---|---|---|---|
| 0-60° | 0 | A+ | B−, C− |
| 60-120° | 1 | A+, B+ | C− |
| 120-180° | 2 | B+ | A−, C− |
| 180-240° | 3 | B+, C+ | A− |
| 240-300° | 4 | C+ | A−, B− |
| 300-360° | 5 | A+, C+ | B− |

TABLE 16

PWM T2 interval phase coil switching states in the 2nd embodiment (Δ)

| Rotor Position Sector θ | Commutation State | Top Active Phase Coil | Bottom Active Phase Coil |
|---|---|---|---|
| 0-60° | 0 | — | C−, A−, B− |
| 60-120° | 1 | — | C−, B−, A− |
| 120-180° | 2 | — | A−, B−, C− |
| 180-240° | 3 | — | A−, C−, B− |
| 240-300° | 4 | — | B−, C−, A− |
| 300-360° | 5 | — | B−, A−, C− |

TABLE 17

PWM T3 interval phase coil switching states in the 2nd embodiment (Δ)

| Rotor Position Sector θ | Commutation State | Top Active Phase Coil | Bottom Active Phase Coil |
|---|---|---|---|
| 0-60° | 0 | — | A− |
| 60-120° | 1 | — | B−, A− |
| 120-180° | 2 | — | B− |
| 180-240° | 3 | — | C−, B− |
| 240-300° | 4 | — | C− |
| 300-360° | 5 | — | A−, C− |

(f) Quasi Field Oriented Control

In the previously disclosed method of sensorless commutation, the stator magnetic field remains fixed while the rotor turns through an angle of 60°. The relative angle between stator and rotor magnetic fields thus changes from 120° to 60°. The maximum BLDC motor torque is produced when the angle between the stator and rotor magnetic fields is 90°.

This disclosure describes a quasi FOC method used to estimate continuous rotor position with which a constant 90° torque angle can be produced in a BLDCM to address this challenge and improve performance. It uses the information contained in the previously disclosed CPFs which in general have been found to exhibit sinusoidal waveform behaviour, as shown in the BLDCM example in FIG. 23.

An inverse sine operation can be used to calculate the continuous rotor angle (φ) from the CPFs with the calculations given below, where CPFmax is the peak amplitude of the CPF in each 60° rotor position sector:

$$\varphi = \sin^{-1}(CPF/CPF\text{max})/3 \quad (0° \leq \theta < 30°) \tag{101}$$

$$\varphi = 60 - \sin^{-1}(CPF/CPF\text{max})/3 \quad (30° \leq \theta < 60°) \tag{102}$$

The estimated continuous rotor angle (φ) is then used to modulate the third phase coil in each 60° commutation state. This disclosed QFOC calculation step is shown in the operation flowchart in FIG. 25.

It should be noted that in practical applications, CPFs which do not exhibit sinusoidal waveform behaviour can also utilise other possible calculation methods or functions, for example, such as higher-order polynomial functions or piecewise linear functions, in order to deduce continuous rotor angle (φ) from the measured CPF values, as required by the disclosed QFOC method of operation.

(i) QFOC (1st Embodiment)

To implement the QFOC operation in the 1st embodiment of this invention, the active phase coil switching states during PWM T1 interval operation are modified as shown in Table 18. The QFOC modulated phase coil is switched in a complimentary manner between the supply voltage (Vs) and ground rail (0V), with the duty cycle proportional to the estimated rotor position angle (φ). The corresponding commutation point function detection and the phase winding power transistor switching sequence employing QFOC for each of the six commutation steps is shown in FIG. 26.

TABLE 18

PWM T1 interval quasi FOC operation phase coil switching states in the 1st embodiment

| Rotor Position Sector θ | Commutation State | Top Active Phase Coil | Bottom Active Phase Coil | QFOC φ Modulated Phase Coil |
|---|---|---|---|---|
| 0 → 60° | 0 | A+ | C− | B+− (0 → 100%) |
| 60 → 120° | 1 | B+ | C− | A+− (100 → 0%) |
| 120 → 180° | 2 | B+ | A− | C+− (0 → 100%) |
| 180 → 240° | 3 | C+ | A− | B+− (100 → 0%) |
| 240 → 300° | 4 | C+ | B− | A+− (0 → 100%) |
| 300 → 360° | 5 | A+ | B− | C+− (100 → 0%) |

(ii) QFOC (2nd Embodiment (Δ))

To implement the QFOC operation in the 2nd embodiment, the active phase coil switching states during PWM T1 interval operation are modified as shown in Table 19. In this embodiment, the QFOC modulation uses either the bottom or top side power transistor to switch the phase coil, with a duty cycle proportional to the estimated rotor position angle (φ). The corresponding commutation point function detection and the phase winding power transistor switching sequence employing QFOC for each of the six commutation steps is shown in FIG. 27.

TABLE 19

PWM T1 interval quasi FOC operation phase coil switching states in the 2nd embodiment (Δ)

| Rotor Position Sector θ | Commutation State | Top Active Phase Coil | Bottom Active Phase Coil | QFOC φ Modulated Phase Coil |
|---|---|---|---|---|
| 0 → 30° | 0 | A+ | B− | C− (0 → 100%) |
| 30 → 60° | 0 | A+ | C− | B− (100 → 0%) |
| 60 → 90° | 1 | A+ | C− | B+ (0 → 100%) |
| 90 → 120° | 1 | B+ | C− | A+ (100 → 0%) |
| 120 → 150° | 2 | B+ | C− | A− (0 → 100%) |
| 150 → 180° | 2 | B+ | A− | C− (100 → 0%) |
| 180 → 210° | 3 | B+ | A− | C+ (0 → 100%) |
| 210 → 240° | 3 | C+ | A− | B+ (100 → 0%) |
| 240 → 270° | 4 | C+ | A− | B− (0 → 100%) |
| 270 → 300° | 4 | C+ | B− | A− (100 → 0%) |
| 300 → 330° | 5 | C+ | B− | A+ (0 → 100%) |
| 330 → 360° | 5 | A+ | B− | C+ (100 → 0%) |

Rotor Magnetic Field Strength Measurement

Figure 28:
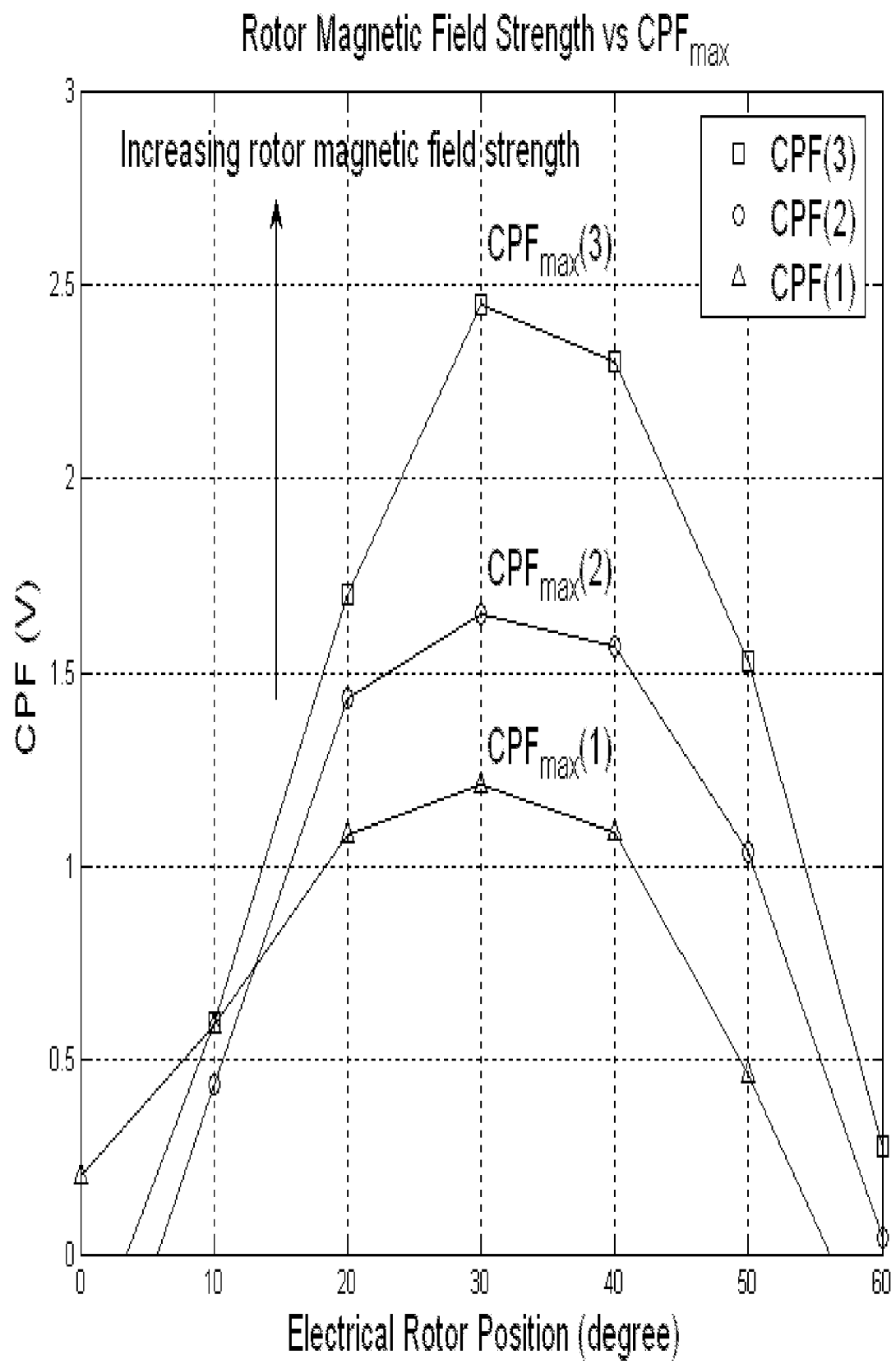
FIG. 28 illustrates a rotor magnetic field strength measurement based on CPFmax values measured during zero to low speed sensorless BLDCM operation for different motors with increasing rotor magnetic field strengths.

The developed commutation point functions (CPF) disclosed in the zero to low speed sensorless BLDCM operation present an opportunity to ascertain the relative rotor magnetic field strength measurement and addresses the challenge of BLDCM rotor performance monitoring in real time and over its entire life time of operation. During the development, it was found that the peaks (CPFmax) of the calculated CPFs are directly proportional to the rotor magnetic field strength in a BLDCM. Thus the greater the maximum CPF value, the greater is the resultant rotor magnetic field strength, as shown in FIG. 28 for CPFs calculated in practical BLDC motors. This measurement is possible because the disclosed CPFs represent the phase winding inductance variations that depend on the BLDCM rotor inherent and magnetic saturation saliency, which is also directly proportional to the magnetic field strength of its rotor.

To obtain a useful indicator of the relative rotor magnetic field strength for use in BLDCM applications, the disclosed method involves the calculation of maximum CPF value (CPFmax) which is independent of the power supply voltage (Vs), as shown below:

$$CPFmaxR = CPFmax/Vs \quad (103)$$

Figure 29:
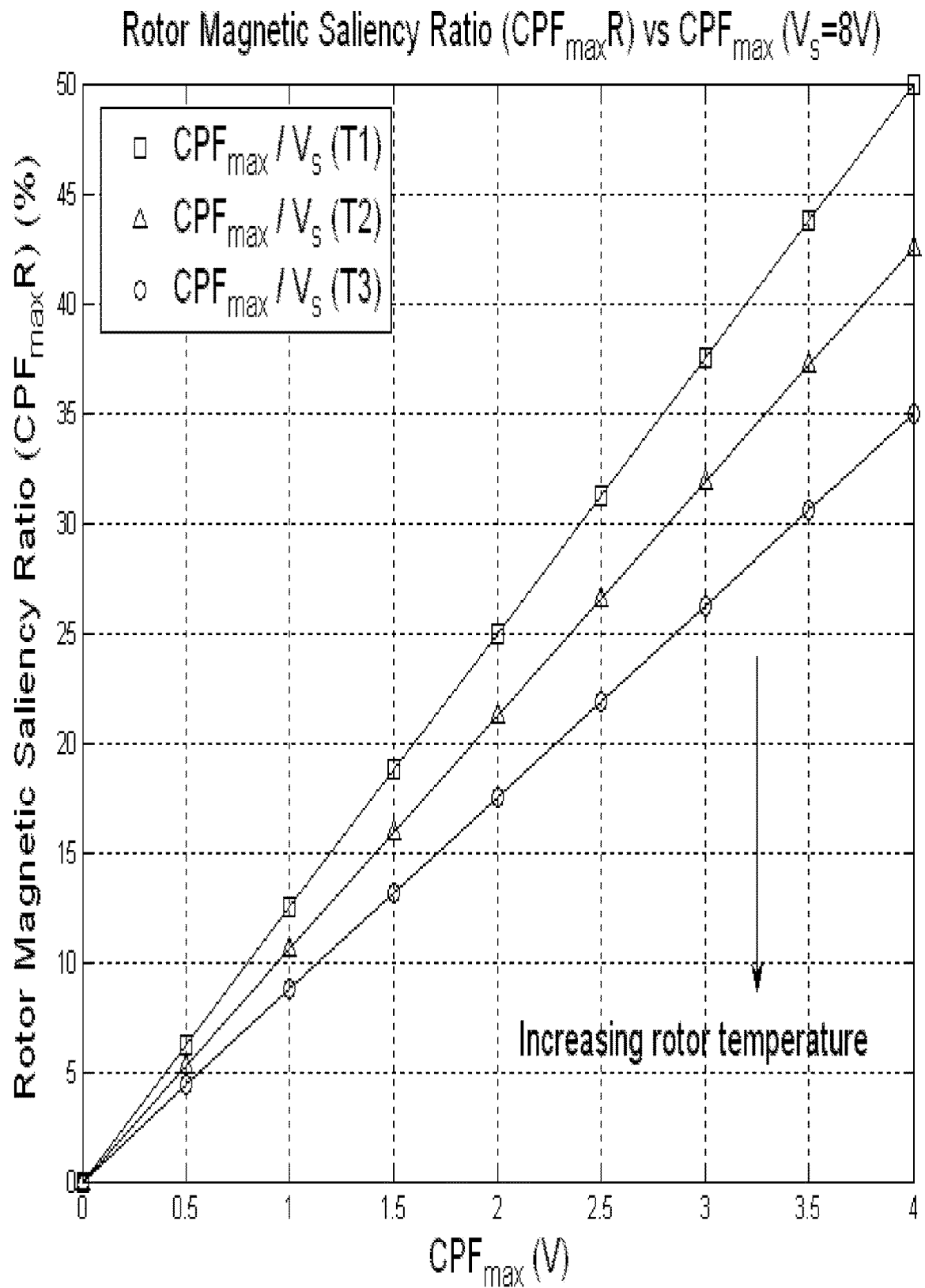
FIG. 29 illustrates a rotor magnetic saliency ratio vs CPFmax curves for increasing rotor magnet temperature.

The resultant magnetic field strength saliency ratio (CPFmaxR) curves are illustrated in FIG. 29. This calculation step during the zero to low speed sensorless BLDCM operation is shown in the flowchart in FIG. 25.

Sensorless Motor Temperature Measurement

A method of motor winding temperature measurement using phase current and voltage measurements to calculate copper phase winding resistance, which is proportional to its temperature, is disclosed in U.S. Pat. No. 4,083,001. High accuracy phase current measurement requirement however, increases controller's electronic circuit complexity, size and cost.

Figure 30:
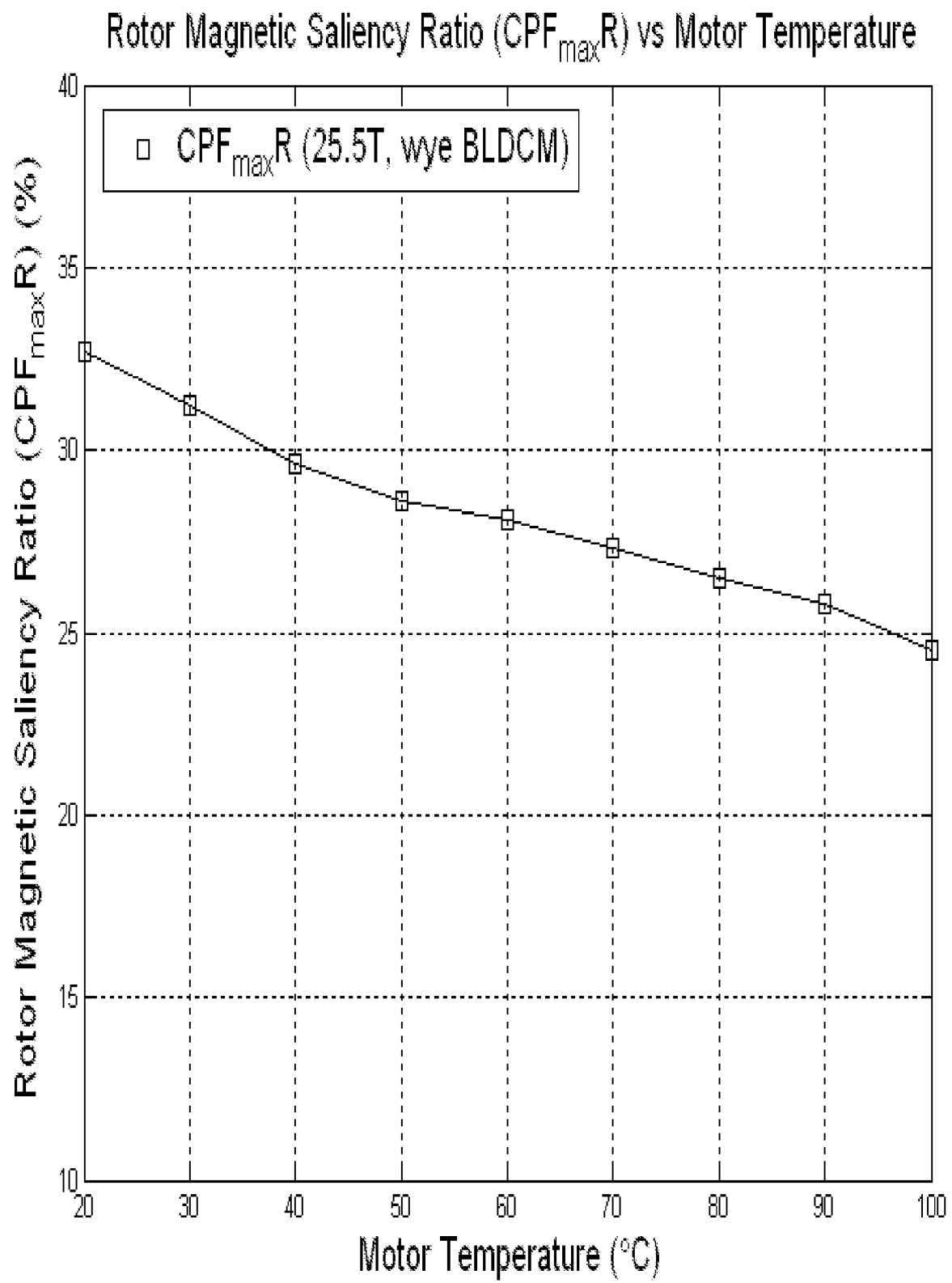
FIG. 30 illustrates a rotor magnetic saliency ratio variation with motor temperature measured in a 25.5 turn wye winding BLDCM.

As an extension to the previously disclosed rotor magnetic field strength measurement, it was found that the same CPFmaxR measurement can also be used to indicate the relative motor temperature during real time operation. Those skilled in this art can appreciate that this phenomenon occurs because the magnetic field strength of a rotor is directly proportional its temperature. FIG. 29 illustrates the typical rotor magnetic saliency ratio curves for BLDC motors exposed to different operating temperatures. As tested, the calculated CPFmaxR values decrease with increasing temperature. FIG. 30 shows an example of BLDCM CPFmaxR variation with increasing motor temperature measured in practice.

Figure 31:
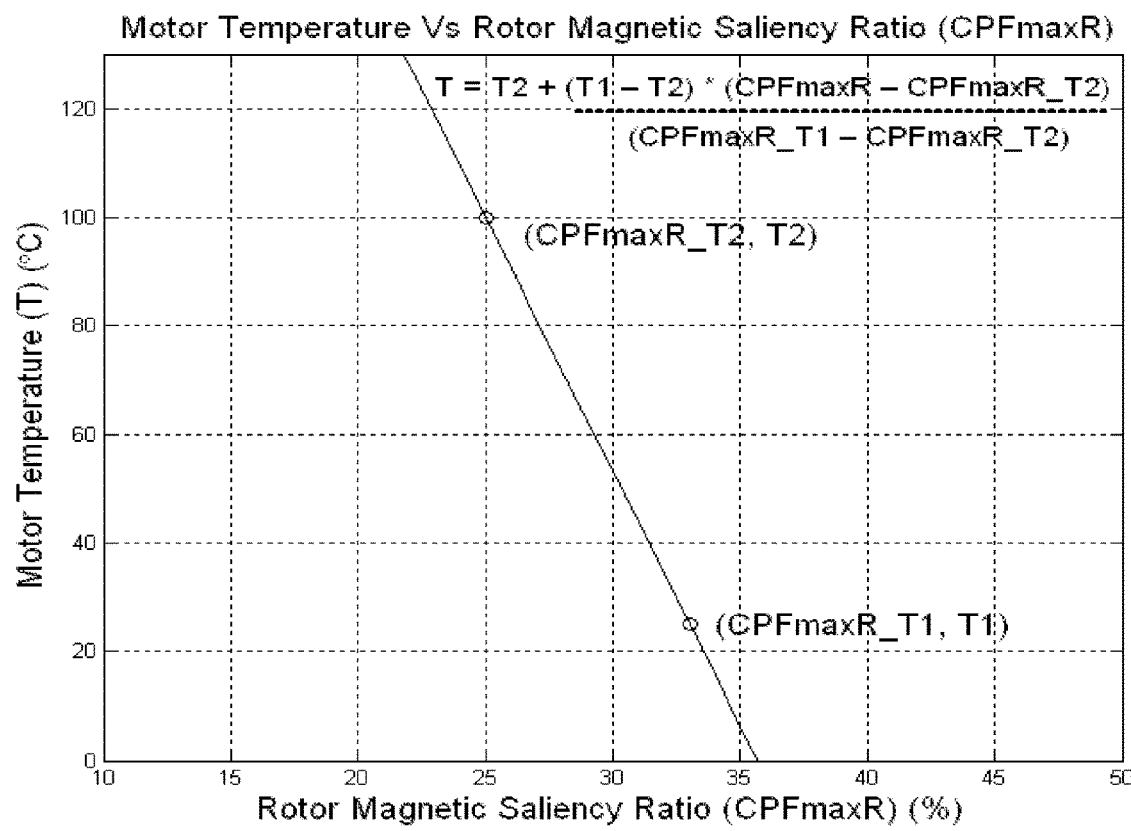
FIG. 31 illustrates a sensorless motor temperature measurement in a BLDC motor employing straight line approximation and two pairs of motor temperature and magnetic field strength saliency ratio (CPFmaxR) measurements at cold (CPFmaxR_T1, T1) and hot (CPFmaxR_T2, T2) motor temperatures.

This relationship between the motor temperature and the rotor magnetic field strength saliency ratio (CPFmaxR) has been found to be linear for common BLDC motors tested. In practice, BLDC motors consisting of different electrical and mechanical construction and rotor magnetic field strength, also exhibit different CPFmaxR profiles. In the disclosed sensorless motor temperature measurement method, precise motor temperature measurements are obtained by tuning the individual BLDC motor temperature and CPFmaxR profiles. This is achieved by first measuring two pairs of motor temperature and magnetic field strength saliency ratio (CPFmaxR) measurements at cold (CPFmaxR_T1, T1) and hot (CPFmaxR_T2, T2) motor temperatures, as illustrated in FIG. 31. The motor temperature can then be calculated directly from the CPFmaxR measurements obtained during the previously disclosed zero to low speed sensorless BLDCM operation via the following straight line equation:

$$T = T2 + (T1 - T2) \cdot (CPFmaxR - CPFmaxR\_T2)/(CPFmaxR\_T1 - CPFmaxR\_T2) \quad (104)$$

The disclosed embodiment of sensorless motor temperature measurement method, using a straight line approximation, is illustrated in FIG. 31. For BLDC motors with measured CPFmaxR vs motor temperature profiles which do not exhibit a straight line proportional relationship, a high order polynomial equation can be used to obtain the required CPFmaxR to motor temperature (T) relationship mapping.

The disclosed method can thus be used to monitor a BLDC motor temperature during operation without any additional temperature sensing hardware and electronic circuitry, saving system cost and increasing operational reliability. This calculation step during the zero to low speed sensorless BLDCM operation is shown in the flowchart in FIG. 25.

Low to High Speed Sensorless BLDCM Operation

The RIMS saliency based initial rotor position detection and the zero to low speed sensorless BLDCM commutation technique disclosed in previous sections provide faultless motor starts and operation at and near zero speeds. This section discloses a second sensorless BLDCM controller method developed to operate BLDCMs at low and high motor speeds. This part of the hybrid controller approach is illustrated in FIG. 1.

The developed sensorless brushless commutation point detection (CPD) method employs conventional BEMF open phase voltage measurements to operate BLDCMs at very high speeds. To extend sensorless BLDCM operation into the low speed region and close to zero speeds, the disclosed method also utilizes inductance variations voltage measurements due to RIMS saliency to detect accurate rotor position and commutation points.

Several prior art solutions which utilize inductance variations to detect sensorless commutation points in BLDCM applications are known. CH698071 presents a technique of measuring the inductance variation voltage at the open-phase terminals during PWM on-time and off-time motor driving switching intervals. From these +30° advanced timing motor commutation points are obtained. However, these have the significant disadvantage of reduced output motor torque and efficiency. U.S. Pat. Nos. 7,768,226 and 9,391,553 use inductance variation voltage measurements to determine the commutation points, however these methods require additional hardware circuitry as well as a fourth motor neutral point connection which limits the range of possible applications only to wye configuration BLDC motors. US20140062364 describes another similar method requiring motor's neutral point information to obtain sensorless commutation points, however in this method an external circuit is needed to simulate a virtual motor neutral point. U.S. Pat. Nos. 8,552,671 and 8,593,098 rely on changes in phase current measurements due to inductance variations to determine commutation points, however these methods require expensive and accurate current sensing measurement circuitry. U.S. Pat. No. 8,773,060 describes a technique of commutation point detection utilizing voltage measurements due to inductance variations and addressing the challenge of operation at higher BLDC motor temperatures. However, this method requires motor temperature measurement using external temperature sensors built into the motor and associated electronic circuitry, increasing the system costs. It also requires more complicated learning algorithms to adjust the commutation point detection voltage thresholds for BLDC motors operating at different temperatures.

Figure 32:
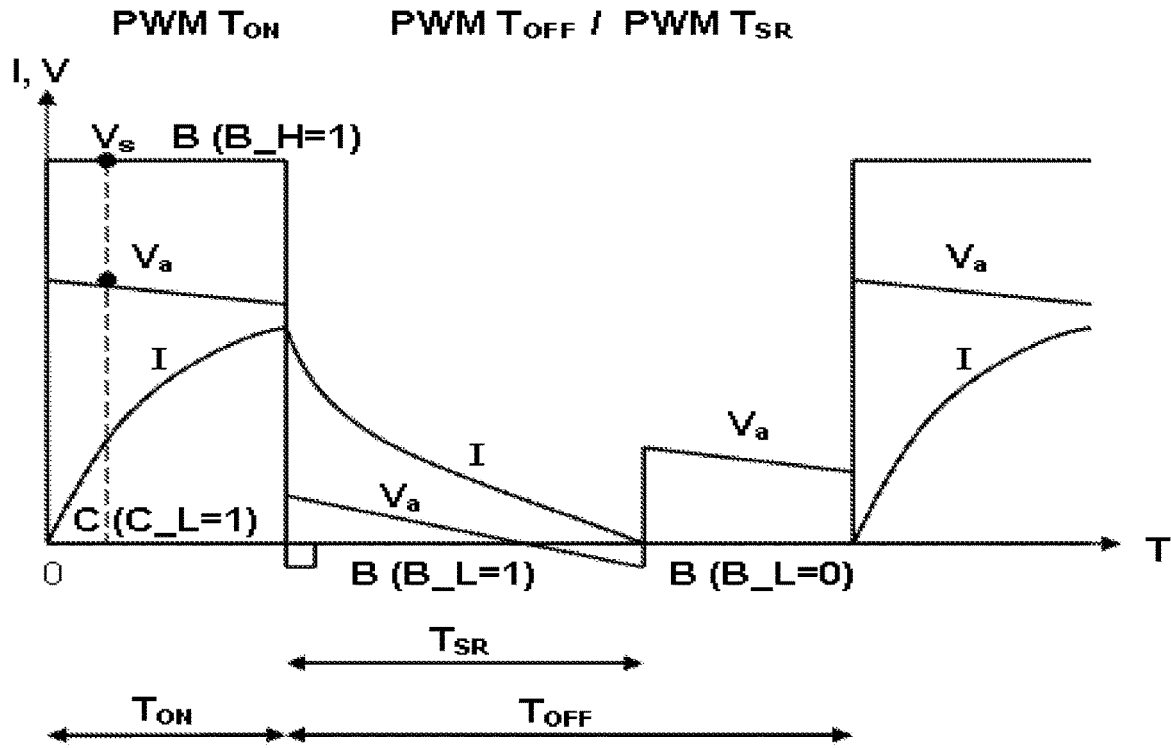
FIG. 32 illustrates a low to high speed sensorless BLDCM operation PWM switching intervals, with optimal software controlled synchronous rectifier duration (TSR) active during PWM off-time.

In contrast to prior art methods, the disclosed low to high speed sensorless BLDCM method uses the peaks of commutation point functions (CPFmax), measured during the previously disclosed zero to low speed sensorless BLDCM operation, to set the optimum commutation point detection voltage threshold levels. The resultant commutation points are optimum at all motor temperatures and exhibit quasi 0° commutation timing for maximum motor driving torque. To address the challenge of increased controller efficiency during PWM off-time switching, a software controlled PWM synchronous rectifier is also integrated into the PWM switching sequence to control optimum synchronous rectifier on-time duration. Standard PWM switching technique is used to control motor driving phase currents. The developed PWM switching sequence when B+/C− coil pair is energized is illustrated in FIG. 32.

The key innovations of the disclosed sensorless BLDC motor operation include: 1) A Robust and simple commutation point detection (CPD) method implemented during PWM on-time (PWM TON) switching interval, employing inductance voltage variations due to RIMS saliency and maximum values of the commutation point functions (CPFmax) measured during zero to low speed sensorless BLDCM operation; 2) Optimum commutation point detection voltage threshold setting for each BLDCM application, with quasi 0° commutation timing and automatic CPD voltage threshold compensation for motor temperature variations; 3) Sensorless BLDCM operation near zero speeds, low and high motor speeds; 4) Software controlled PWM synchronous rectification (PWM TSR), optimally controlled during PWM off-time (PWM TOFF) switching interval, to increase controller efficiency; 5) Reduced controller hardware complexity and cost.

Figure 34:
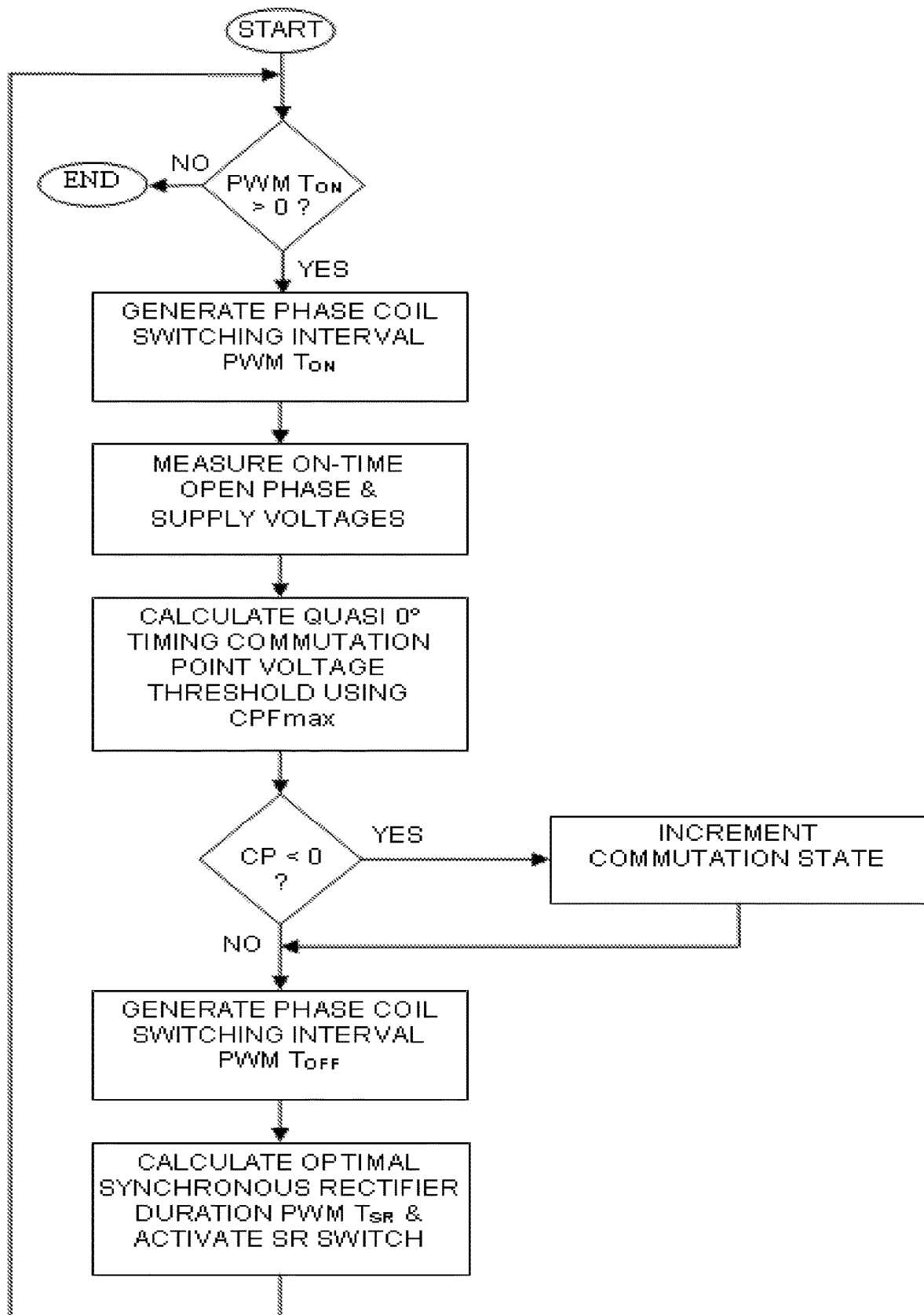
FIG. 34 illustrates a low to high speed sensorless BLDCM controller operation flowchart.

The operation flowchart of the disclosed low to high speed sensorless BLDCM controller operation is illustrated in FIG. 34.

(a) Quasi 0° Timing Commutation Point Detection at Low Speeds

Conventional sensorless brushless operation utilizes BEMF voltages during PWM on-time to detect commutation points when the measured open phase voltage crosses the half way point of the supply voltage rail (Vs/2). Compared to the ideal 0° timing commutation intervals, this point occurs at +30° advanced timing, resulting in reduced motor torque and efficiency. To overcome this challenge, the sensorless BLDCM commutation point detection method disclosed employs offset voltage thresholds with which quasi 0° commutation timing points are attained.

(i) PWM On-Time Open Phase and Supply Voltage Measurement

The first two steps of the disclosed method involve energizing a pair of phase coils and measuring the open phase and supply phase voltage (Vs), as shown in the PWM switching example in FIG. 32, with B+/C− as the active coil pair and Va the open phase coil measurement. This voltage measurement technique is similar to the Von and Vs measurement disclosed in previous sections of this controller discussion (see FIG. 8). These two initial steps of operation are illustrated in the flowchart in FIG. 34.

(ii) PWM On-time Commutation Point Detection

Figure 33:
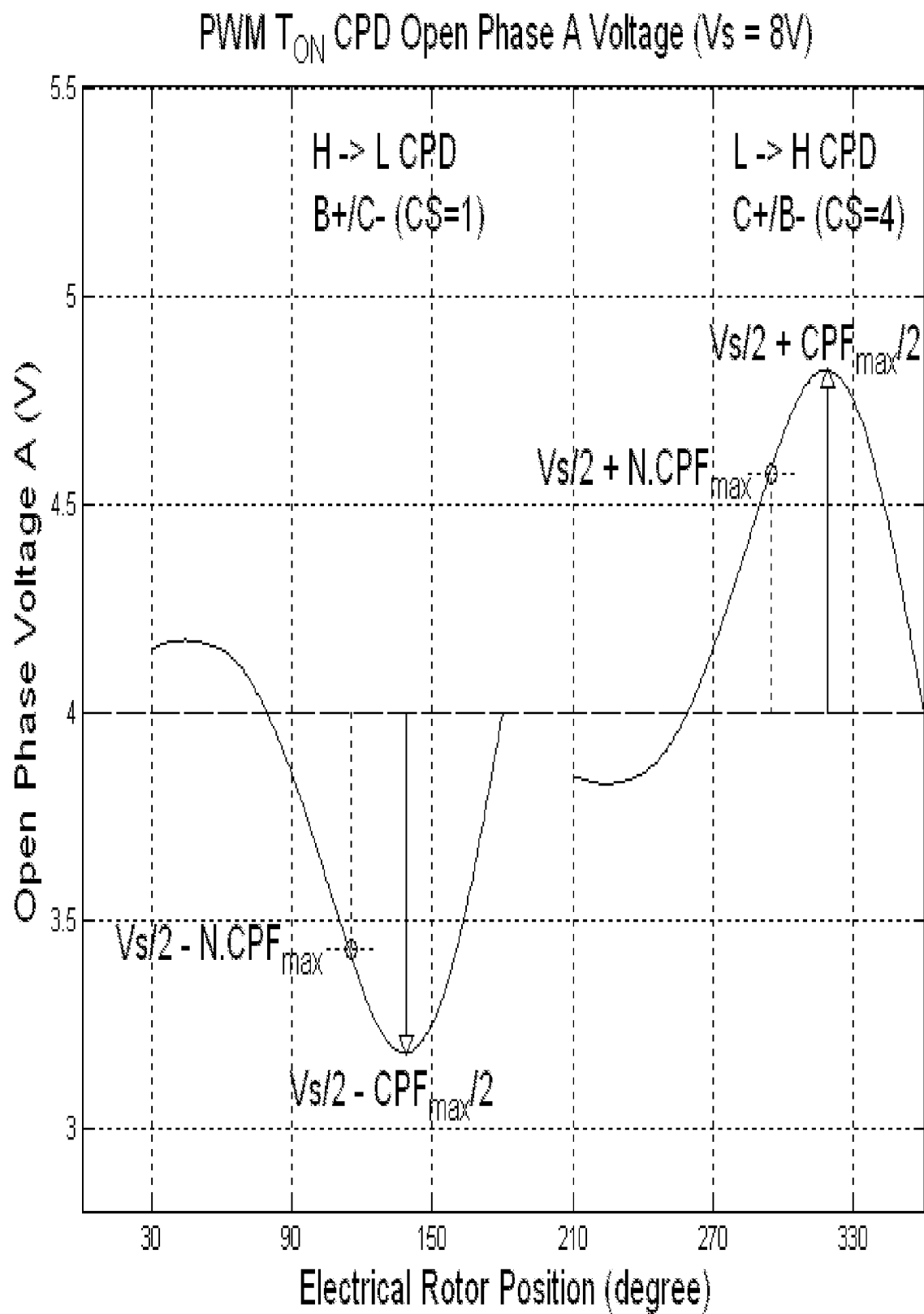
FIG. 33 illustrates a low to high speed sensorless BLDCM operation H→L and L→H commutation point detection voltage thresholds employing CPFmax measurements during PWM on-time switching interval.

RIMS saliency properties are utilized next to detect accurate sensorless commutation points during the PWM on-time switching interval at low motor speeds. An example of this is shown in FIG. 33 where open phase A measurements are used. To ensure open phase voltage variations occurring due to changing phase coil inductances are measurable during this PWM interval, it was found the following conditions have to be satisfied:

1. Minimum PWM on-time duration is limited to ~15 us. This ensures that a phase current pulse with sufficient amplitude is injected into the energized coils to evoke RIMS saliency effects in the open phase voltage measurements required for commutation point detection 2. At 100% PWM duty cycle of operation, RIMS saliency effects are not measurable. Thus in practice, during operation at near zero and low speed the maximum PWM on-time duty cycle is restricted to ~95%

To obtain reliable sensorless BLDCM operation commutation points, a voltage threshold offset corresponding to a factor of the maximum magnitude of the trough or peak voltage (CPFmax/2) is added to Vs/2, as illustrated in FIG. 33. CPFmax is the maximum value of the commutation point functions measured during zero to low speed sensorless BLDCM operation, disclosed previously. CPFmax is approximately equal to twice the magnitudes of the open phase output voltage peaks and troughs measured during low to high speed sensorless operation. Near zero and low speed of operation, the offset H→L and L→H CPD voltage thresholds (marked with circles in FIG. 33) produce reliable commutation points, with timing very close to the ideal 0° timing commutation points (at 0°, 60°, 120°, 180°, 240°, 300° electrical rotor positions). This step is illustrated in the operational flowchart in FIG. 34.

(iii) PWM On-Time H→L and L→H CPD

The following two commutation point detection thresholds are calculated during PWM on-time interval for each open phase voltage measurement in the commutation sequence. FIG. 33 show the resultant quasi 0° commutation timing points, which are optimal at any motor temperature:

H→L Open Phase Voltage CPD Threshold: Vs/2−N.CPFmax

L→H Open Phase Voltage CPD Threshold: Vs/2+N.CPFmax

Where: CPFmax is the maximum value of the commutation point function measured during zero to low speed sensorless BLDCM operation. It is dependent on BLDC motor temperature, as disclosed previously above. The scaling factor, N is used to adjust the voltage threshold offset level and the resultant quasi 0° commutation timing point. Values in the range of 0.25-0.5 were tested to work well in practice. Vs is the supply voltage measured during PWM on-time (iv) PWM On-Time Commutation Point Detection Calculations In one complete BLDCM electrical rotor cycle, the disclosed commutation point detection calculations during PWM on-time interval for the six commutation states corresponding are given by:

$$CP0 = Vs \cdot (\tfrac{1}{2} + N \cdot CPF\text{max}R) - Vb \quad (0° \leq \theta < 60°) \quad (105)$$

$$CP1 = Va - Vs \cdot (\tfrac{1}{2} - N \cdot CPF\text{max}R) \quad (60° \leq \theta < 120°) \quad (106)$$

$$CP2 = Vs \cdot (\tfrac{1}{2} - N \cdot CPF\text{max}R) - Vc \quad (120° \leq \theta < 180°) \quad (107)$$

$$CP3 = Vb - Vs \cdot (\tfrac{1}{2} - N \cdot CPF\text{max}R) \quad (180° \leq \theta < 240°) \quad (108)$$

$$CP4 = Vs \cdot (\tfrac{1}{2} + N \cdot CPF\text{max}R) - Va \quad (240° \leq \theta < 300°) \quad (109)$$

$$CP5 = Vc - Vs \cdot (\tfrac{1}{2} - N \cdot CPF\text{max}R) \quad (300° \leq \theta < 360°) \quad (110)$$

Where: CPFmaxR is the supply voltage independent ratio value (CPFmax/Vs), disclosed previously in equation (103); Va, Vb, Vc are the open phase voltages measured during PWM on-time switching intervals (PWM TON) in the corresponding commutation state interval. Vs is the supply voltage measured during PWM on-time. The commutation point is detected when the calculated CP≤0. This step is illustrated in the operational flowchart in FIG. 34.

(b) Synchronous Rectification During PWM Off-Time

Some prior art solutions employing synchronous rectification techniques in brushed motor control applications are disclosed in U.S. Pat. Nos. 6,384,555 and 6,956,359. However, these solutions require additional hardware circuitry to perform this function and thus have higher controller cost. Furthermore, it is likely that no prior art solution has specifically addressed the challenge of synchronous rectification in sensorless brushless BLDC motor applications.

Figure 35:
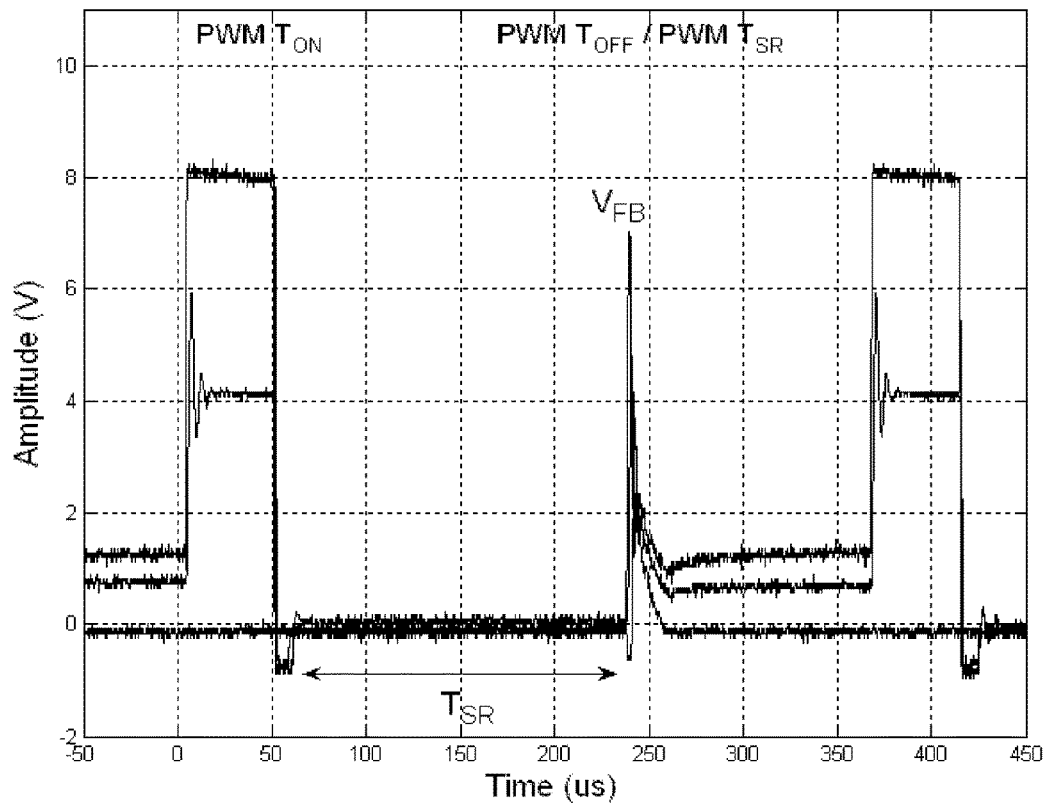
FIG. 35 illustrates a software controlled synchronous rectification integrated in the PWM off-time interval during low to high speed sensorless BLDC motor operation, showing the optimum synchronous rectifier duration TSR controlled via the feedback voltage VFB measurement.
Figure 46:
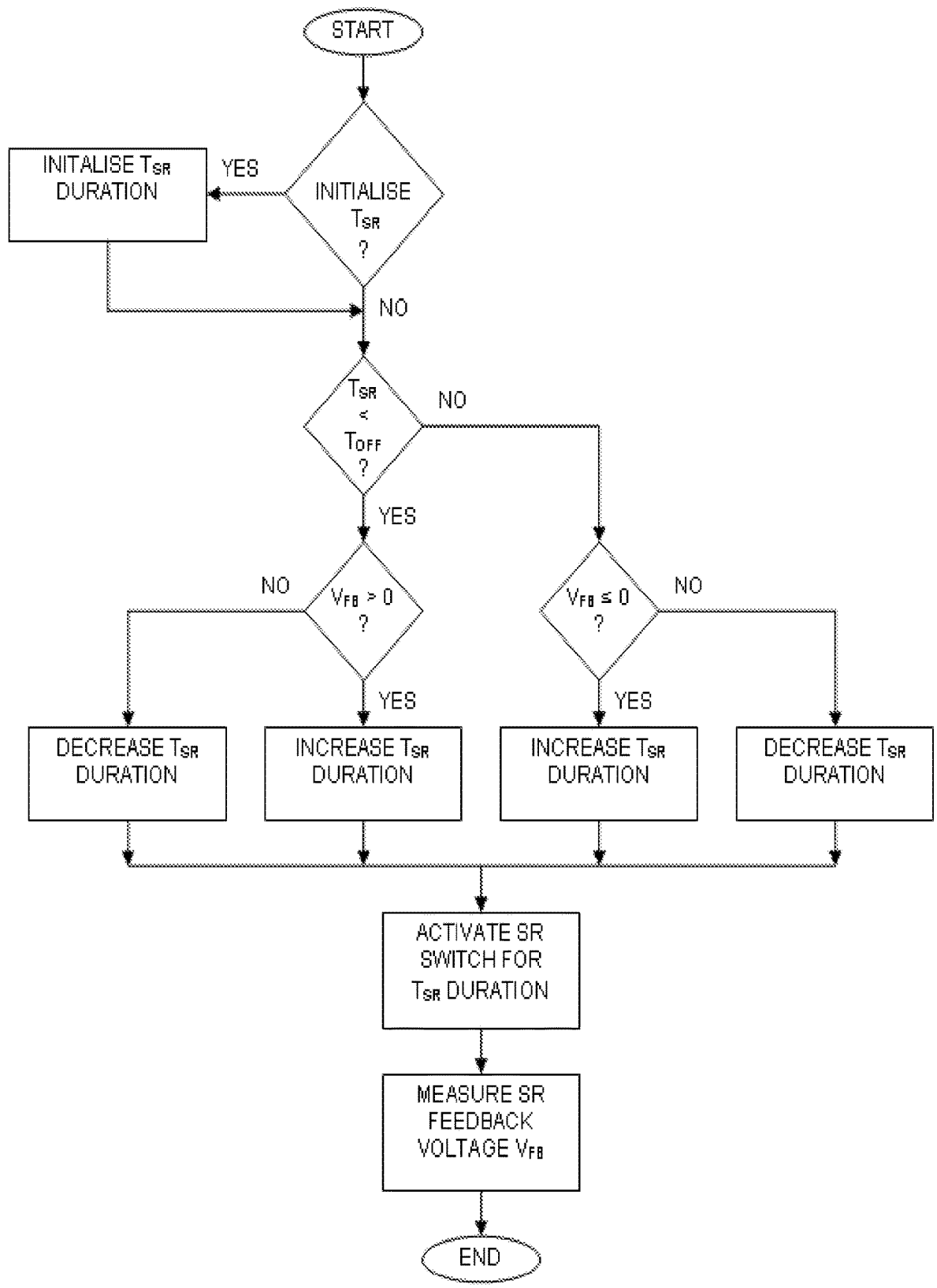
FIG. 46 illustrates a software controlled synchronous rectification operation flowchart.

The disclosed low to high speed sensorless operation integrates a software controlled synchronous rectification technique during PWM off-time to reduce controller power loses. A practical example of the realized synchronous rectification operation is shown in FIG. 35, where the synchronous rectifier switch is activated for the optimal duration ($T_{SR}$). This operational step is illustrated in the flowchart in FIG. 34 and is disclosed in greater detail in proceeding section. The embodying software controlled synchronous rectifier operation flowchart is presented in FIG. 46.

(c) Commutation Point Detection at High Speeds

At higher speeds of operation, the disclosed commutation point detection during PWM on-time interval automatically reverts to operation equivalent to the conventional sensorless brushless commutation point detection utilizing BEMF voltage measurements. The commutation timing increases from the quasi 0° to 30°, which can be retarded back to 0° using time delay techniques that are well know to those skilled in this art.

Figure 36:
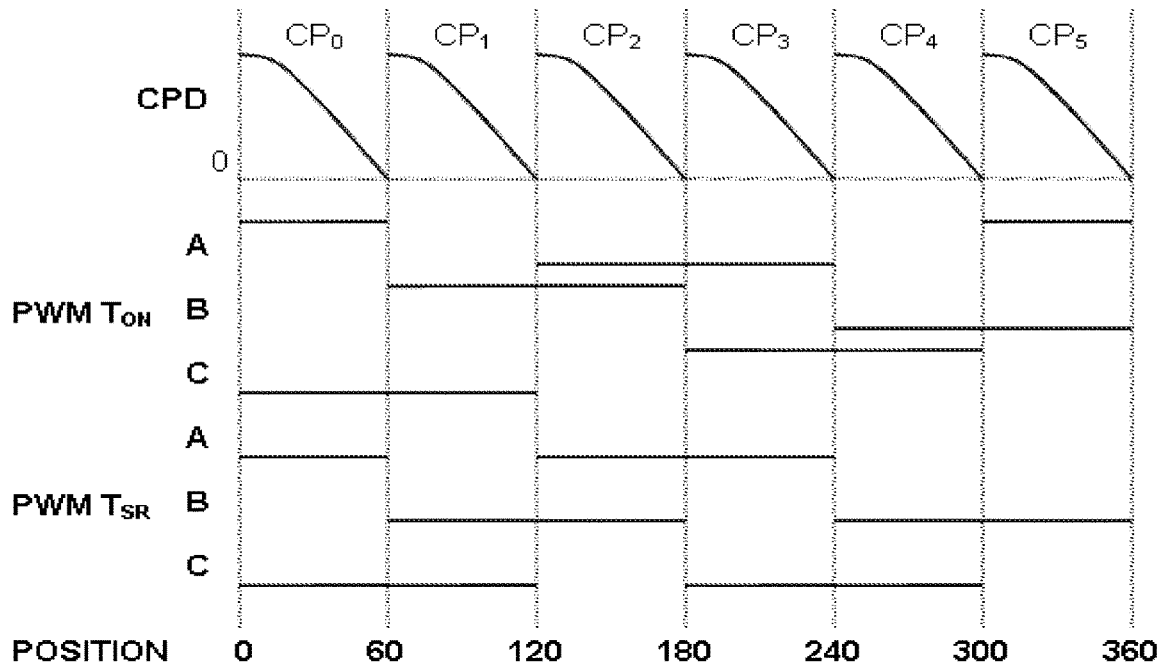
FIG. 36 illustrates a low to high speed sensorless BLDCM controller commutation point detection employing inductance voltage variations, showing the corresponding phase winding switching states during PWM on-time and synchronous rectifier operation during PWM off-time.

(d) Sensorless BLDCM Commutation and Synchronous Rectifier Phase Coils Switching States The active phase coils in each commutation state during PWM $T_{ON}$ and PWM $T_{SR}$ switching intervals are equivalent to the previously disclosed states in Table 12 and Table 13 respectively. The CPs and corresponding PWM on-time and synchronous rectifier phase coil switching states for one complete electrical revolution in a BLDC motor are illustrated in FIG. 36.

(e) Low to High Speed Sensorless BLDCM Operation Extensions

The disclosed low to high speed sensorless BLDCM operation has been presented for the case of high-side PWM switching topology, commonly used with bootstrapped transistor gate drivers. However, the disclosed technique of commutation point detection and software controlled synchronous rectification can be applied to any other PWM switching topology, such as for example, low-side PWM switching and alternate low-high side PWM switching, in order to make optimum use of the implemented controller hardware circuitry.

Software Controlled PWM Synchronous Rectification

Synchronous rectification (SR) is a technique used to improve controller output efficiency during PWM switching operation with inductive loads. Generally, this operation is implemented with external hardware circuitry which increases overall system cost, as for example disclosed in U.S. Pat. Nos. 6,384,555, 6,396,250, 6,861,826 and 6,956,359.

This section discloses a synchronous rectification method implemented entirely with a software feedback control algorithm, which does not require any additional hardware. It is integrated into the previously disclosed low to high speed sensorless BDLCM operation and the regenerative BLDC motor braking disclosed in proceeding section.

(a) Synchronous Rectification Background

In inductive load PWM switching applications, such as BLDC motors, the phase current which rises exponentially during PWM on-time interval continues to flow in the PWM off-time interval. Normally this current flow is maintained via a freewheeling diode, either integrated into the semiconductor switch, such as a MOSFET or IGBT, or by a discrete diode device. Improvement in efficiency can be made when the freewheeling diode is replaced with a lower resistance semiconductor device to carry the phase current during PWM off-time. The timing of this operation is important and must be synchronized with the PWM off-time, hence this process is called "synchronous rectification". The following section outlines the difference between these two methods commonly applied in the prior art.

(i) Freewheeling Diode Rectifier

Figure 37:
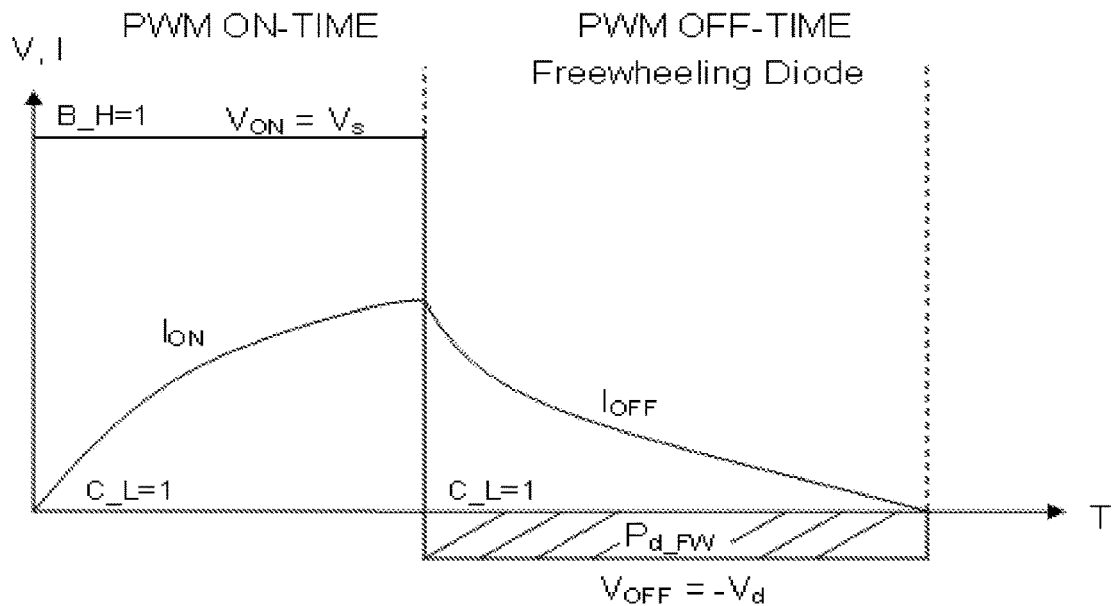
FIG. 37 illustrates an inductive load PWM switching phase voltage and current waveforms employing freewheeling diode during PWM off-time, showing the region of power loss (Pd_FW) indicated by the hashed line area (prior art).
Figure 38:
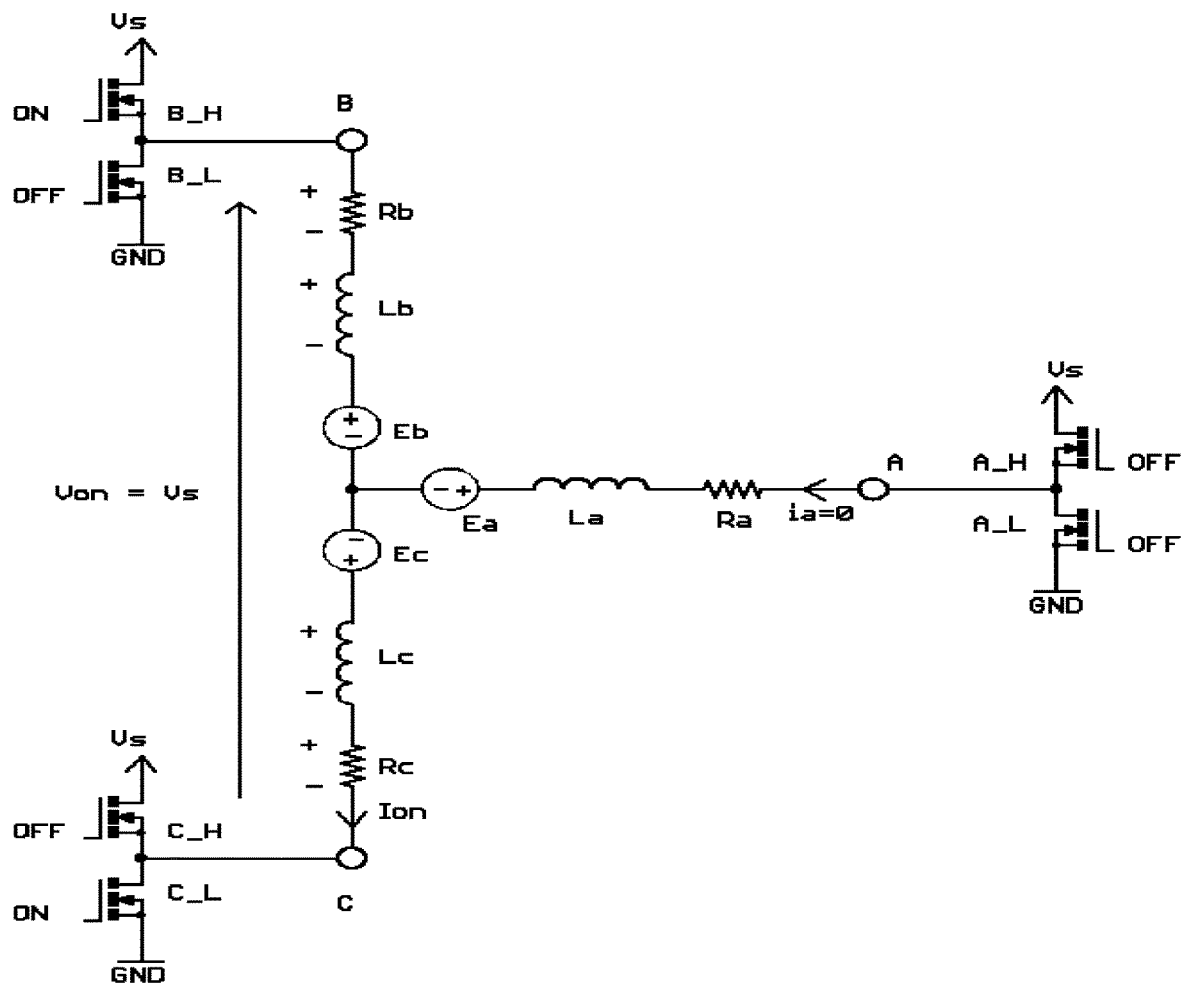
FIG. 38 illustrates PWM on-time circuit connections during BLDCM inductive load switching.
Figure 39:
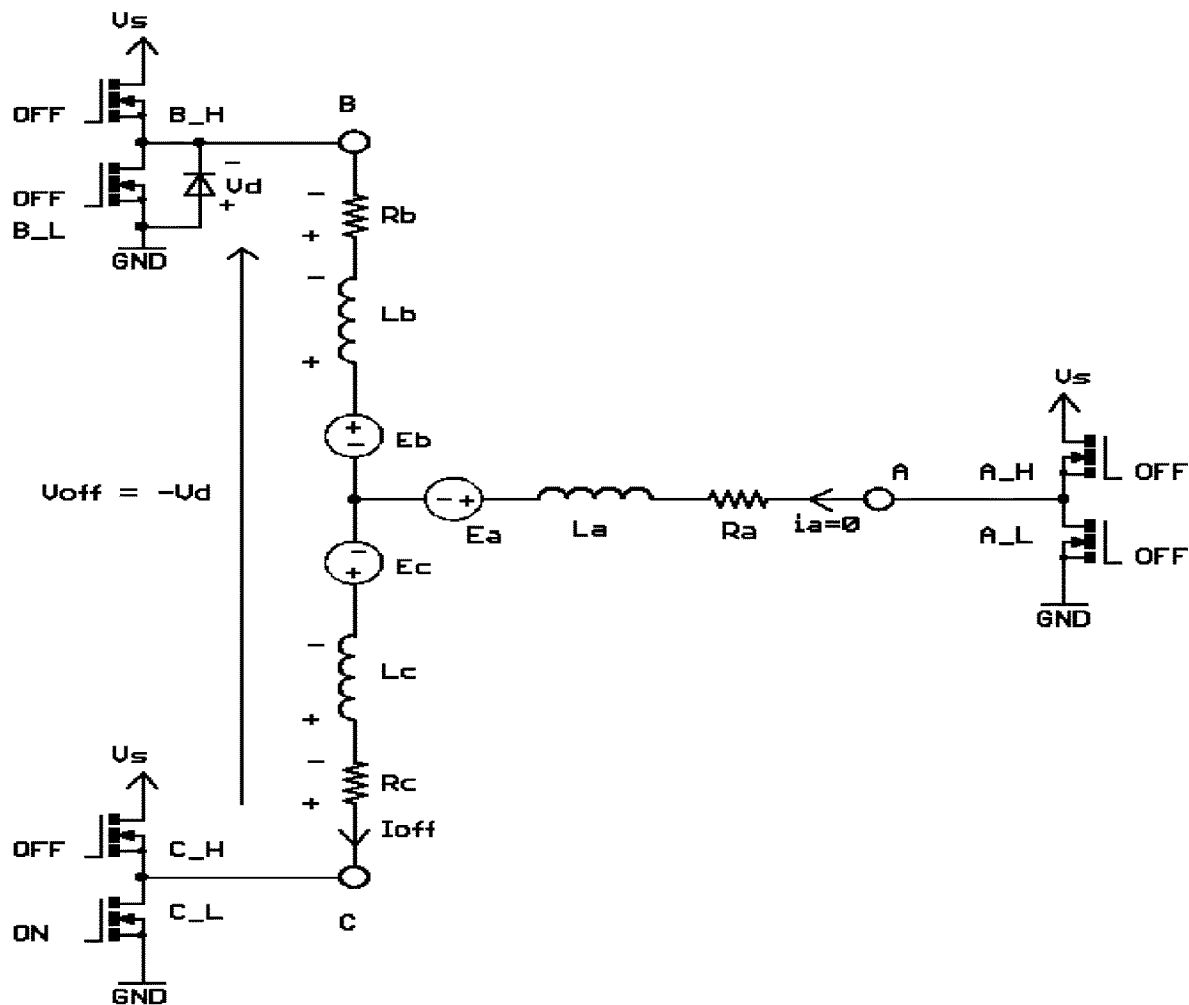
FIG. 39 illustrates a PWM off-time freewheeling diode switching interval during BLDCM inductive load operation.

FIG. 37 illustrates the phase voltage and current during PWM switching employing a freewheeling diode during PWM off-time interval. The corresponding hardware circuit configuration when PWM on-time interval B+/C− phase coils are activated is shown in FIG. 38. During this interval B_H and C_L switches are turned-on, resulting in current ($I_{ON}$) flowing through the active phases. When PWM off-time interval is commenced, as shown in FIG. 39 and FIG. 37, B_H switch is turned-off and the internal body diode of B_L switch begins to conduct the exponentially decaying phase current ($I_{OFF}$). This switching action occurs automatically, hence the term "freewheeling" diode. During this freewheeling period, the conducting diode experiences a power loss proportional to its forward voltage drop and the magnitude of the current:

$$P_{d\_FW} = V_d \cdot I_{OFF} [W] \quad (111)$$

This power loss, illustrated in FIG. 37, can be quite extensive when switching high phase currents, resulting in reduced output current (motor torque) and excessive heating of the freewheeling diode and hence the semiconductor switching device, contributing to reduced output efficiency.

(ii) Synchronous Rectifier

Figure 40:
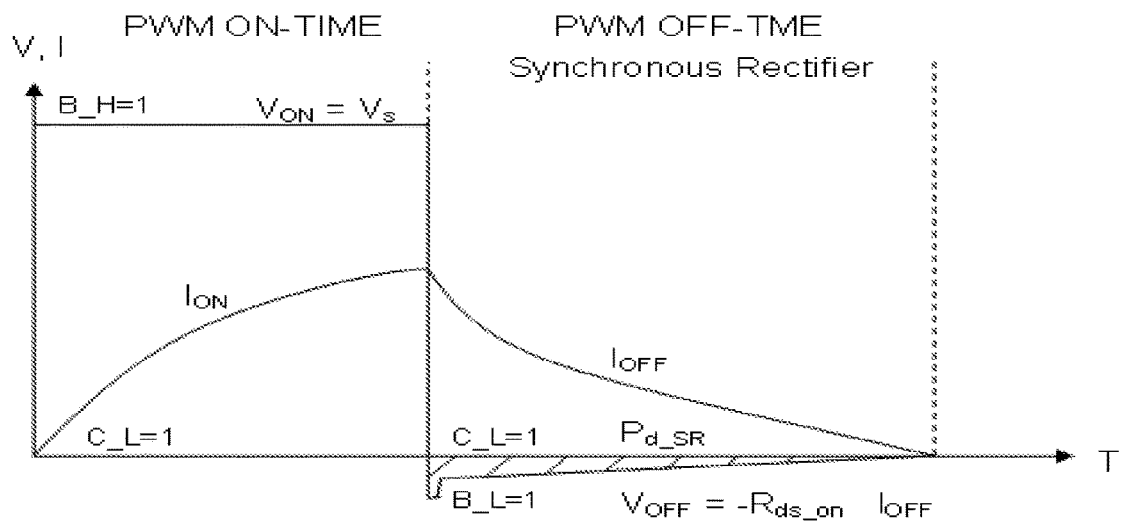
FIG. 40 illustrates inductive load PWM switching phase voltage and current waveforms employing synchronous rectifier during PWM off-time, showing the reduced region of power loss (Pd_SR) indicated by the hashed line area (prior art).
Figure 41:
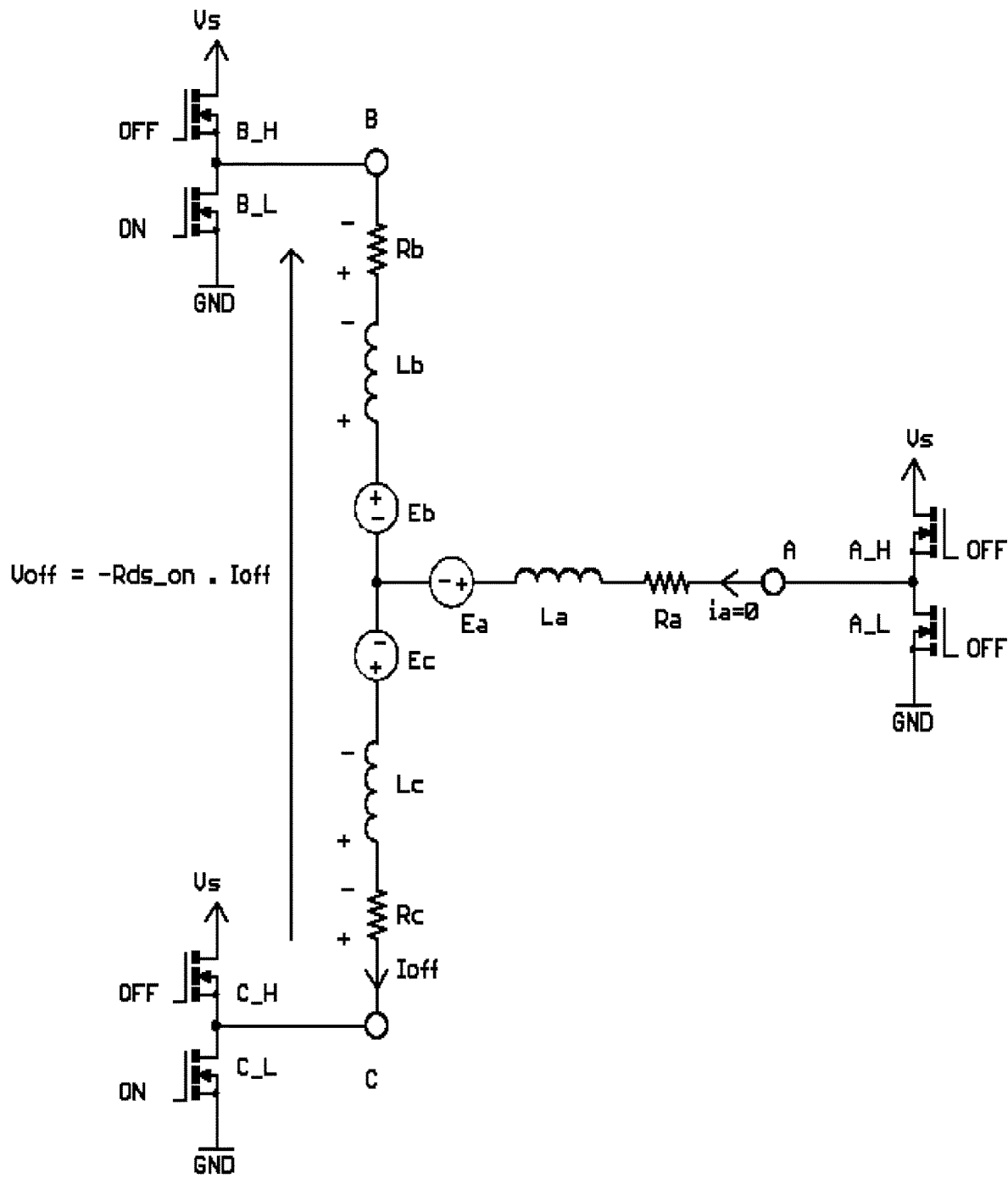
FIG. 41 illustrates a PWM off-time synchronous rectifier switching interval during BLDCM inductive load operation.

The phase voltage and current waveforms during PWM off-time synchronous rectifier operation are illustrated in FIG. 40. During this interval the B_H switch is turned-off and the synchronous rectifier switch B_L is turned-on, conducting the exponentially decaying phase current ($I_{OFF}$) as illustrated in FIG. 41. The timing of this complementary switching action is critical, since B_L switch must be turned-off again when $I_{OFF}=0$. Generally, specialized external hardware circuitry is necessary to perform this task, increasing the overall system cost. The synchronous rectifier switch B_L also experiences a power loss, which is proportional to its on-resistance and the square of the phase current:

$$P_{d\_SR}=R_{ds\_on} \cdot I_{OFF}^2 [W] \qquad (112)$$

With modern semiconductor switches, such as MOSFETs, exhibiting very low solid state on-resistance values (<1 mΩ), the power loss during the synchronous rectifier operation, illustrated in FIG. 40, is significantly less than during the freewheeling diode operation shown in FIG. 37. In practice, synchronous rectification increases the controller's output efficiency during PWM off-time interval by reducing the heating in the semiconductor switches. The motor phase currents are also higher during PWM off-time switching interval, thus increasing the average motor torque during operation.

(b) Software Synchronous Rectifier Feedback Controller

This section discloses the synchronous rectifier feedback control algorithm implemented in software, which was developed to eliminate additional hardware circuitry found in the prior art. The objective of the feedback controller is to maintain a zero phase current at the end of the SR period during the PWM off-time interval. This produces the optimal synchronous rectifier duration synonymous with the prior art external hardware solutions. Depending on the length of SR duration ($T_{SR}$) with respect to the PWM off-time interval duration ($T_{OFF}$) two distinct SR feedback control measurement techniques are employed. The disclosed synchronous operation flowchart is presented in FIG. 46. On the very first PWM cycle, the synchronous rectifier duration $T_{SR}$ is initialized to a known value, generally to 0.

(c) SR Feedback Voltage (VFB) Measurement

The disclosed software controlled synchronous rectifier requires the measurement of the feedback voltage ($V_{FB}$) at the end of the synchronous rectification duration ($T_{SR}$). This task is shown in operation flowchart in FIG. 46.

(d) SR Feedback Controller with $T_{SR}<T_{OFF}$

In operation at low inductive loads, for example when a BLDCM has reached higher speeds, the phase currents may have sufficient time to decay to zero before reaching the end of PWM off-time interval ($T_{OFF}$). During this discontinuous phase current mode of PWM operation the SR duration ($T_{SR}$) is less than the entire PWM off-time duration ($T_{OFF}$). Illustrated in FIG. 42 and FIG. 43, two distinct SR feedback measurements are possible at the end of the SR interval, depending on the value of feedback phase current, $I_{FB}$. These steps are shown in the SR operation flowchart in FIG. 46.

(i) SR $I_{FB}>0$ ($V_{FB}>0$)

Figure 42:
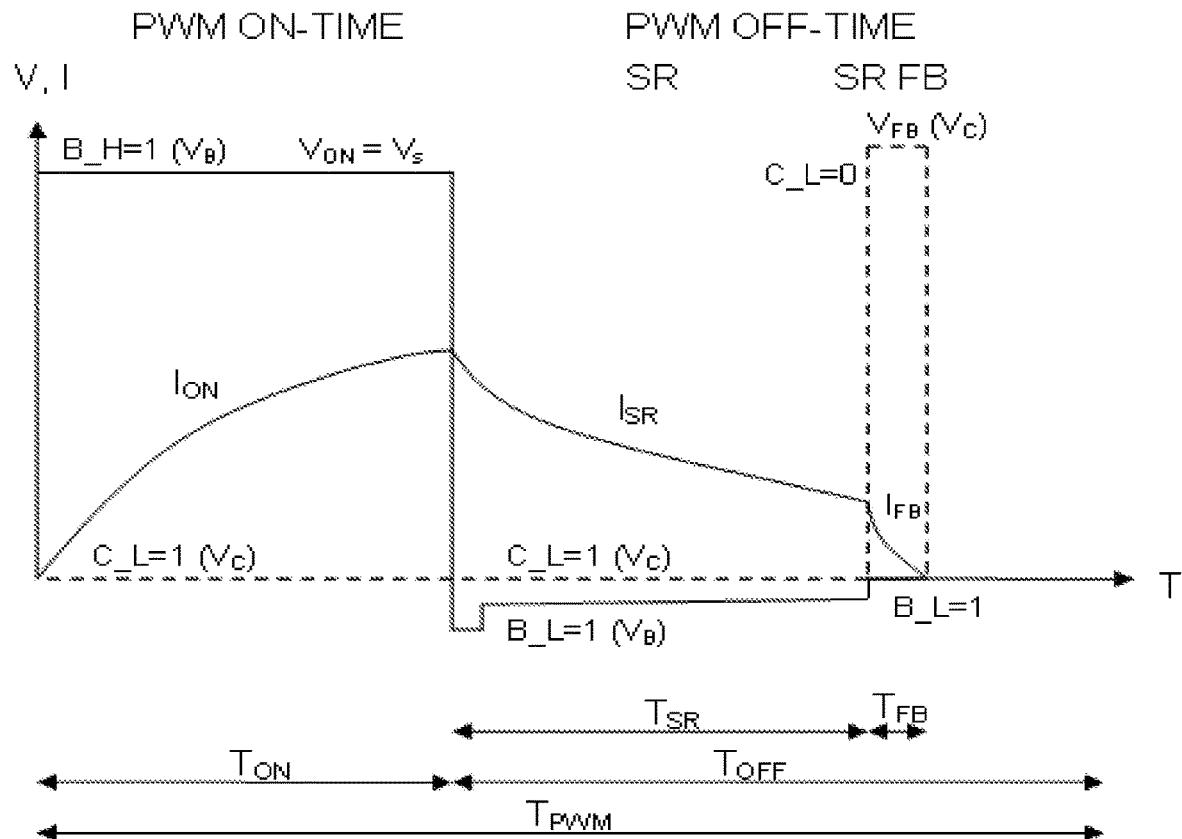
FIG. 42 illustrates a software synchronous rectifier feedback controller operation at low inductive loads with IFB>0, resulting in feedback voltage VFB>0.

The phase voltage and current waveforms and power transistor switching states during SR feedback control operation when $I_{FB}>0$ are shown in FIG. 42, in which B and C phase windings are active. In this case, the SR duration ($T_{SR}$) is shorter than the optimum duration, resulting in "under" rectification. Consequently, when the synchronous rectifier switch is turned-off (C_L=0, B_L=1) the residual positive feedback current generates a positive feedback voltage ($V_{FB}$), which is measured at phase C terminal (VC) and is used by the SR feedback controller to increase the SR duration ($T_{SR}$) in the next PWM cycle. The width of the feedback duration ($T_{FB}$) depends on the time required to decay $I_{FB}$ to zero and in practice, it is regulated by the PWM synchronous rectification feedback controller.

(ii) SR $I_{FB}<0$ ($V_{FB}<0$)

Figure 43:
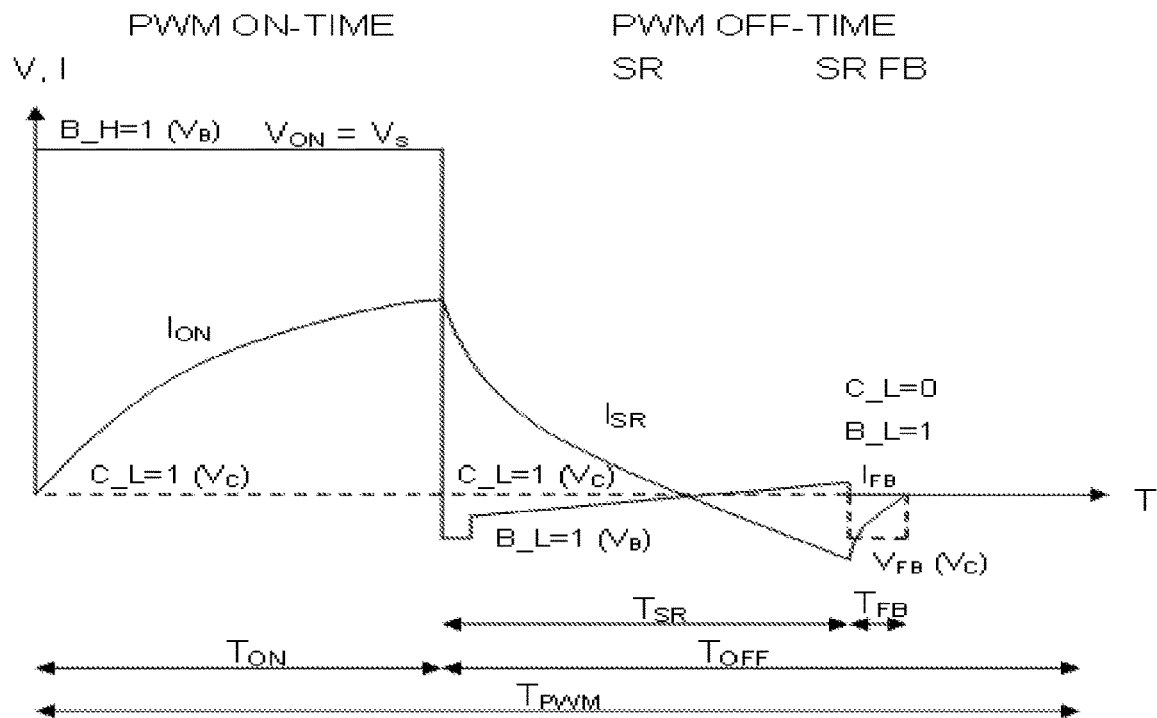
FIG. 43 illustrates a software synchronous rectifier feedback controller operation at low loads with IFB<0, resulting in feedback voltage VFB<0.

The case when the SR duration ($T_{SR}$) is too long compared to the optimal duration, resulting in "over" rectification, is illustrated in FIG. 43 with B and C phase windings active. In this case the SR current ($I_{SR}$) reaches a negative value during the SR interval. When the synchronous rectifier switch is turned-off (C_L=0, B_L=1), this negative current continues to decay to zero during the feedback measurement interval ($T_{FB}$) generating in a negative feedback voltage ($V_{FB}$) measured at phase C terminal ($V_C$). This negative $V_{FB}$ voltage value is used by the SR feedback controller to decrease the SR duration ($T_{SR}$) in the next PWM cycle.

(iii) SR Feedback Control Law with $T_{SR}<T_{OFF}$

The SR feedback control law during SR operation with $T_{SR}<T_{OFF}$ is given by:

If $V_{FB}>0$ then increase $T_{SR}$ duration
If $V_{FB}\le0$ then decrease $T_{SR}$ duration In practice the $T_{SR}$ duration can be regulated using simple increment and decrement algorithms, with the speed of response weighed according to application requirements. One example implemented is given by:

$$T_{SR}[n+1]=T_{SR}[n]\pm\Delta T_{SR} \cdot W \qquad (113)$$

Where: $\Delta T_{SR}$ is the increment/decrement step; W is the increment/decrement weight used to adjust the feedback controller response speed. More advanced control techniques, such as PID can also be implemented to regulate the SR feedback control loop.

(e) SR Feedback Controller with $T_{SR}=T_{OFF}$

Figure 44:
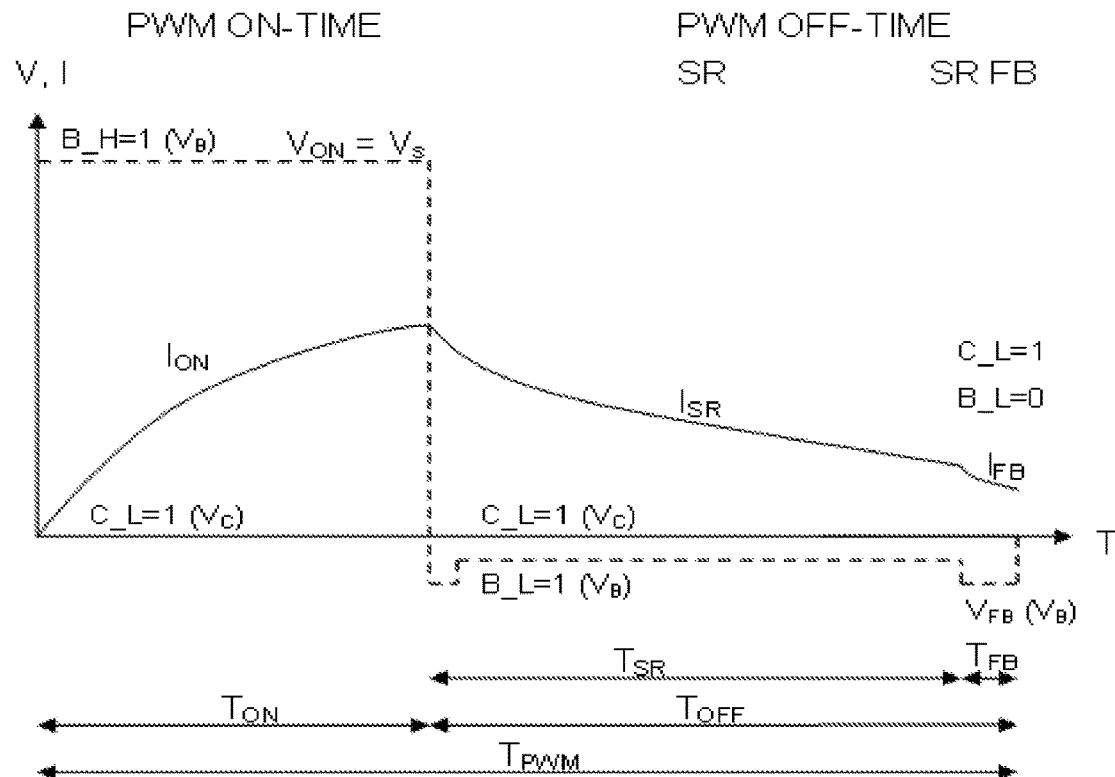
FIG. 44 illustrates a software synchronous rectifier feedback controller operation at high loads with IFB>0, resulting in feedback voltage VFB<0.
Figure 45:
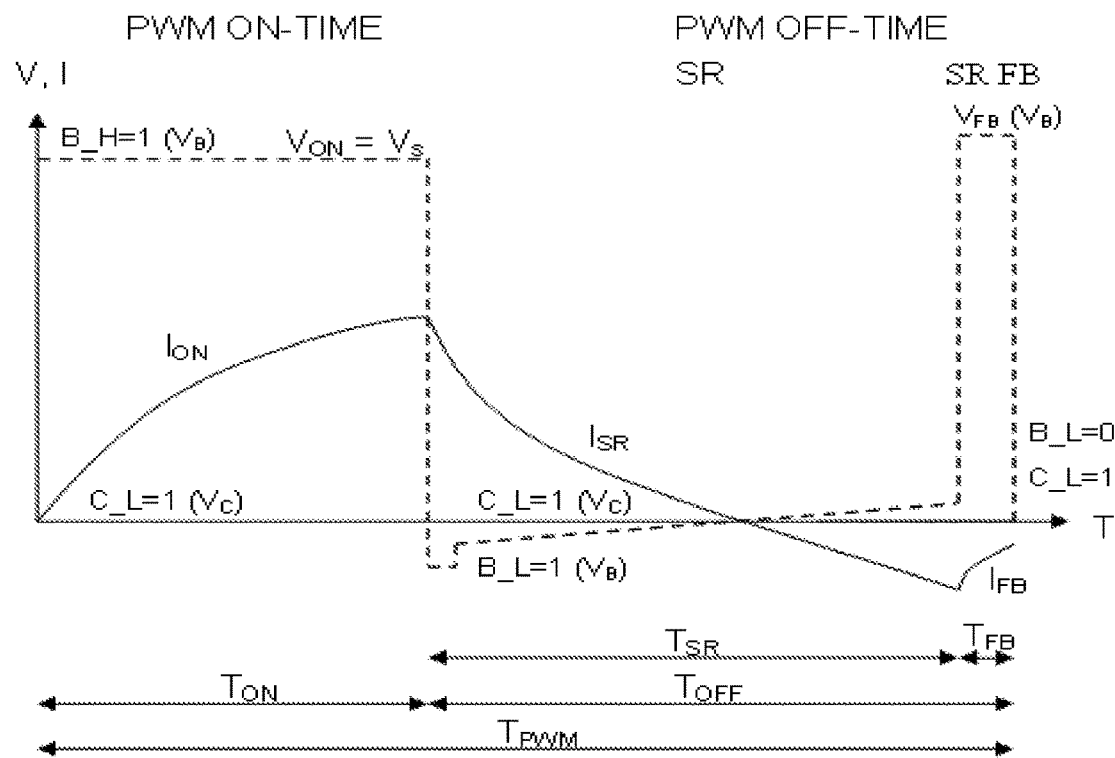
FIG. 45 illustrates a software synchronous rectifier feedback controller operation at high loads with IFB<0, resulting in feedback voltage VFB>0.

During operation at high inductive loads, typically when a BLDCM is starting and the speed is low, the phase currents do not have sufficient time to decay to zero before reaching the end of the PWM off-time interval ($T_{OFF}$). This results in a continuous phase current mode of PWM operation. In this case, the SR duration ($T_{SR}$) reaches its maximum possible value, equal to the entire PWM off-time duration ($T_{OFF}$). Similar to operation when $T_{SR}<T_{OFF}$ disclosed in previous section, two distinct SR feedback measurements illustrated in FIG. 44 and FIG. 45 are also possible at the end of the SR interval ($T_{SR}$), depending on the value of feedback phase current ($I_{FB}$). These steps are shown in the SR operation flowchart in FIG. 46.

(i) SR $I_{FB}>0$ ($V_{FB}<0$)

The phase voltage and current waveforms and power transistor switching states during SR feedback control operation when $I_{FB}>0$, are shown in FIG. 44 with B and C phase windings active. In this case, the SR duration ($T_{SR}$), which is limited to $T_{OFF}$, is shorter than the optimum duration, resulting in under-rectification. Consequently, the positive feedback current ($I_{FB}$) generates a negative feedback voltage ($V_{FB}$) measured at phase B terminal ($V_B$) when synchronous rectifier switch is turned-off (B_L=0, C_L=1). In this mode of SR operation the feedback current ($I_{FB}$) does not have sufficient time to decay to zero, and thus a continuous current is maintained in subsequent PWM operation cycles. This negative $V_{FB}$ voltage value is used by the SR feedback controller to increase the SR duration ($T_{SR}$) in the next PWM cycle.

(ii) SR $I_{FB}<0$ ($V_{FB}>0$)

The case when the SR period is too long, resulting in over-rectification, is illustrated in FIG. 45 with B and C phase windings active. In this case, the SR current ($I_{SR}$) reaches a negative value during the SR interval. This negative current continues to decay during the feedback measurement interval ($T_{FB}$) producing a positive feedback voltage ($V_{FB}$) measured at phase B terminal ($V_B$) when synchronous rectifier switch is turned-off (B_L=0, C_L=1).

This positive $V_{FB}$ voltage value is used by the SR feedback controller to decrease the SR duration ($T_{SR}$) in the next PWM cycle.

(iii) SR Feedback Control Law with $T_{SR}=T_{OFF}$

The SR feedback control law during SR operation with $T_{SR}=T_{OFF}$ is given by:

If $V_{FB} \leq 0$ then increase $T_{SR}$ duration

If $V_{FB} > 0$ then decrease $T_{SR}$ duration $T_{SR}$ duration is regulated using the same methods previously outlined for the SR feedback control law with $T_{SR}<T_{OFF}$.

(f) Software Synchronous Rectifier Extensions

The disclosed software controlled synchronous rectification has been presented for the case of high-side PWM switching topology, commonly used with bootstrapped transistor gate drivers. However, the disclosed technique can be applied to any other PWM switching topology, such as for example, low-side PWM switching and alternate low-high side PWM switching.

It is also evident that the disclosed software controlled synchronous rectification method can be applied to any inductive PWM switching application, such as for example, DC/DC power supplies, during normal motor driving and motor braking operation of brushed motors, sensorless brushless motors and sensored brushless motors.

Regenerative Motor Braking with Synchronous Rectification

This section discloses the regenerative motor braking method for sensorless BLDC motor applications, which is integrated into this controller invention as shown in FIG. 1. Compared to the prior art regenerative motor braking solutions employing freewheeling diodes to conduct motor braking currents during PWM off-time switching interval, such as described in U.S. Pat. No. 9,246,416 for a sensored BLDC motor system application, the method disclosed integrates the software controlled synchronous rectification technique disclosed previously.

The disclosed method address the following key challenge areas of regenerative motor braking applications compared to the prior art: 1) Increased controller efficiency, resulting in reduced power and heating losses during regenerative motor braking; 2) Increased level of energy returned back to the power source, resulting in increased time of operation in applications such as battery powered applications; 3) Reduced controller hardware complexity and cost, requiring no additional circuitry to increase regenerative motor braking performance.

(a) Commutation Point Detection

Conventional sensorless brushless commutation point detection methods, known to those skilled in this art, utilizing BEMF voltage measurements are employed during the regenerative BLDC motor braking. These can be applied during PWM on-time and off-time intervals shown in FIG. 47.

(i) PWM On-Time CPD

Figure 47:
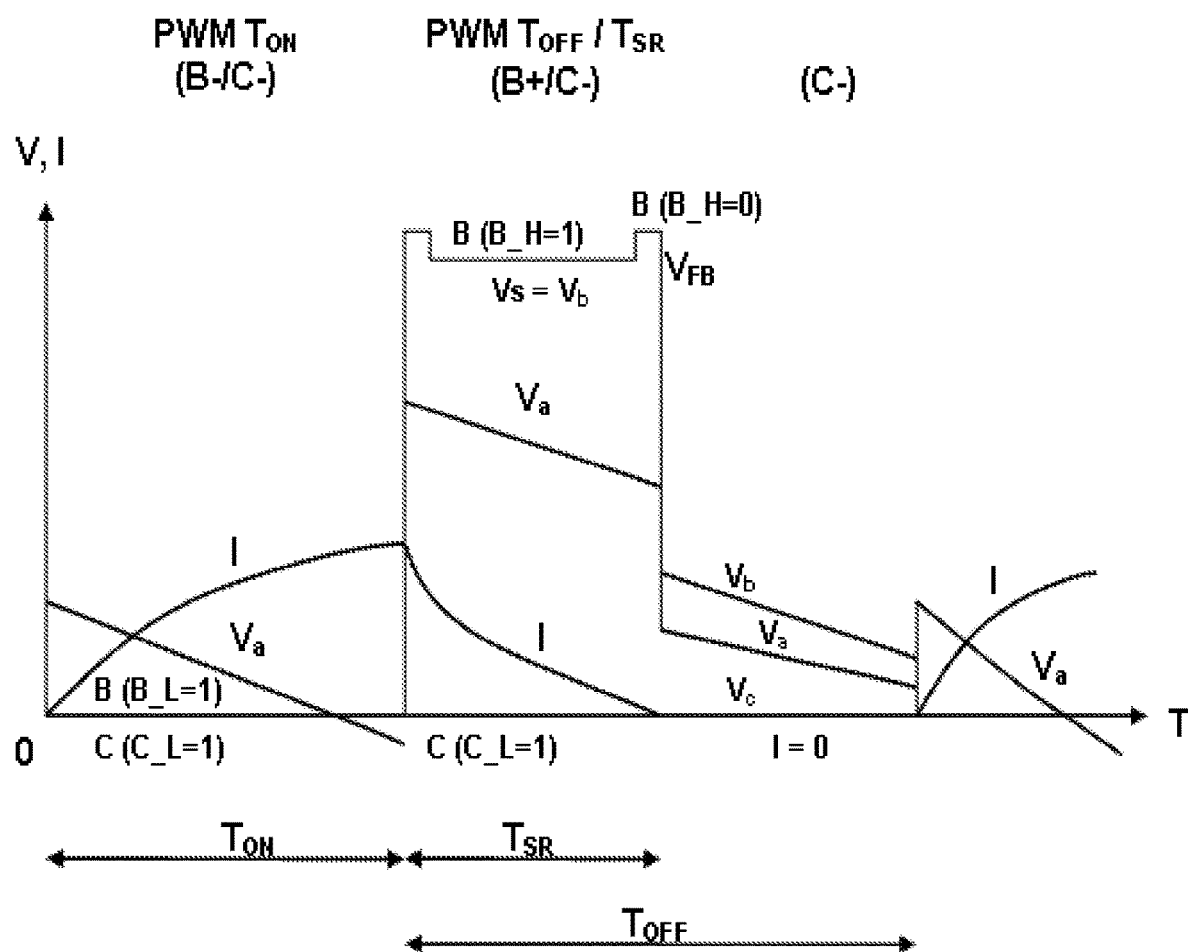
FIG. 47 illustrates a regenerative BLDC motor braking sensorless commutation point detection, showing PWM switching intervals and the optimal software controlled synchronous rectifier duration (TSR) active during PWM off-time.

As illustrated in the example of FIG. 47, during the PWM on-time interval ($T_{ON}$) the active phase coils (B−/C−) are connected to the 0V supply rail, short-circuiting the phase windings. The BEMF voltages generated by a rotating permanent magnet induce a phase current (I) which rises exponentially. The commutation point is detected via the open phase coil (A) voltage output ($V_a$) when the 0V rail is crossed. The detected commutation points occur at +30° advanced timing angle and are measured using the following equations for each of the six commutation state intervals:

$$CP0\_Ton = -Vb \ (330° \leq \theta < 30°) \quad (114)$$

$$CP1\_Ton = Va \ (30° \leq \theta < 90°) \quad (115)$$

$$CP2\_Ton = -Vc \ (90° \leq \theta < 150°) \quad (116)$$

$$CP3\_Ton = Vb \ (150° \leq \theta < 210°) \quad (117)$$

$$CP4\_Ton = -Va \ (210° \leq \theta < 270°) \quad (118)$$

$$CP5\_Ton = Vc \ (270° \leq \theta < 330°) \quad (119)$$

Figure 49:
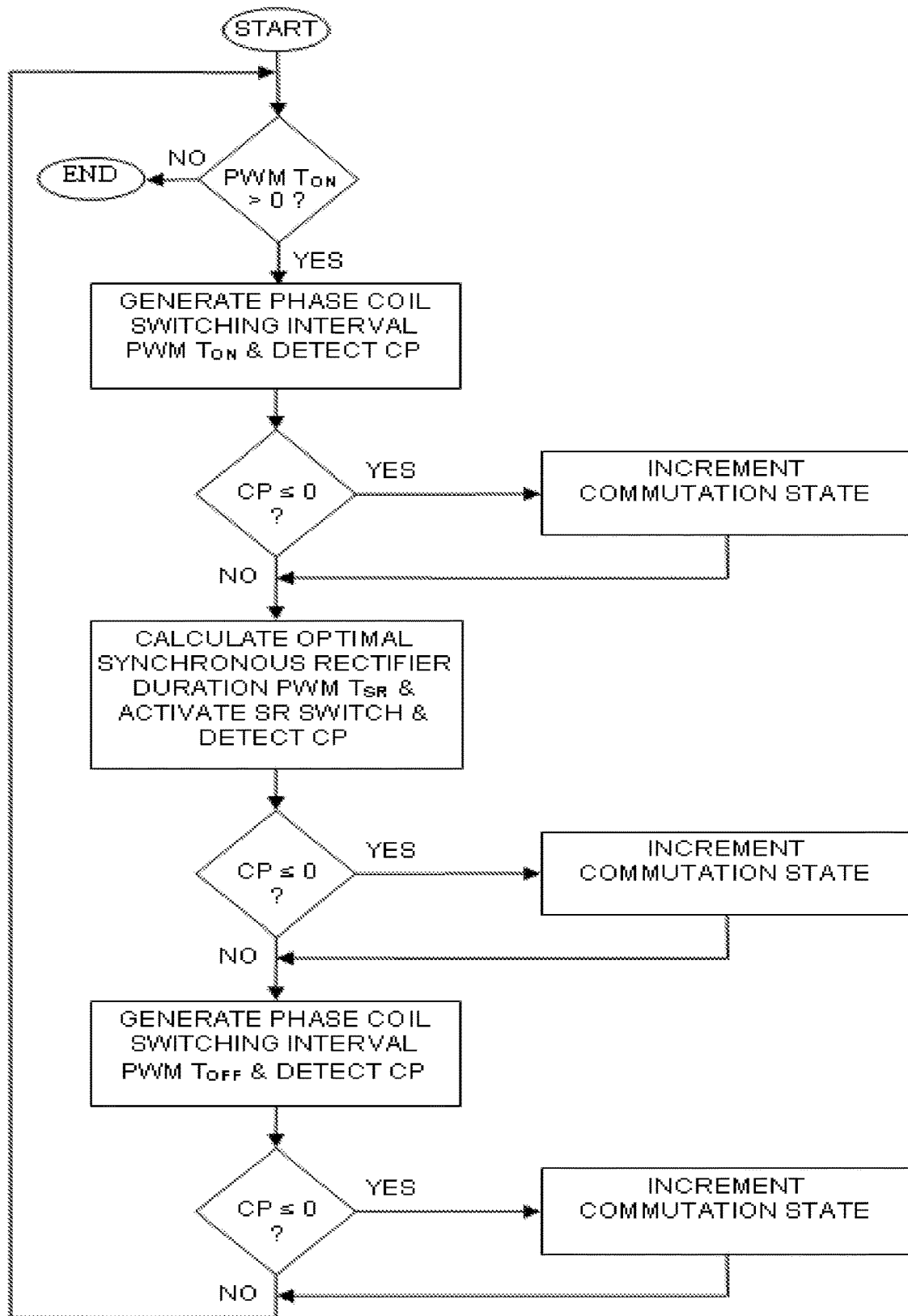
FIG. 49 illustrates a sensorless BLDC motor regenerative braking operation flowchart, integrating the optimal software controlled synchronous rectifier duration TSR.

The commutation point is detected when the calculated CP≤0. This step is illustrated in the regenerative motor braking operation flowchart in FIG. 49.

(ii) PWM Off-Time CPD with Synchronous Rectifier

During this PWM off-time interval, the active phase coils (B+/C−) are connected between the supply voltage rails, as illustrated in example FIG. 47, allowing the phase current to decay exponentially to zero through the optimal software controlled synchronous rectifier disclosed previously, thus increasing controller efficiency. In this example, the commutation point is detected via the open phase coil (A) voltage output ($V_a$) when this voltage crosses the half way point of the supply voltage rail ($V_s/2$). The detected commutation points occur at +30° advanced timing angle and are measured using the following equations for each of the six commutation state intervals:

$$CP0\_Tsr = \tfrac{1}{2} \cdot Vs - Vb \ (330° \leq \theta < 30°) \quad (120)$$

$$CP1\_Tsr = Va - \tfrac{1}{2} \cdot Vs \ (30° \leq \theta < 90°) \quad (121)$$

$$CP2\_Tsr = \tfrac{1}{2} \cdot Vs - Vc \ (90° \leq \theta < 150°) \quad (122)$$

$$CP3\_Tsr = Vb - \tfrac{1}{2} \cdot Vs \ (150° \leq \theta < 210°) \quad (123)$$

$$CP4\_Tsr = \tfrac{1}{2} \cdot Vs - Va \ (210° \leq \theta < 270°) \quad (124)$$

$$CP5\_Tsr = Vc - \tfrac{1}{2} \cdot Vs \ (270° \leq \theta < 330°) \quad (125)$$

The commutation point is detected when the calculated CP≤0. This step is illustrated in the regenerative motor braking operation flowchart in FIG. 49.

(iii) PWM Off-Time CPD with Phase Current Equal to Zero (I=0)

In this PWM off-time interval only one active phase coil (C−) is connected to the 0V rail via the C_L switch after the phase current has decayed to zero, as illustrated in the example of FIG. 47. In this interval, the commutation point is detected via the BEMF generated open phase voltage outputs $V_a$ and $V_b$ of the inactive phase coils (A and B). During this off-time interval, the +30° timing commutation points for each of the six commutation states are obtained directly from the measured BEMF voltages at the open phase outputs using the following calculations:

$$CP0\_Toff = \tfrac{1}{2} \cdot Va - Vb \ (330° \leq \theta < 30°) \quad (126)$$

$$CP1\_Toff = Va - \tfrac{1}{2} \cdot Vb \ (30° \leq \theta < 90°) \quad (127)$$

$$CP2\_Toff = \tfrac{1}{2} \cdot Vb - Vc \ (90° \leq \theta < 150°) \quad (128)$$

$$CP3\_Toff = Vb - \tfrac{1}{2} \cdot Vc \ (150° \leq \theta < 210°) \quad (129)$$

$$CP4\_Toff = \tfrac{1}{2} \cdot Vc - Va \ (210° \leq \theta < 270°) \quad (130)$$

$$CP5\_Toff = Vc - \tfrac{1}{2} \cdot Va \ (270° \leq \theta < 330°) \quad (131)$$

The commutation point is detected when the calculated CP≤0. This step is illustrated in the regenerative motor braking operation flowchart in FIG. 49.

(b) Synchronous Rectification during PWM Off-Time

Figure 48:
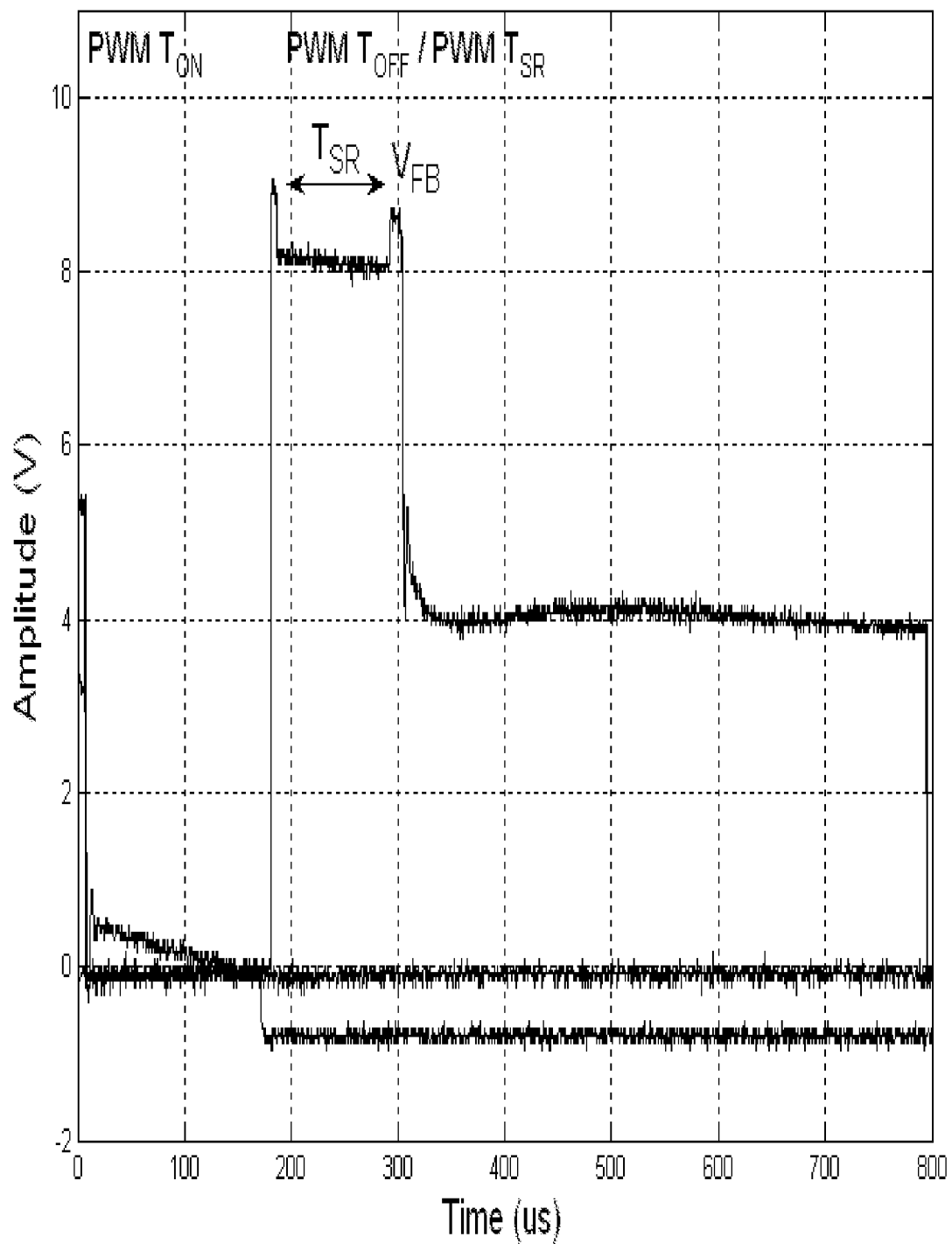
FIG. 48 illustrates a software controlled synchronous rectification applied in the PWM off-time interval during regenerative motor braking operation, showing the optimum synchronous rectifier duration TSR controlled via the feedback voltage VFB measurement.

A practical example of the disclosed synchronous rectification operation during regenerative motor braking is shown in FIG. 48. The optimal software controlled synchronous rectifier switch is activated for duration $T_{SR}$. This operational step is illustrated in the flowchart in FIG. 49 and was disclosed in greater detail previously.

Figure 50:
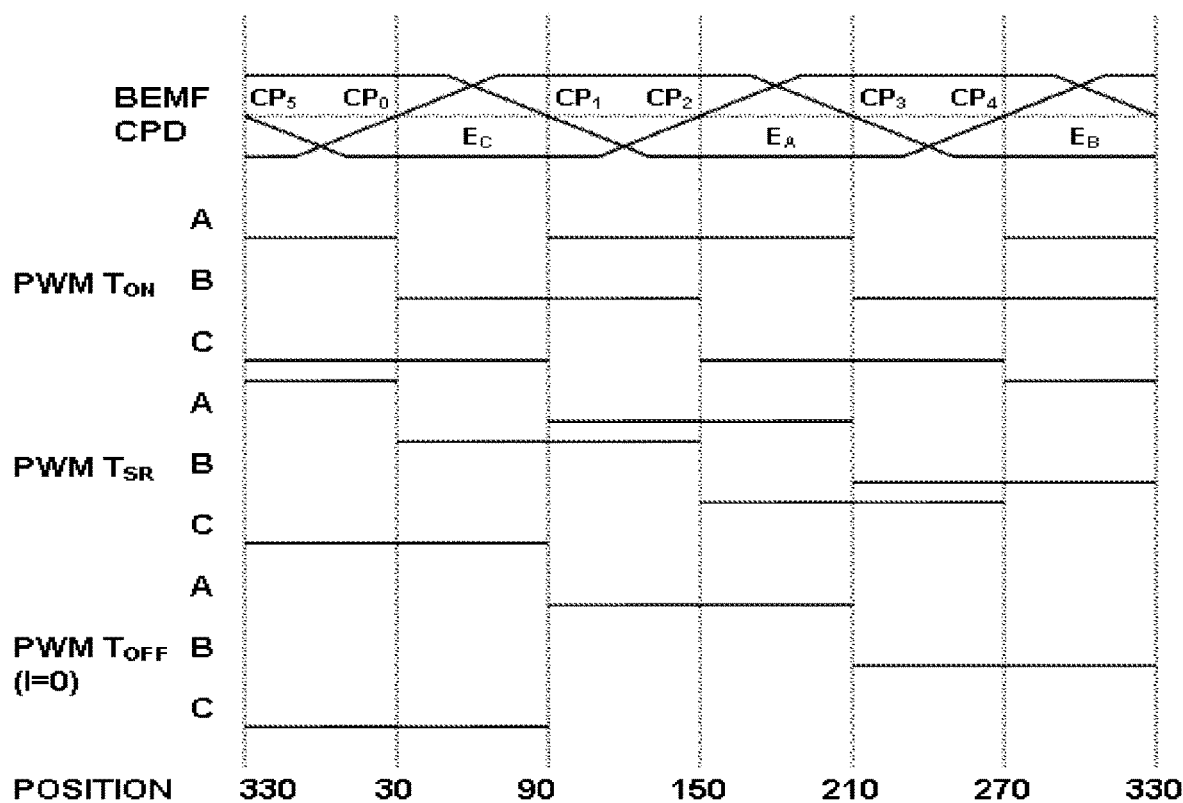
FIG. 50 illustrates a sensorless BLDC motor regenerative braking commutation map showing BEMF waveforms, commutation detection points and corresponding phase winding switching states during PWM on-time, synchronous rectifier operation and PWM off-time (I=0).

(c) Sensorless BLDCM Brake Operation Commutation and Synchronous Rectifier Phase Coils Switching States The following section outlines the phase coil switching states during PWM on-time and off-time intervals in the disclosed BEMF sensorless 60° step regenerative motor braking operation. The CP and corresponding PWM on-time and synchronous rectifier phase coil switching states for one complete electrical revolution in a BLDC motor are illustrated in FIG. 50.

(i) PWM On-Time Interval Active Phase Coils

Table 20 shows the active phase coils during PWM T1 on-time interval of operation.

TABLE 20

PWM on-time active phase coils during sensorless motor brake operation

| Rotor Position Sector θ | Commutation State | Top Active Phase Coil | Bottom Active Phase Coil |
|---|---|---|---|
| 330-30° | 0 | — | C−, A− |
| 30-90° | 1 | — | C−, B− |
| 90-150° | 2 | — | A−, B− |
| 150-210° | 3 | — | A−, C− |
| 210-270° | 4 | — | B−, C− |
| 270-330° | 5 | — | B−, A− |

(d) PWM Off-Time Synchronous Rectifier Interval Active Phase Coils

Table 21 shows the active phase coils during PWM off-time interval of operation, employing the synchronous rectifier technique to control the phase current.

TABLE 21

PWM off-time synchronous rectifier active phase coils during sensorless motor brake operation

| Rotor Position Sector θ | Commutation State | Synchronous Rectifier (Top Active) Phase Coil | Bottom Active Phase Coil |
|---|---|---|---|
| 330-30° | 0 | A+ | C− |
| 30-90° | 1 | B+ | C− |
| 90-150° | 2 | B+ | A− |
| 150-210° | 3 | C+ | A− |
| 210-270° | 4 | C+ | B− |
| 270-330° | 5 | A+ | B− |

(e) PWM Off-Time (I=0) Active Phase Coils

Table 22 shows the active phase coils during PWM off-time interval of operation when the motor braking phase currents have decayed to zero (I=0).

TABLE 22

PWM off-time (I = 0) active phase coils during sensorless motor brake operation

| Rotor Position Sector θ | Commutation State | Top Active Phase Coil | Bottom Active Phase Coil |
|---|---|---|---|
| 330-30° | 0 | — | C− |
| 30-90° | 1 | — | C− |
| 90-150° | 2 | — | A− |
| 150-210° | 3 | — | A− |
| 210-270° | 4 | — | B− |
| 270-330° | 5 | — | B− |

(f) Regenerative Motor Braking Operation Extensions

The disclosed sensorless BLDC motor regenerative braking and software controlled synchronous rectification has been presented for the case of high-side PWM switching topology, commonly used with bootstrapped transistor gate drivers. However, the disclosed method can be applied to any other PWM switching topology, such as for example, low-side PWM switching and alternate low-high side PWM switching. The disclosed method can also be applied to any sensored brushless motor braking application employing rotor position detection sensors, such as Hall Effect sensors used to perform electric brushless motor commutation.

Sensorless BLDCM Controller Integration

The complete integration of the disclosed sensorless BLDC motor controller embodiments is shown in FIG. 1.

(a) High Speed BLDC Motor Start

If a BLDC motor has high rotational speed at the start, which for example is commonly encountered in mobility equipment such as electric vehicles, then the BEMF voltage waveform magnitudes and phases can be used to deduce the initial rotor position and then consequently engage the low to high speed sensorless BLDCM controller operation, as shown in FIG. 1.

(b) Crossover Sensorless BLDCM Operation

A crossover to high or zero-to-low speed sensorless BLDCM operation can be performed when a set motor speed level is reached. This method has been found to work well in most practical BLDCM applications. Combinations with other methods, for example, such as when a set PWM duty cycle level is demanded can also be implemented.

(c) Sensorless BLDCM Controller Integration Extensions

In certain BLDCM application where robust start-up provided by the zero to low speed SBLDCM operation is not required, it is also possible to start and operate a BLDC motor directly with the disclosed low to high speed SBLDCM controller operation, which is capable of operating motors near zero speed without rotation direction detection and with increased start-up motor torque.

Three-Phase Optimized Power Control PCB Layout

This section discloses the three-phase power control PCB layout design with an improved functional performance over the prior art PCB designs. It is evident that the PCB layouts used in three-phase power control applications generally consist of a rectangular power transistor layout configuration. One such example is disclosed in U.S. Pat. No. 7,154,196.

Figure 51:
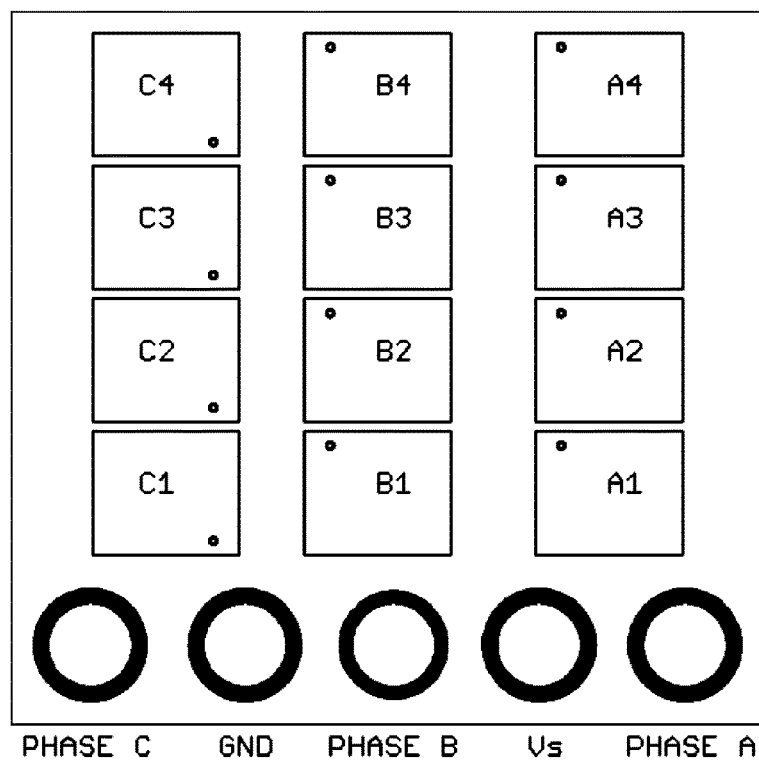
FIG. 51 illustrates one embodiment of a rectangular power PCB layout used in three-phase power control applications, showing paralleled power transistors in a rectangular configuration that results in increased phase (A, B, C) output resistances, unbalanced phase impedances and resistances, and temperature hot spots in the middle power transistor group (B1-B4) (prior art).
Figure 52:
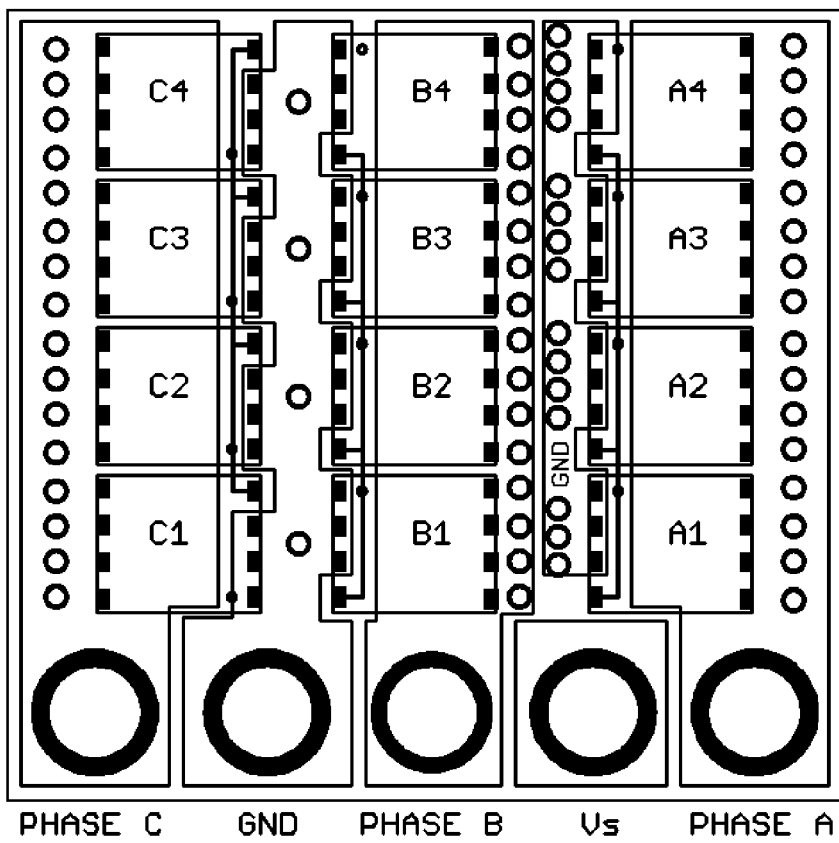
FIG. 52 illustrates a top view of PCB copper track connections, external power wire pad connections and through hole via connections to internal and bottom PCB layers of one embodiment of rectangular power PCB layout in FIG. 51 (prior art).

In three-phase power control applications, such as professional R/C electric vehicle racing these prior art rectangular power transistor PCB layout designs as shown in FIG. 51 and FIG. 52 have the following disadvantages:

1) Increased output phase resistances and power losses due to relatively large PCB copper track distance between the external power wire connections and power transistors furthest away from the wire connections (for example PCB track distance between C4 power transistor and phase C power wire connection in FIG. 52).

2) Increased heating of the middle phase group (B1-B4 transistor group in FIG. 52) of paralleled power transistors, due to heat concentration in the middle of the PCB, leading to increased thermal stress and likelihood of failure.

3) Unbalanced phase resistances and inductances due to different PCB track distances between the power transistors and the output power wire connections (for example, A1-A4 transistor group and GND power wire connection in FIG. 52), leading to increased voltage and current spikes in the phase group with the highest inductance and increased possibility of damage to these power transistors during high speed switching and high current power applications.

In many three-phase power control applications, such as R/C electric vehicle motor controllers described in [30] and [31], it is necessary to provide power wire connections outside of the controller casing to allow the user to replace the wires when required. This requirement restricts the possible placement of the power wire pads locations on the PCB with respect to the power transistors resulting in reduced PCB performance with the rectangular PCB layouts.

(a) Radially Symmetrical Three-Phase Power Controller PCB Layout

Figure 53:
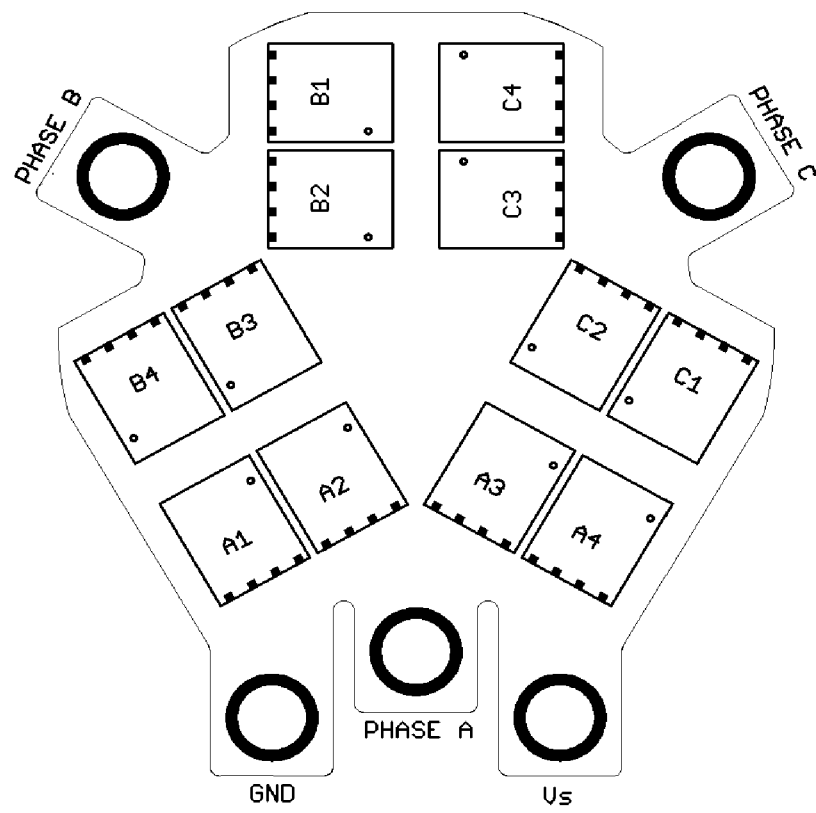
FIG. 53 illustrates a top view of one embodiment of a radially symmetrical power PCB layout for three-phase power control applications, showing groups of paralleled power transistors in each phase (A, B, C) placed in a "bent" 4×1 configuration with radial symmetry around the center of the PCB and power wire connection tabs placed in the middle of each group of power transistors, resulting in reduced phase output resistance, power losses and power transistor temperature hot spots and more balanced phase impedances and resistances.
Figure 54:
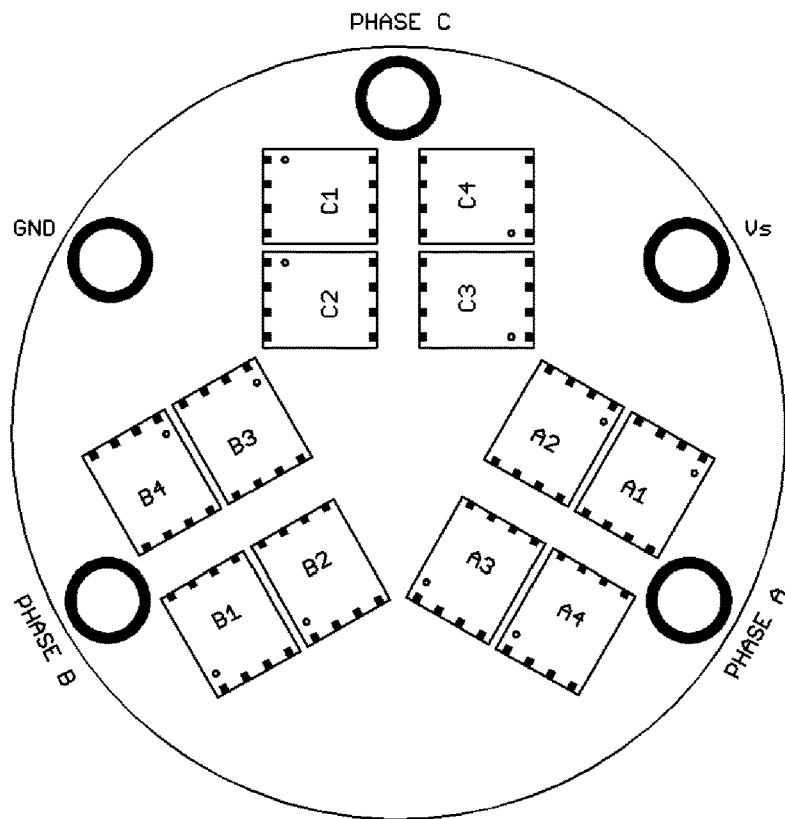
FIG. 54 illustrates a top view of another embodiment of a radially symmetrical power PCB layout design for three-phase power controller applications, consisting of groups of paralleled power transistors in each phase (A, B, C) placed in a 2×2 square configuration with radial symmetrically around the center of the PCB and with power wire connection tabs placed in the middle of each group of power transistors.
Figure 55:
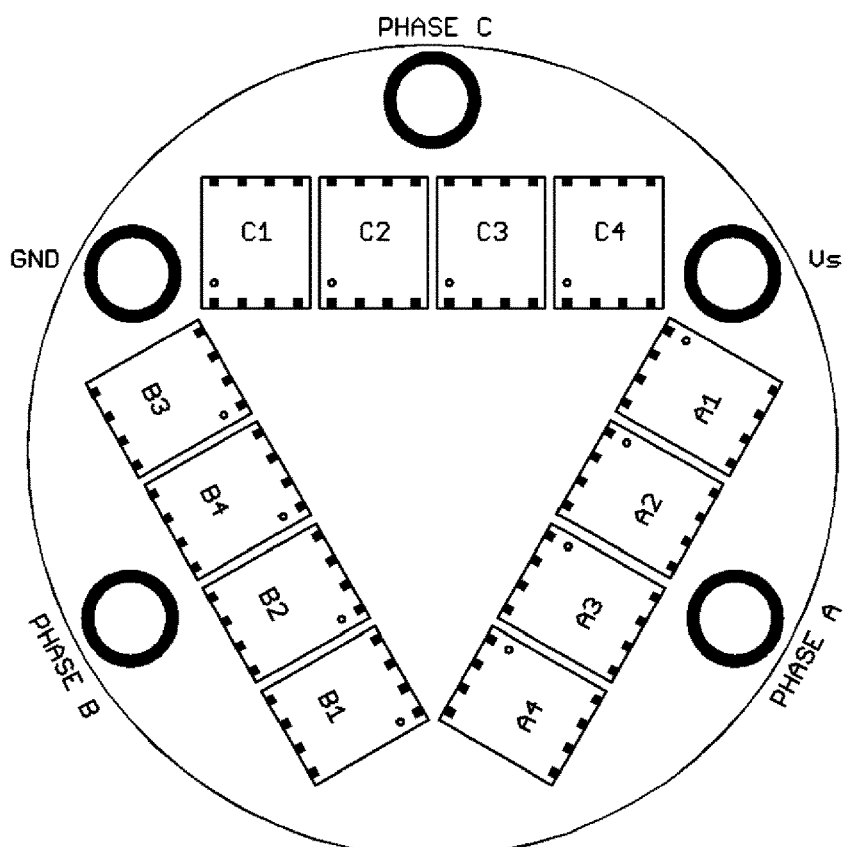
FIG. 55 illustrates a top view of another embodiment of a radially symmetrical power PCB layout design for three-phase power controller applications, consisting of groups of paralleled power transistors in each phase (A, B, C) placed in a 4×1 straight-line configuration with radial symmetrical around the center of the PCB and with power wire connection tabs placed in the middle of each group of power transistors.

The disclosed three-phase power control PCB layout configuration improves on the problems of the prior art designs with a novel radially symmetrical power PCB layout. Practical examples of three different embodiments implemented in practice are shown in FIG. 53, FIG. 54 and FIG. 55. The radial symmetry allows the external power wire connections to be placed in the middle of each phase transistor group thus significantly reducing the PCB copper track resistances in each phase. This step discloses a radially symmetrical power PCB configuration.

(i) Key Design Differences of the Radially Symmetrical Three-Phase Power Controller PCB Layout As shown in example embodiments in FIG. 53, FIG. 54 and FIG. 55, the key design differences of the disclosed three-phase power control PCB layout compared to the prior art are:

1) Groups of paralleled (or single) power transistors (low-side and high-side switching) belonging to each phase are placed in radial symmetry about the center of PCB on the top and, or bottom PCB layers.

2) Phase output power wire connections are placed in the middle of each power transistor group geometry, thus physically reducing the PCB copper track resistance in each phase.

(ii) Key Performance Advantages of the Radially Symmetrical Three-Phase Power Controller PCB Layout The placement of power transistors in radial symmetry with respect to the center of the PCB makes it possible to address the following challenges in three-phase power control applications:

1) Reduced phase output resistances in a similar PCB footprint size.

2) Reduced PCB power losses and thermal losses and increased efficiency.

3) More even heat distribution amongst the power transistors in each phase, reducing regions of hot spots.

4) More balanced phase resistances and inductances in all power transistor phase groups, reducing the likelihood of power transistor damage during high speed switching and high current power applications.

5) Reduced PCB manufacturing costs due to the reduced PCB copper track thickness and lesser number of layers required to achieve the same output efficiency as prior art designs.

6) Improved power PCB performance with controller case designs requiring external power wire connections to the PCB.

(iii) Electrical Connections of Low-Side and High-Side Power Transistors of the Radially Symmetrical Three-Phase Power Controller PCB Layout In the disclosed radially symmetrical three-phase power PCB layout configuration, such as shown in the example embodiments in FIG. 53, FIG. 54 and FIG. 55, it is possible to electrically connect the switching power transistor in the following configurations:

Groups consisting of only the low-side (A_L, B_L, C_L) or only the high-side (A_H, B_H, C_H) switching power transistors (paralleled or single) placed on the same PCB layer.

Figure 56:
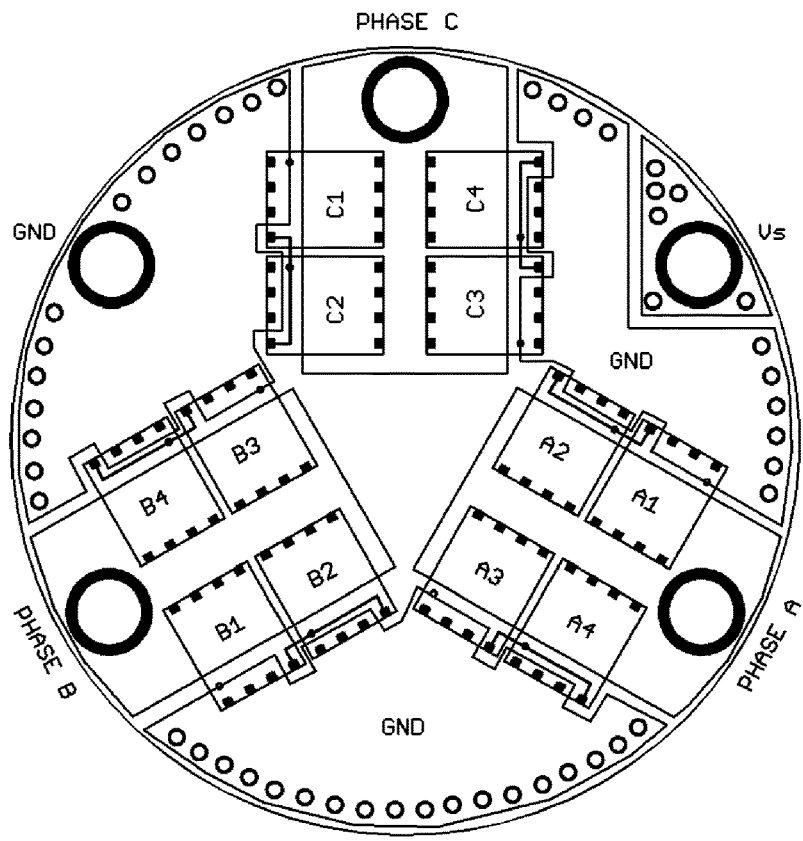
FIG. 56 illustrates a top view of one embodiment of a radially symmetrical power PCB layout of the PCB embodiment in FIG. 54, showing only the low-side switching power transistor groups (A1-A4, B1-B4, C1-C4) belonging to each phase, and their PCB electrical connections.

One such practical embodiment is shown in FIG. 56, where the top PCB layer consists of only low-side switching power transistors placed in the disclosed radially symmetrical PCB layout configuration. In this example embodiment, the corresponding bottom PCB layer would consist of only the high-side switching power transistors placed in the disclosed radially symmetrical PCB layout configuration.

Groups consisting of both the low-side (A_L, B_L, C_L) and high-side (A_H, B_H, C_H) switching power transistors (paralleled or single) placed on the same PCB layer.

Figure 57:
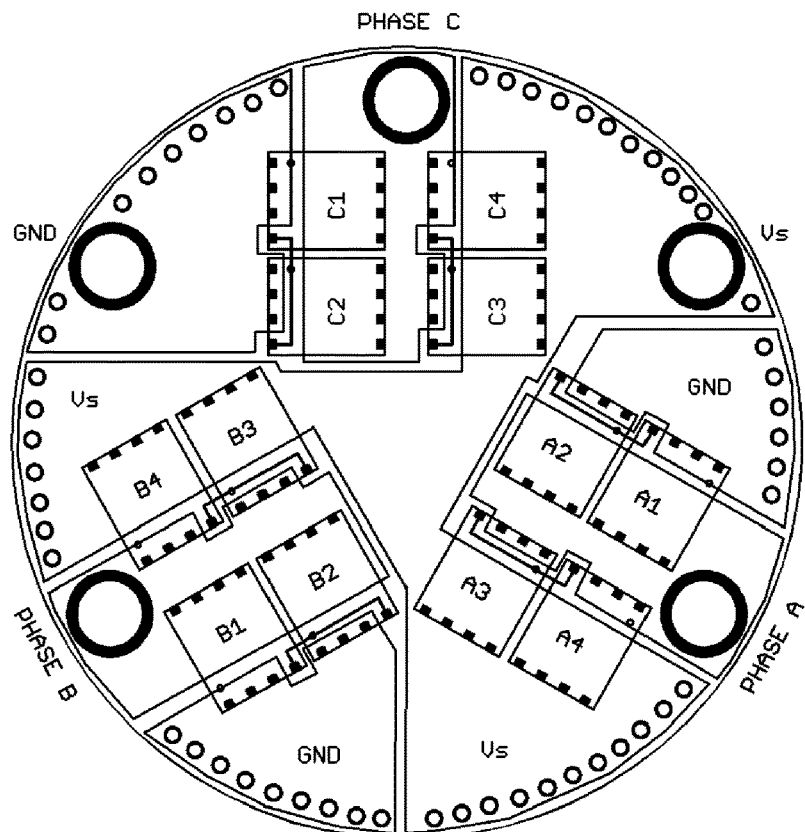
FIG. 57 illustrates a top view of another embodiment of a radially symmetrical power PCB layout of the PCB embodiment in FIG. 54, showing both the low-side switching power transistor groups (A1-A2, B1-B2, C1-C2) and the high-side switching power transistors groups (A3-A4, B3-B4, C3-C4) placed on the same PCB layer and their PCB electrical connections.

One such practical embodiment is shown in FIG. 57, where the top PCB layer consists of both the low-side and the high-side switching power transistors placed in the disclosed radially symmetrical PCB layout configuration.

In the embodiment shown in FIG. 57, it is possible to place all of the low-side and high-side PCB on the one side of the PCB layer, or on both the top and bottom PCB sides by paralleling the power transistors placed on the opposite sides of the top and bottom PCB layers. Copper vias can be used to complete electrical connections between the power transistors placed on the top and bottom layers.

(b) Practical Embodiment of Radially Symmetrical Three-Phase Power Controller PCB Layout One practical embodiment of the disclosed radially symmetrical three-phase optimized PCB layout, implemented in R/C electric vehicle BLDCM control applications, having four paralleled power transistors in each phase group and power wire connections placed outside the controller casing is shown in FIG. 58, FIG. 59, FIG. 60 and FIG. 61. These figures correspond to the top, bottom and two internal power supply PCB layers respectively:

Top layer consisting of paralleled low-side switching power transistors A1-A4 (A_L), B1-B4 (B_L) and C1-C4 (C_L); Bottom layer consisting of paralleled high-side switching power transistors A5-A8 (A_H), B5-B8 (B_H) and C5-C8 (C_H); Connector (CN1) provides electrical connections to adjoining PCB containing embedded microcontroller and low power signal circuitry; Internal GND power copper plane layer; Internal Vs power copper plane layer.

The internal GND and Vs power copper plane layers provide a low resistance connection between the groups of power transistors in each phase (A, B, C) and the GND and Vs external power wire connection pads. In practice each power plane layer (GND, Vs) consists of two or more internal copper layers of the same design stacked on top of each other within the PCB to reduce the power connection resistance as low as possible. The connections between the top, bottom and internal layers are provided by the small diameter through-hole vias. Thus a complete power PCB design can include a total of six or more copper layers.

(c) Phase Circuit Resistance Analysis

The following section presents an analysis and comparison of the output phase resistances for the prior art rectangular PCB layout and the disclosed radially symmetrical PCB layout.

(i) Rectangular PCB Layout Phase Circuit Resistance Analysis

Figure 62:
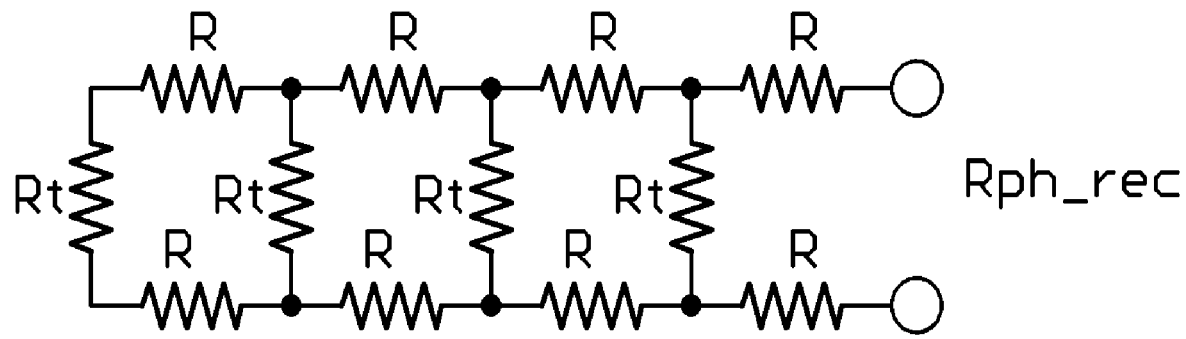
FIG. 62 illustrates a rectangular PCB layout phase resistance model of rectangular PCB layout embodiment in FIG. 52, consisting of a group of four power transistors (Rt) and interconnecting PCB copper track resistances (R) (prior art).

FIG. 62 shows a simplified prior art rectangular PCB layout phase resistance model consisting of a network of power transistors (Rt) and equally spaced copper track resistance paths (R) joining a group of four power transistors (PQFN 5×6 mm package [29]) for the rectangular PCB embodiment in FIG. 52. The total phase resistance is given by:

$$Rph\_rec=1/(1/(2 \cdot R+1/(1/(2 \cdot R+1/(1/Rt+1/(2 \cdot R+Rt)))+1/Rt))+1/Rt)+2 \cdot R \quad (132)$$

(ii) Radially Symmetrical PCB Layout Phase Circuit Resistance Analysis

Figure 58:
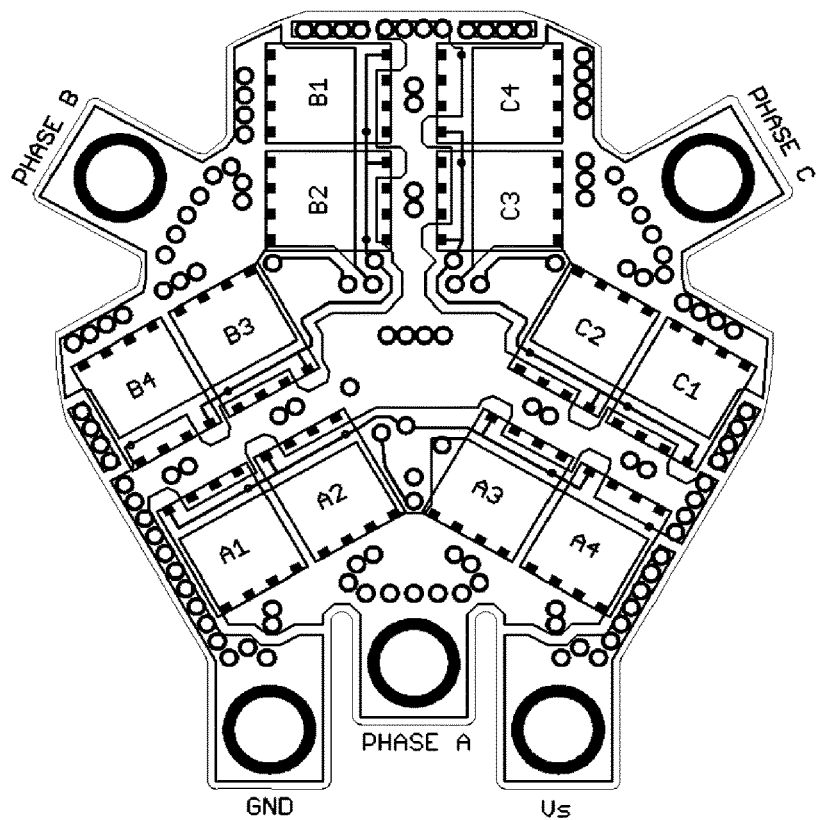
FIG. 58 illustrates a top PCB layer view of one embodiment of a radially symmetrical power PCB layout design for three-phase power controller applications, showing the low-side switching power transistors (A1-A4, B1-B4, C1-C4), PCB copper track connections, external power wire pad connections and via connections to internal and bottom PCB layers.
Figure 59:
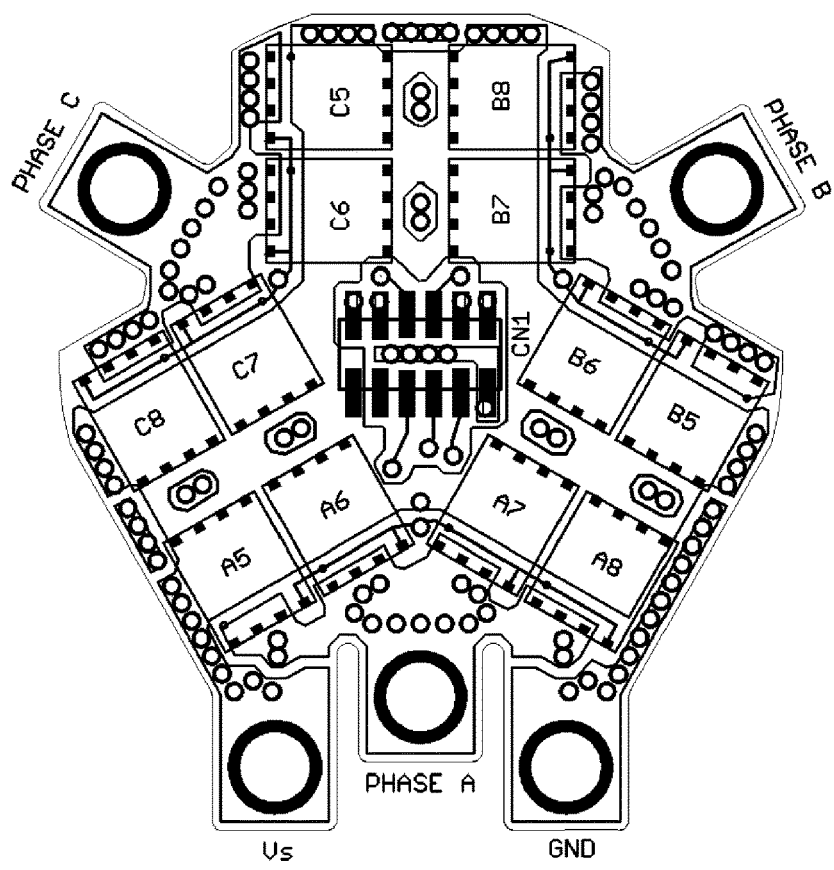
FIG. 59 illustrates a bottom PCB layer view of one embodiment of a radially symmetrical power PCB layout design for three-phase power controller applications, showing the high-side switching power transistors (A5-A8, B5-B8, C5-C8), PCB copper track connections, external power wire pad connections and via connections to internal and top PCB layers.
Figure 60:
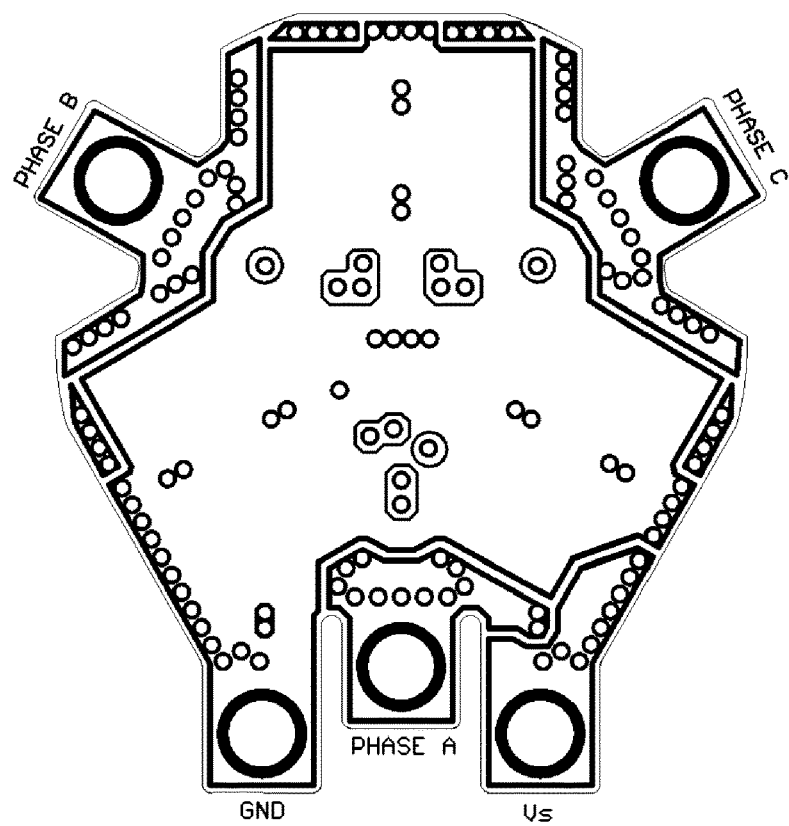
FIG. 60 illustrates a first internal PCB layer view of one embodiment of a radially symmetrical power PCB layout design for three-phase power controller applications.
Figure 61:
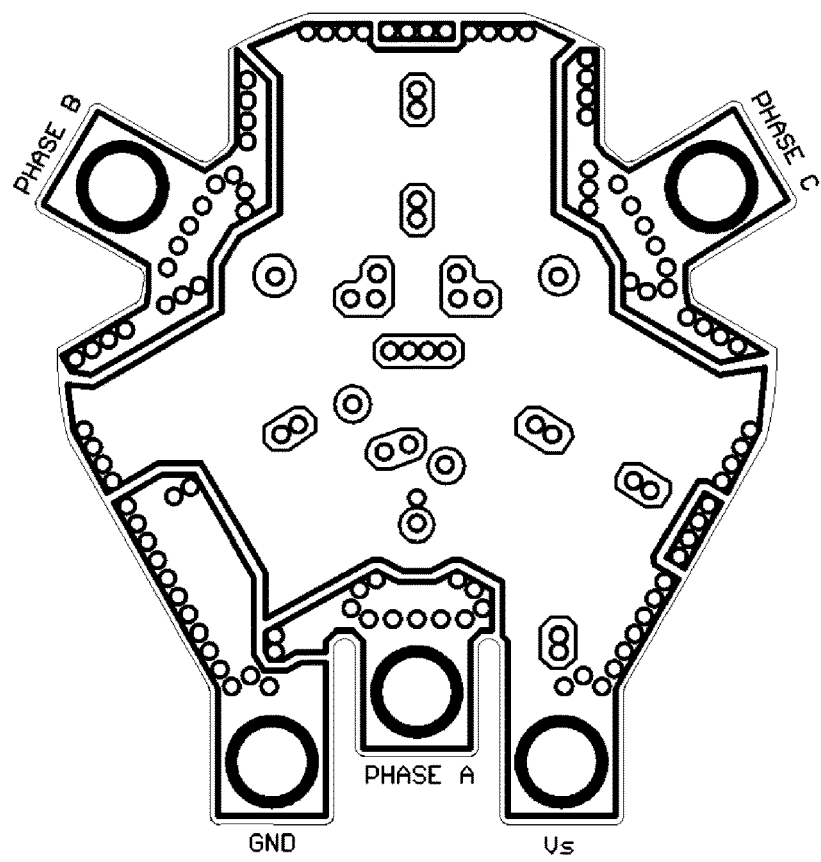
FIG. 61 illustrates a second internal PCB layer view of one embodiment of a radially symmetrical power PCB layout design for three-phase power controller applications.
Figure 63:
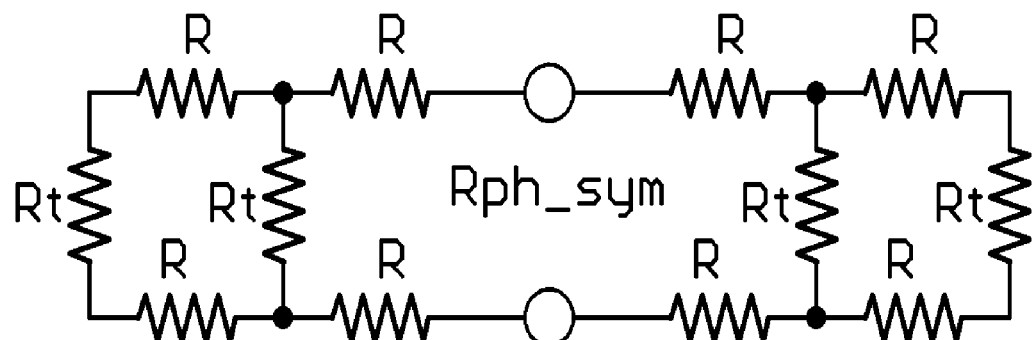
FIG. 63 illustrates a radially symmetrical PCB layout phase resistance model of radially symmetrical PCB layout embodiment in FIG. 58 consisting of a group of four power transistors (Rt) and interconnecting PCB copper track resistances (R).

FIG. 63 shows a simplified radially symmetrical PCB layout phase resistance model consisting of a network of power transistors ($R_t$) and equally spaced copper track resistance paths (R) joining a group of four power transistors (PQFN 5×6 mm package [29]) for the radially symmetrical PCB embodiment in FIG. 58. The total phase resistance is given by:

$$Rph\_sym=1/2 \cdot (2 \cdot R+1/(1/Rt+1/(2 \cdot R+Rt))) \quad (133)$$

(iii) Total Phase Resistance Comparison

Figure 64:
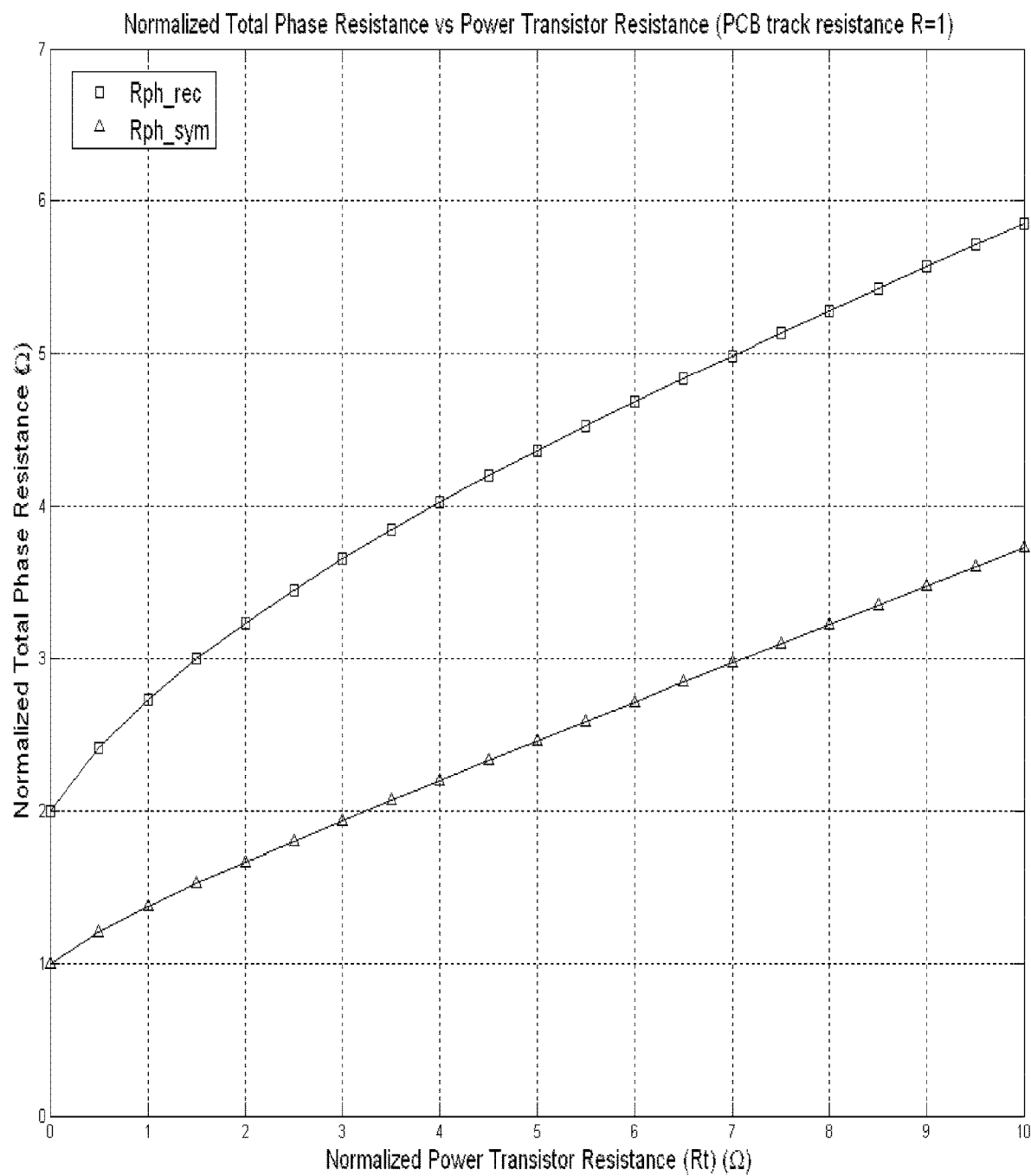
FIG. 64 illustrates a normalized total PCB phase resistance comparison between the prior art rectangular PCB layout of embodiment in FIG. 52 and the disclosed radially symmetrical PCB layout of embodiment in FIG. 58, with the unit copper PCB track resistance R=1 and varying normalized power transistor resistance (Rt), showing ≈40-50% phases resistance reduction.

FIG. 64 shows the estimated total phase resistance of the prior art rectangular PCB layout of embodiment in FIG. 52 (Rph_rec) and of the disclosed radially symmetrical PCB layout of embodiment in FIG. 58 (Rph_sym). The calculated total phase resistances are normalized to the unit PCB track length resistance (R=1) and varied with the normalized power transistor resistance (Rt). As shown in FIG. 64, the total phase resistance of the rectangular PCB layout is in the order of 2 (Rt=0) to 1.5 (Rt=10) times higher than that of the radially symmetrical PCB design. Thus, the disclosed method offers a significant performance advantage in the same PCB size.

In practical three-phase power control power PCB layout embodiments such as in FIG. 52 and FIG. 58, the unit PCB copper track resistance (R) can be approximated with the following calculation:

$$R=\rho \cdot L/(W \cdot T) \quad (134)$$

Where: $\rho=1.69 \times 10^{-8}$ Ω/m (copper resistivity at 20° C.); L=0.005 m (unit PCB copper length between adjacent power transistors, approximately equal to power transistor width [29]); W=0.005 m (PCB copper track width); T=100×10$^{-6}$ m=0.5×10$^{-6}$ m$^2$ (PCB copper thickness 100 um (3 oz.)

Thus, the unit PCB copper track resistance (R) is approximately equal to:

$$R=1.69 \times 10^{-8} \text{ Ω/m} \cdot 0.005 \text{ m}/(0.005 \text{ m} \cdot 100 \times 10{-6} \text{ m})=0.169 \text{ m}\Omega \quad (135)$$

A modern power transistor switching device such as the International Rectifiers IRFH5300PbF [29] commonly used in BLDCM power control applications has a typical RDS on-resistance (Rt) equal to 1.4 mΩ. Thus, in this example the normalized power transistor resistance (Rt) is equal to:

$$Rt=1.4 \text{ m}\Omega/0.169 \text{ m}\Omega \approx 8.3 \quad (136)$$

With Rt=8.3, the rectangular PCB layout has approximately 5.4/3.3≈1.6 times higher phase resistance than the radially symmetrical PCB layout, as shown in FIG. 64. This is about 60% higher.

(d) Radially Symmetrical PCB Layout Extensions

The disclosed radially symmetrical PCB layout can be employed in any three-phase power control applications such as, but not limited to: 1) Three-phase BLDC motor controllers (sensored, sensorless); 2) Three-phase BLDC motors with controllers built inside the motor, such as described in [32] (for example using circular PCB layout embodiments disclosed in FIG. 53, FIG. 54 and FIG. 55; 3) Three-phase power inverters, power supplies (AC, DC).

The disclosed radially symmetrical PCB layout can be realized with any number of external and internal PCB conductive layers, for example, with a single sided PCB, a double sided PCB and a multiple layer PCB.

Furthermore, the disclosed radially symmetrical PCB layout can be realized with any number of paralleled power transistor devices in each phase and with any of the available power transistor device packages and footprints such as, but not limited to: PQFN, QFN, DPAK, D2PAK, PPAK, SO8, SOP8, SOT143, SOT23, SOT223, SOT523, SOT666, SOT89, TSOP6, TSSOP8, DirectFET, FlipFET, MicroFET, Micro8, PolarPAK, PowerPAK. Power 33, Power 56.

The disclosed radially symmetrical method of power transistor and power wire placement on a PCB can also be employed in applications other than three-phase power control applications, for example, such as two-phase, four-phase or five-phase systems. In this case the radial angle between each phase is adjusted according to the number of phases, for example, 180° for two-phase, 90° for four-phase and 72° for five-phase system.

Interpretation

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method of operating a Brushless Direct Current Motor (BLDCM), the BLDCM of the type including: a series of concentric independently activated electromagnetic phase coils interacting with a series of permanent magnets to provide relative movement therebetween, the phase coils having temporal periods of activation time and deactivation time, the method including the steps of:
   (a) activating at least one of the phase coils for a short period of activation, and applying a preceding short duration pulse to demagnetize the BLDCM stator core before measuring the voltage response across the phase coil; and
   (b) measuring the voltage response across the phase coil of the deactivated phase coil during the short period of activation to determine the rotor position.

2. A method as claimed in claim 1 wherein the method is applied to each of the series of phase coils.

3. A method as claimed in claim 1 further comprising the step of:
   (c) measuring the voltage response during the on-time activation of the activation time across the phase coil (Von) and utilizing the on-time of the open phase winding voltages to determine an estimated rotor position.

4. A method as claimed in claim 3 further comprising the steps of:
   (d) activating the low-side power transistor switches of the phase coil during the off-time interval of the pulse measurement; and
   (e) measuring the voltage response during the off-time activation across the phase coil (Voff), and utilizing both the on-time and off-time activation (Von, Voff) of the open phase winding voltages to determine an estimated rotor position.

5. A method as claimed in claim 4 further comprising the step of:
   (f) measuring the on-time voltage level (Vs) and off-time voltage level (Vsoff) of the supply voltage to the BLDCM to correct open phase voltage measurements (Von, Voff) for power supply voltage fluctuations.

6. A method as claimed in claim 5 wherein said step (f) further comprises:
   correlating the measured on-time (Von) and off-time (Voff) open phase voltages using on-time (Vs) and off-time (Vsoff) supply voltage measurements to form a series of correlated measurements.

7. A method as claimed in claim 6 further comprising calculating a rotor position from the correlated measurements.

8. A method as claimed in claim 6 further comprising calculating a rotor rotation direction from the correlated measurements.

9. A method of operating a Brushless Direct Current Motor (BLDCM), the BLDCM of the type including: a series of concentric independently activated electromagnetic phase coils interacting with a series of permanent magnets to provide relative movement therebetween, the phase coils having temporal periods of activation time and deactivation time, the method including the steps of:

(a) activating at least one of the phase coils for a short period of activation;
(b) measuring the voltage response across the phase coil of the deactivated phase coil during the short period of activation to determine the rotor position; and
(c) measuring the voltage response during the on-time activation of the activation time across the phase coil (Von) and utilizing the on-time of the open phase winding voltages to determine an estimated rotor position.

10. A method as claimed in claim 9 further comprising the steps of:
(d) activating the low-side power transistor switches of the phase coil during the off-time interval of the pulse measurement; and
(e) measuring the voltage response during the off-time activation across the phase coil (Voff), and utilizing both the on-time and off-time activation (Von, Voff) of the open phase winding voltages to determine an estimated rotor position.

11. A method as claimed in claim 10 further comprising the step of:
(f) measuring the on-time voltage level (Vs) and off-time voltage level (Vsoff) of the supply voltage to the BLDCM to correct open phase voltage measurements (Von, Voff) for power supply voltage fluctuations.

12. A method as claimed in claim 11 wherein said step (f) further comprises:
correlating the measured on-time (Von) and off-time (Voff) open phase voltages using on-time (Vs) and off-time (Vsoff) supply voltage measurements to form a series of correlated measurements.

13. A method as claimed in claim 12 further comprising calculating a rotor position from the correlated measurements.

14. A method as claimed in claim 12 further comprising calculating a rotor rotation direction from the correlated measurements.

* * * * *